(12) United States Patent
Chen et al.

(10) Patent No.: US 11,588,972 B2
(45) Date of Patent: Feb. 21, 2023

(54) SHOOTING CONTROL METHOD AND TERMINAL

(71) Applicant: Huawei Technologies Co., Ltd., Shenzhen (CN)

(72) Inventors: Xiaoxiao Chen, Nanjing (CN); Hao Chen, Shenzhen (CN); Bing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/257,194

(22) PCT Filed: Jun. 30, 2018

(86) PCT No.: PCT/CN2018/093926
§ 371 (c)(1),
(2) Date: Dec. 30, 2020

(87) PCT Pub. No.: WO2020/000488
PCT Pub. Date: Jan. 2, 2020

(65) Prior Publication Data
US 2021/0160431 A1    May 27, 2021

(51) Int. Cl.
*H04N 5/232* (2006.01)
*G11B 20/10* (2006.01)
*H04N 5/77* (2006.01)

(52) U.S. Cl.
CPC . *H04N 5/232933* (2018.08); *G11B 20/10527* (2013.01); *H04N 5/772* (2013.01); *G11B 2020/1062* (2013.01); *G11B 2020/10537* (2013.01)

(58) Field of Classification Search
CPC ................................................ H04N 5/232933
USPC ......................................................... 386/224
See application file for complete search history.

(56) References Cited

U.S. PATENT DOCUMENTS

| | | | |
|---|---|---|---|
| 2007/0053657 A1* | 3/2007 | Hamada | G11B 27/031 386/241 |
| 2010/0265344 A1 | 10/2010 | Velarde et al. | |
| 2010/0315521 A1 | 12/2010 | Kunishige et al. | |
| 2015/0095953 A1* | 4/2015 | Cheon | H04N 21/482 725/53 |

(Continued)

FOREIGN PATENT DOCUMENTS

| | | |
|---|---|---|
| CN | 202126847 U | 1/2012 |
| CN | 102984456 A | 3/2013 |

(Continued)

*Primary Examiner* — Daniel T Tekle
(74) *Attorney, Agent, or Firm* — Conley Rose, P.C.

(57) ABSTRACT

A shooting control method includes displaying, by a terminal, a first screen that is not a video recording viewfinder screen, receiving, by the terminal, a first operation of a user on the first screen, displaying, in response to the first operation, a second screen, starting, in response to the first operation, to record a first video, and buffering, in response to the first operation, the first video, when the terminal detects a second operation, in response to the detected second operation, stopping, by the terminal, a video recording, and displaying, in response to the detected second operation, a third screen prompting the user to determine whether to save the first video, and saving or deleting the first video according to a selection operation of the user on the third screen.

20 Claims, 35 Drawing Sheets

(56) References Cited

U.S. PATENT DOCUMENTS

2016/0119552 A1    4/2016  Oh et al.
2016/0241784 A1*  8/2016  Baek ................ H04N 21/41407
2016/0261796 A1    9/2016  Xu et al.

FOREIGN PATENT DOCUMENTS

| CN | 104580874 A | 4/2015 |
|---|---|---|
| CN | 105100875 A | 11/2015 |
| CN | 105187713 A | 12/2015 |
| CN | 105549839 A | 5/2016 |
| CN | 105763807 A | 7/2016 |
| CN | 105893078 A | 8/2016 |
| CN | 106331506 A | 1/2017 |
| CN | 106851118 A | 6/2017 |
| CN | 106878620 A | 6/2017 |
| CN | 107124568 A | 9/2017 |
| EP | 1296326 A1 | 3/2003 |
| EP | 3062513 A1 | 8/2016 |
| EP | 3122033 A1 | 1/2017 |

* cited by examiner

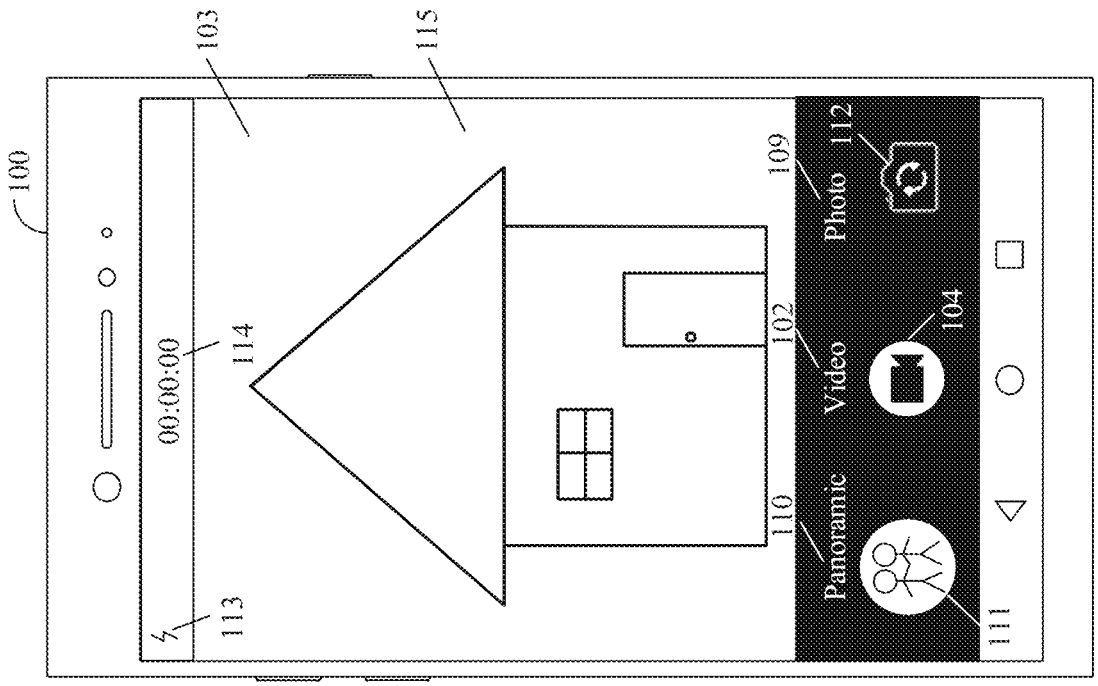
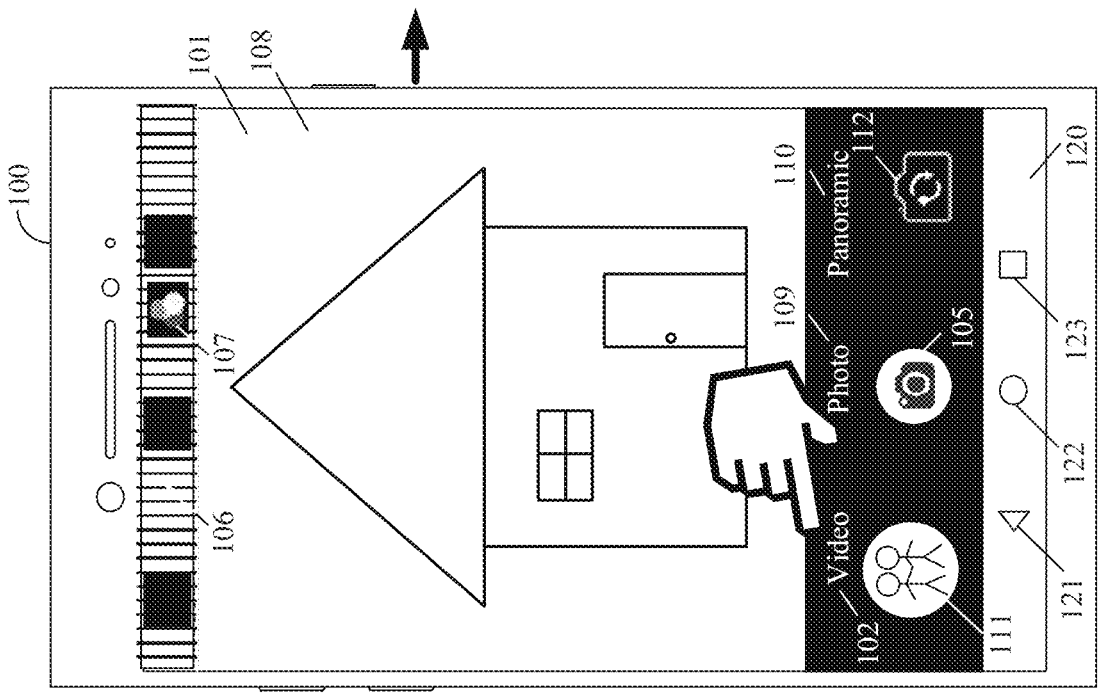

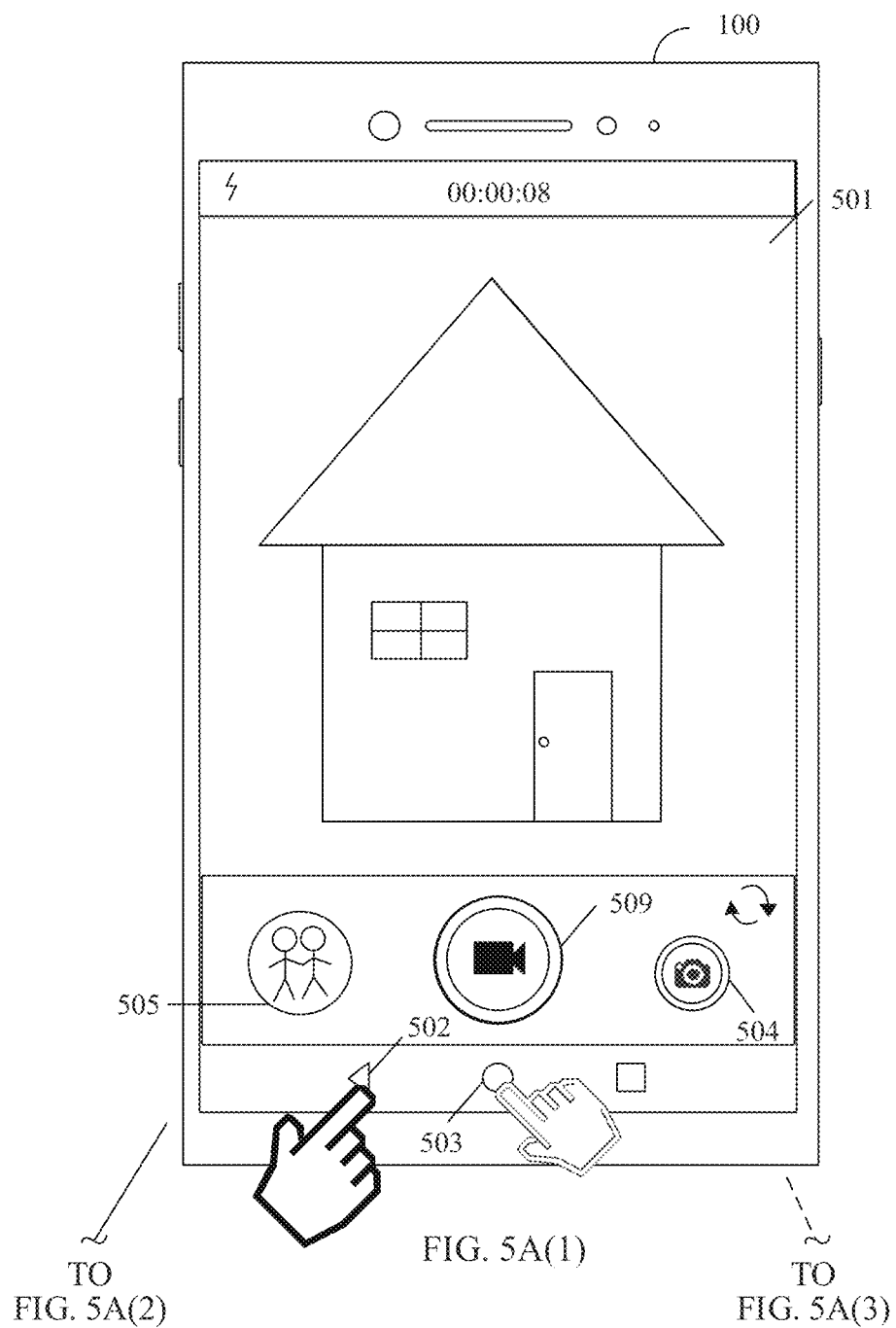
FIG. 5A(1)
TO FIG. 5A(2)
TO FIG. 5A(3)

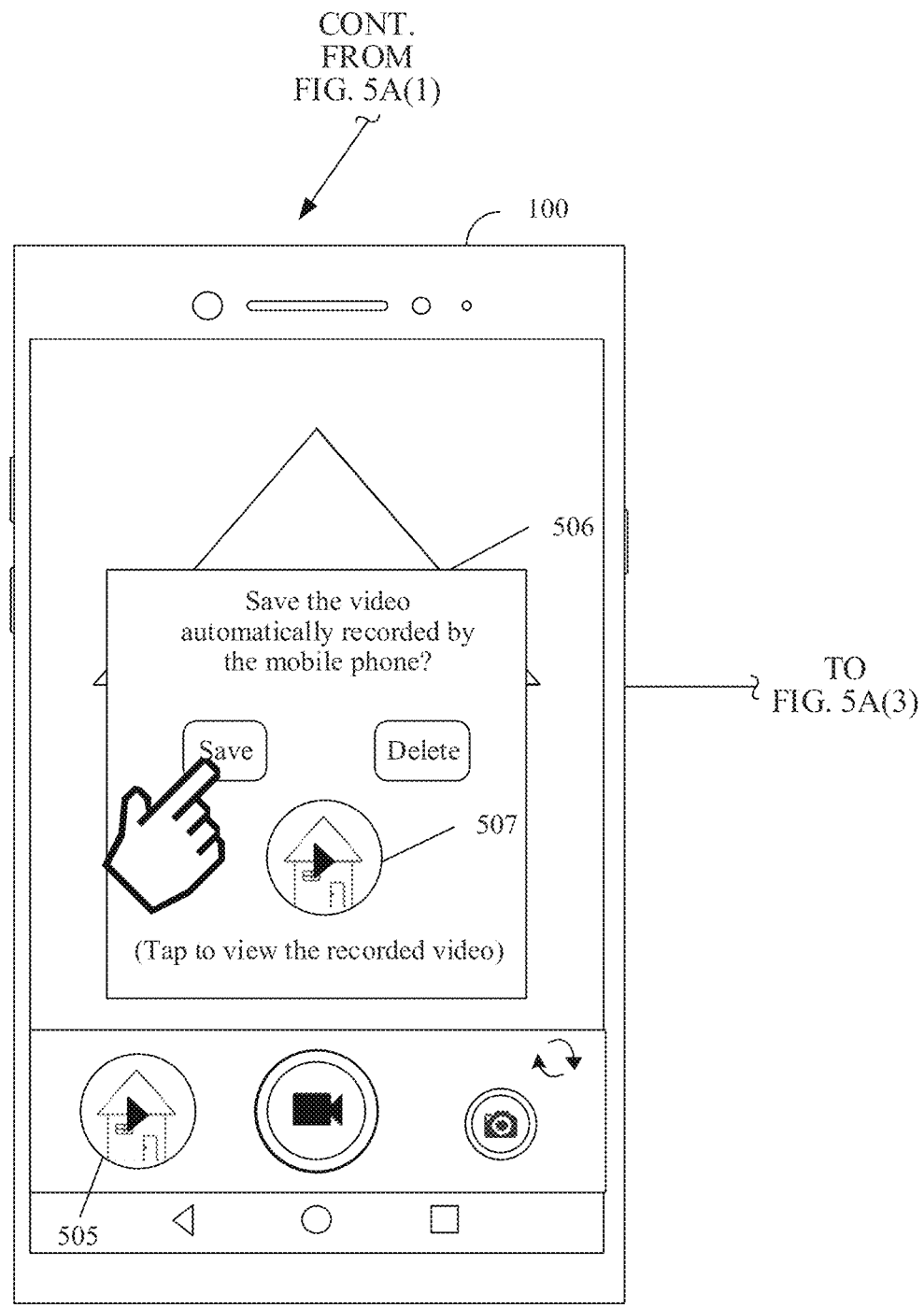
FIG. 5A(2)

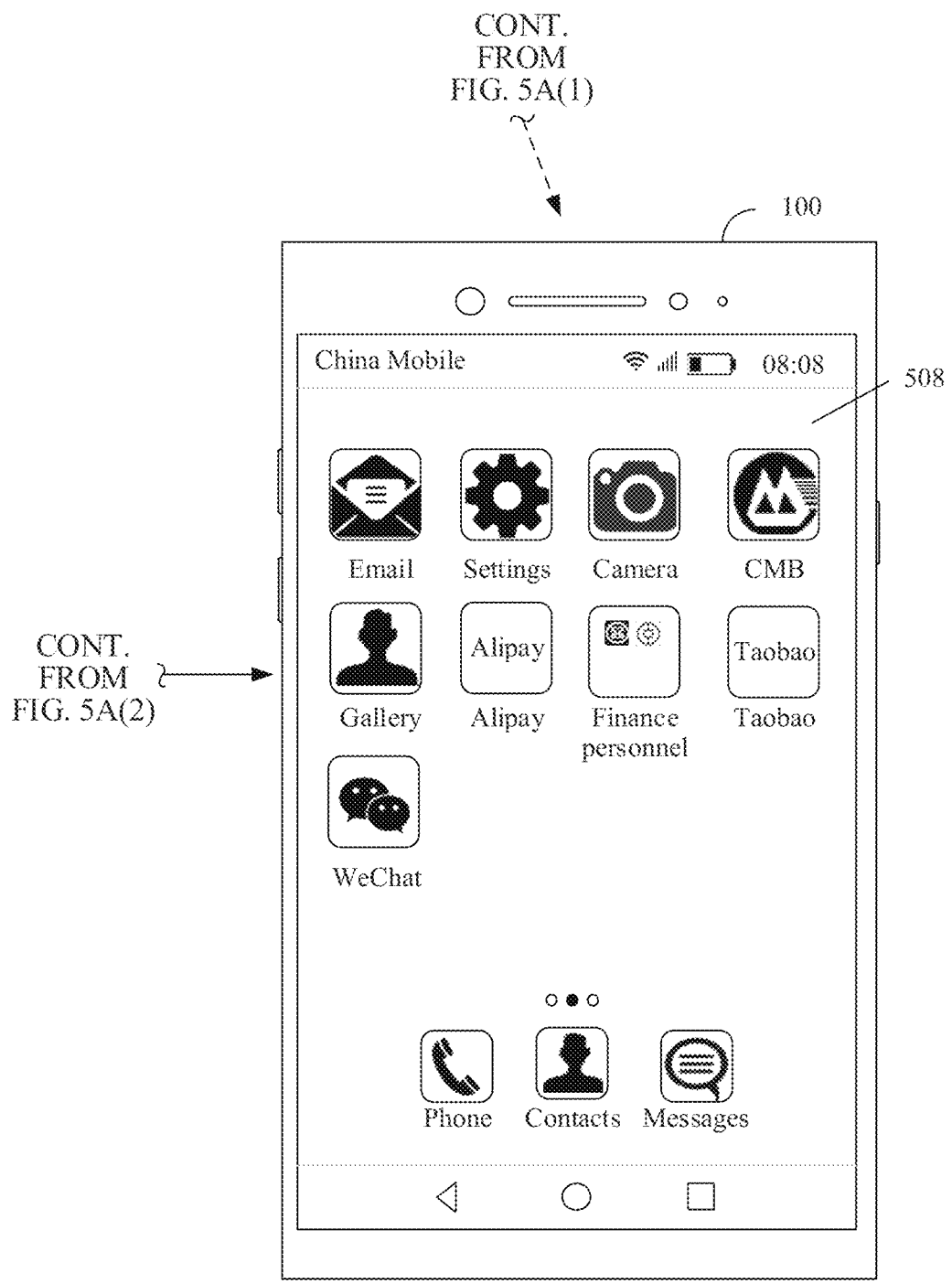
FIG. 5A(3)

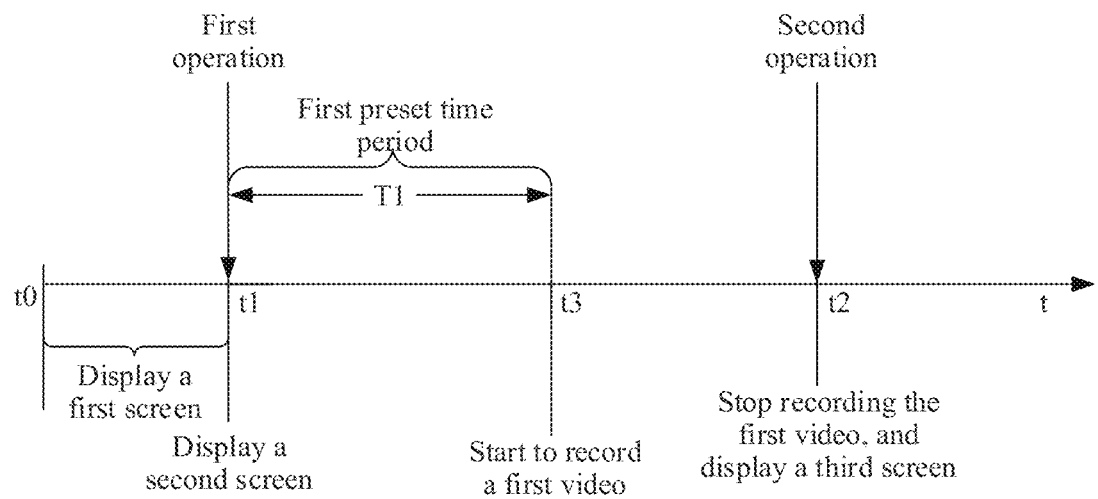
FIG. 6B(1)
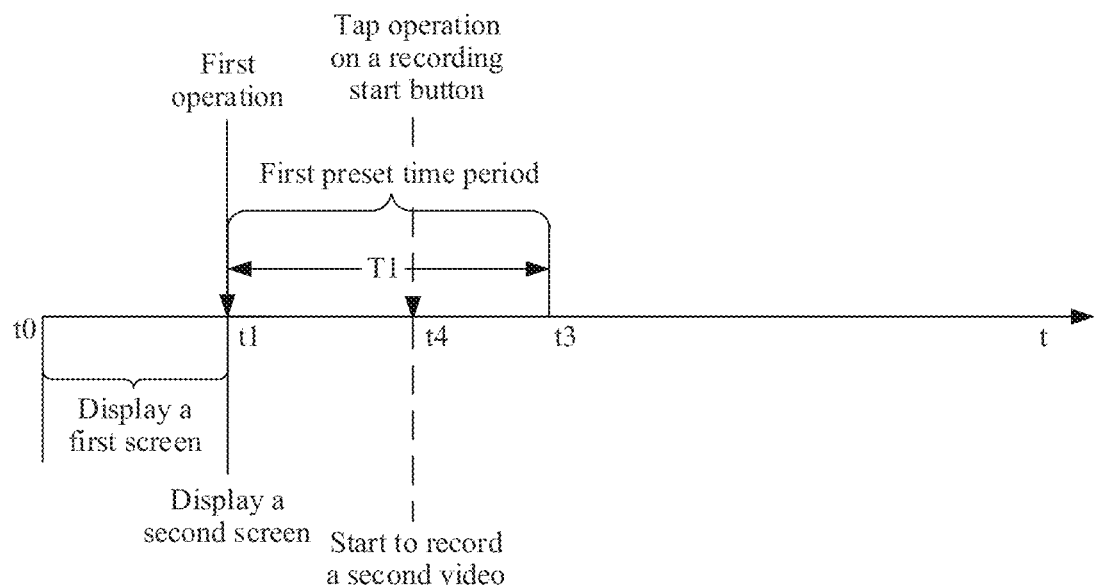
FIG. 6B(2)

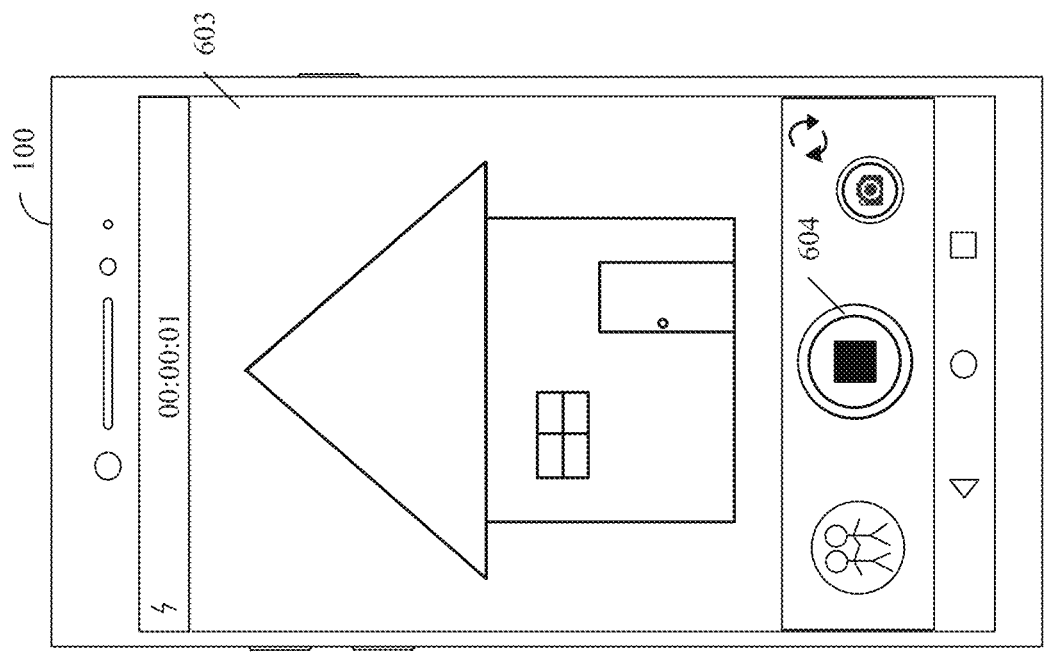
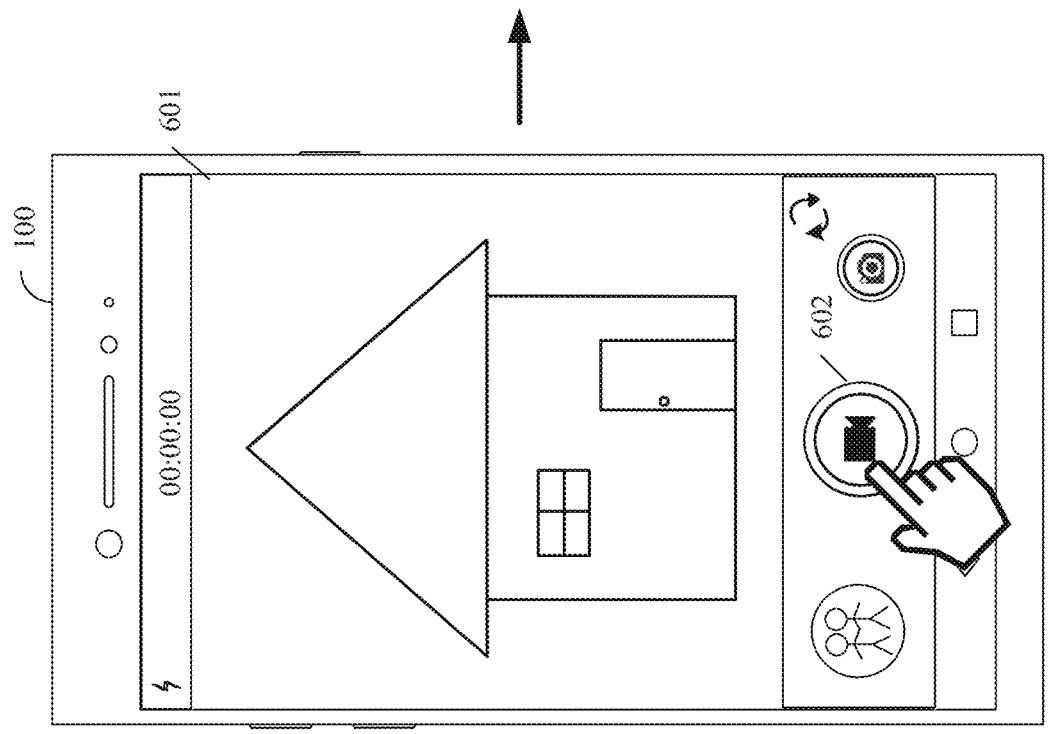
FIG. 6C(2)
FIG. 6C(1)

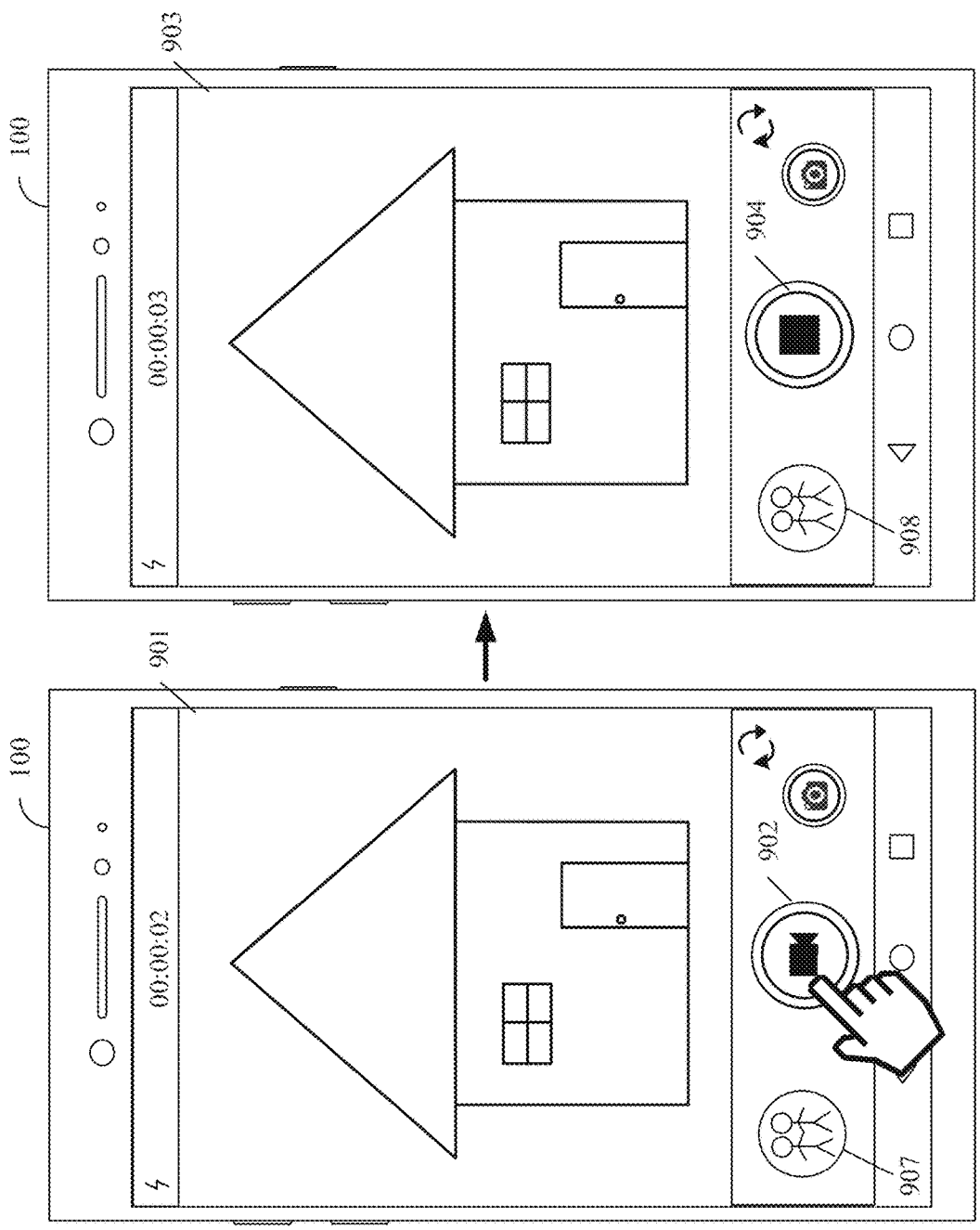

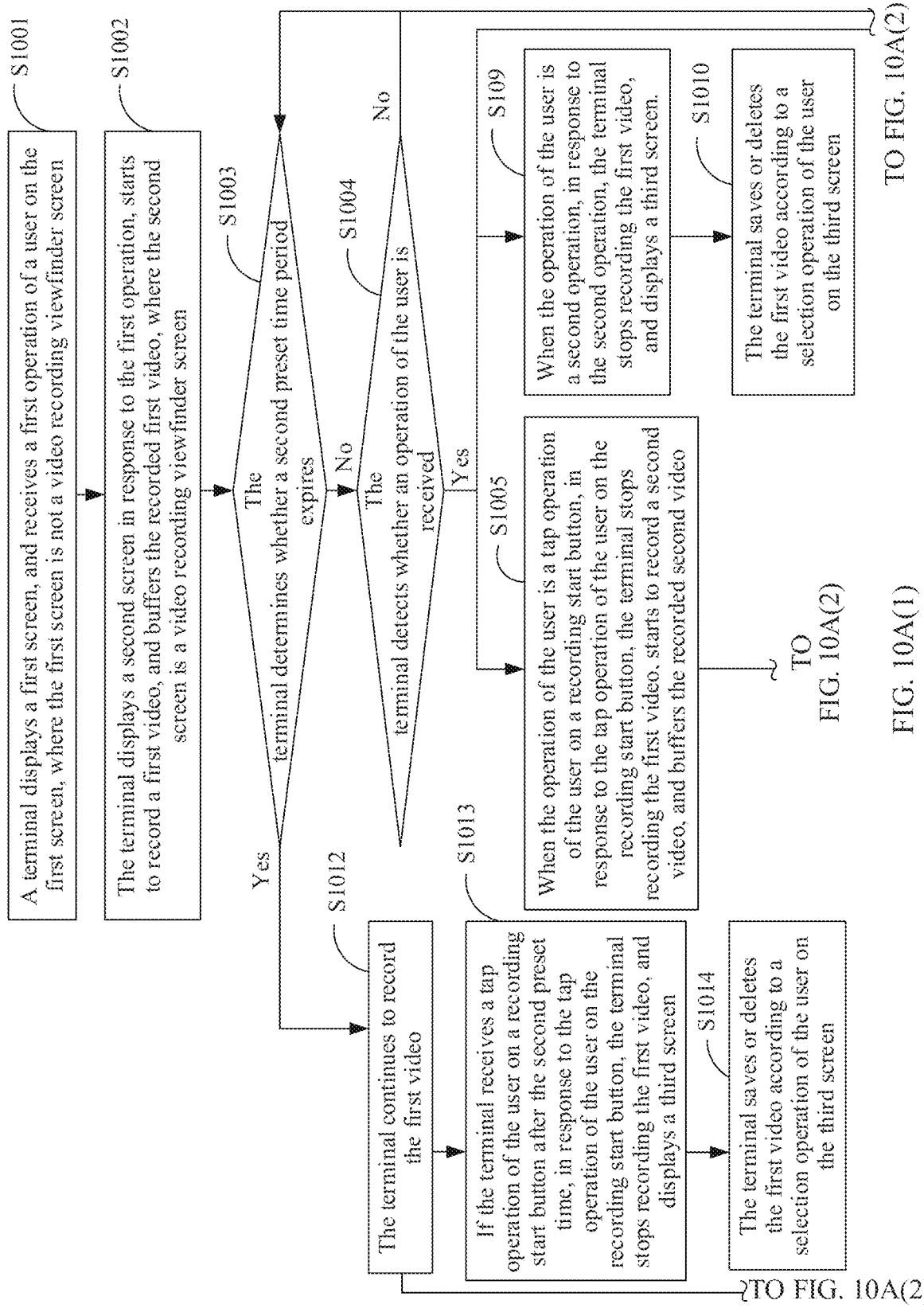
FIG. 10A(1)

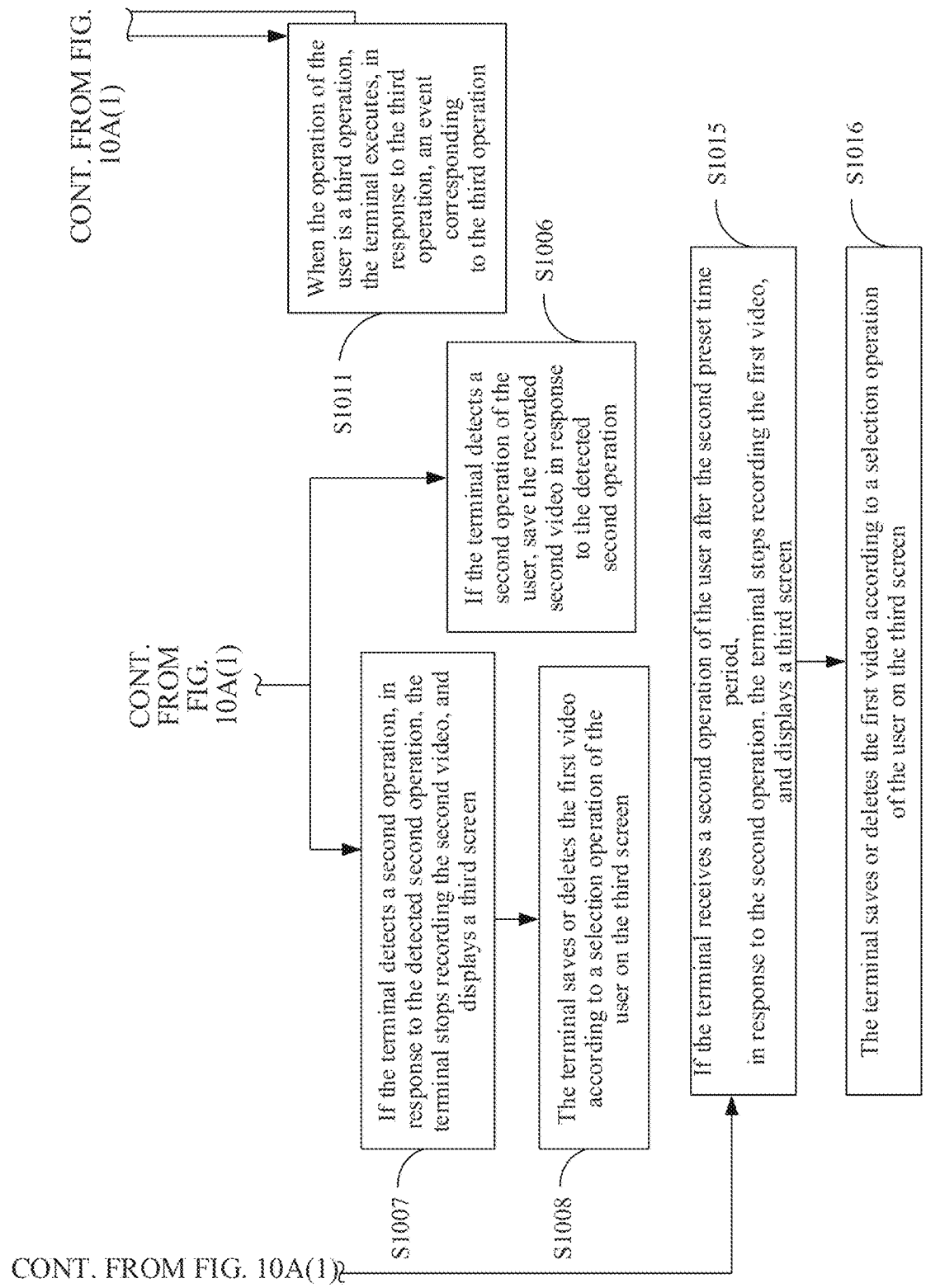
FIG. 10A(2)

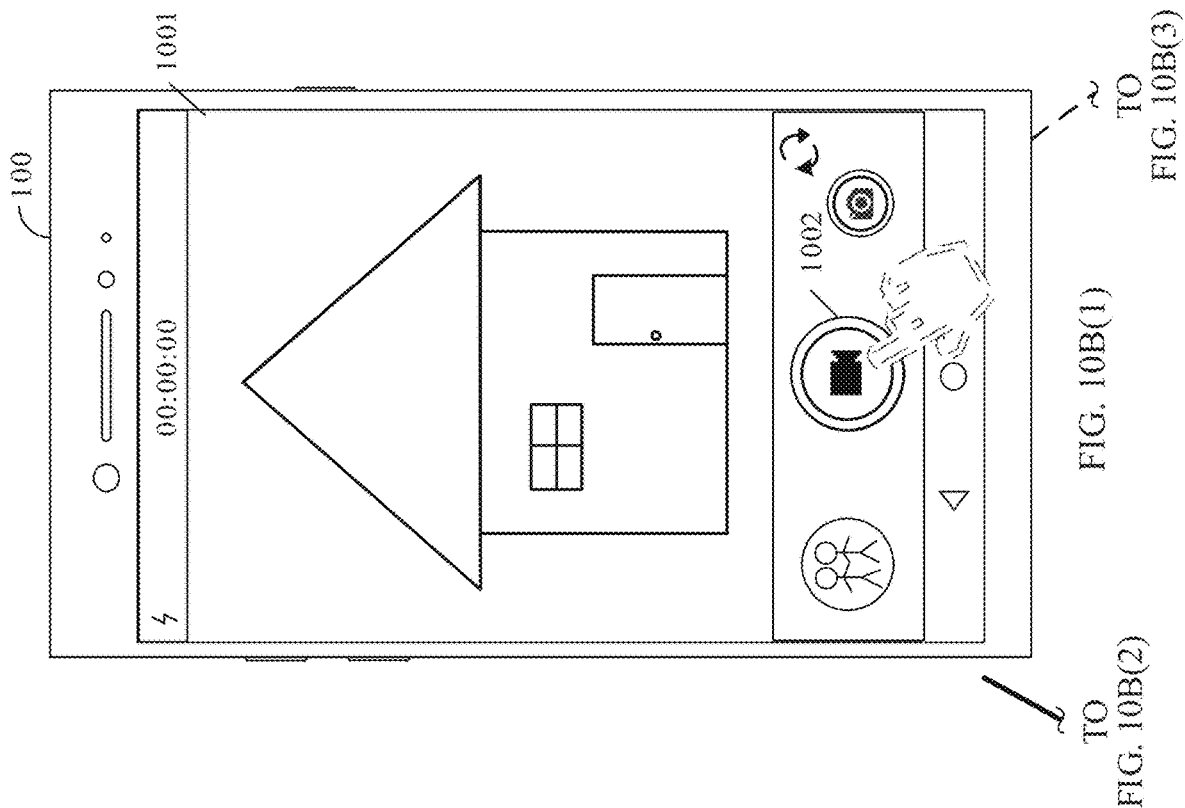

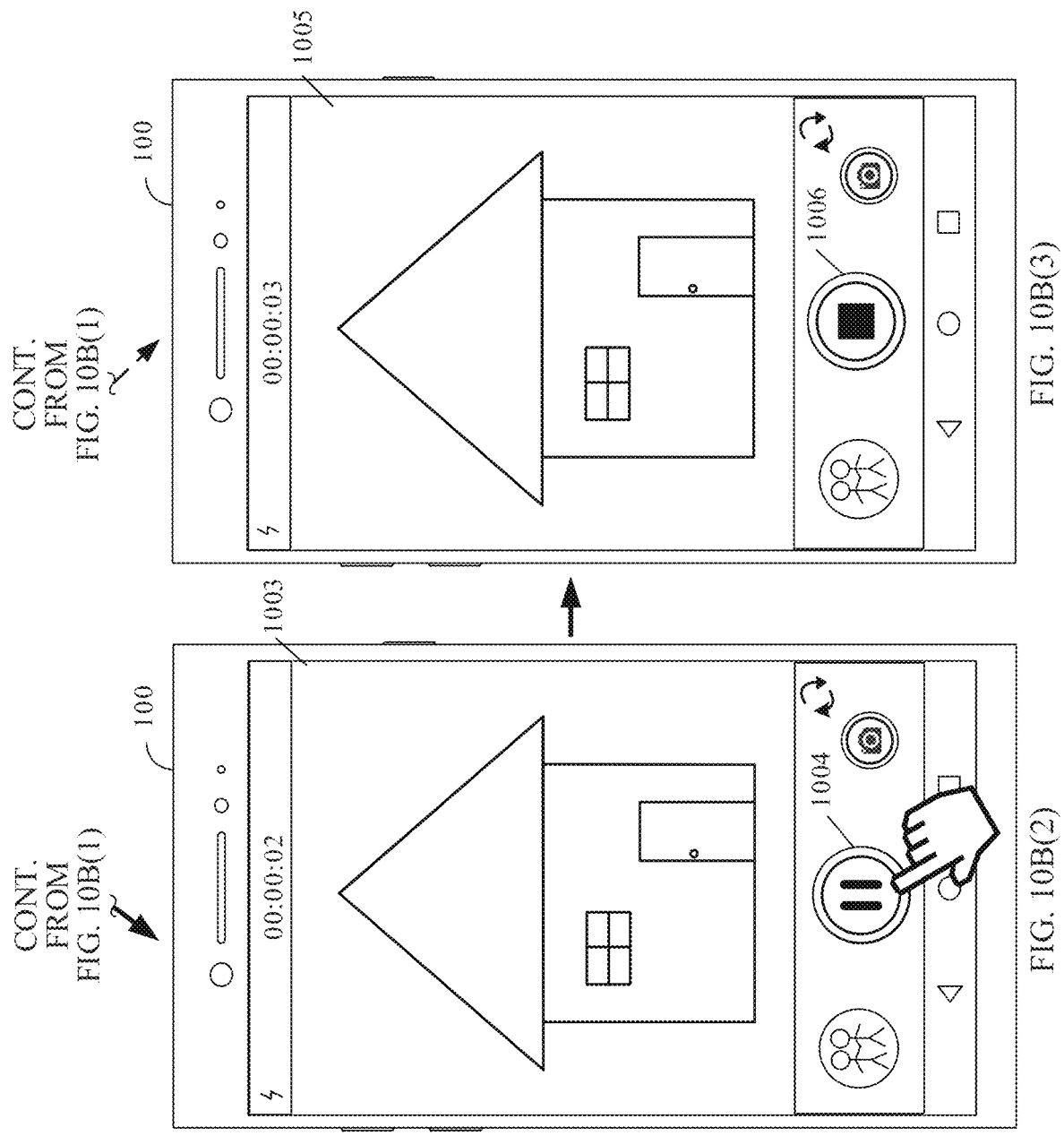

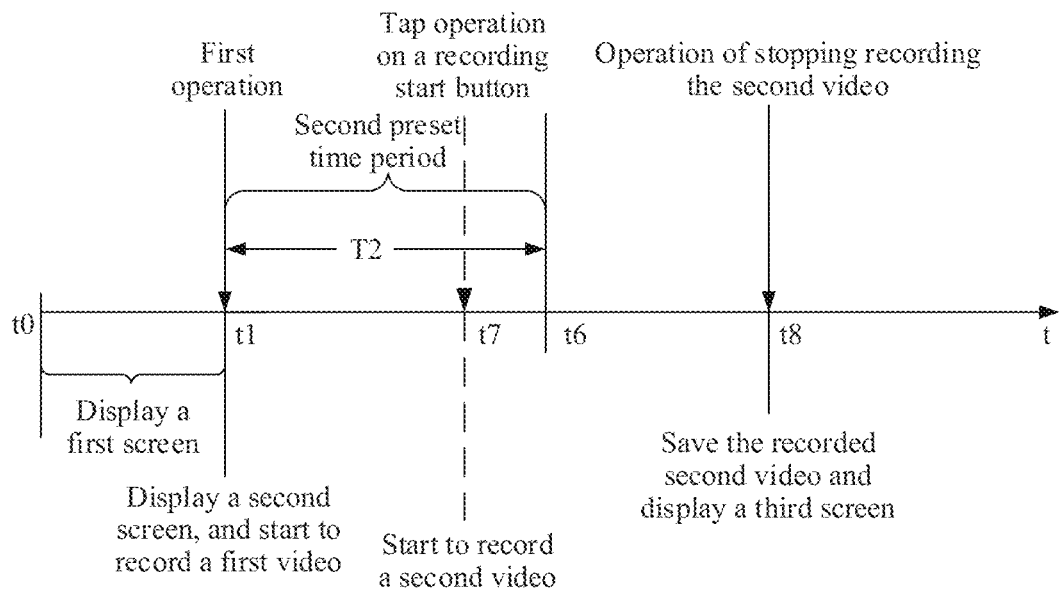
FIG. 10C(1)
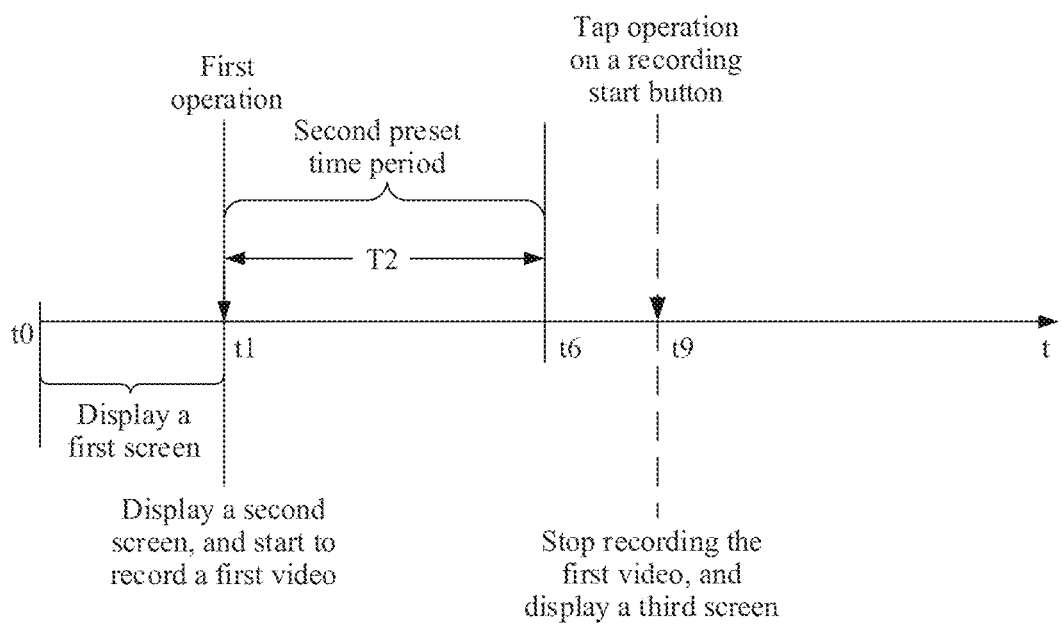
FIG. 10C(2)

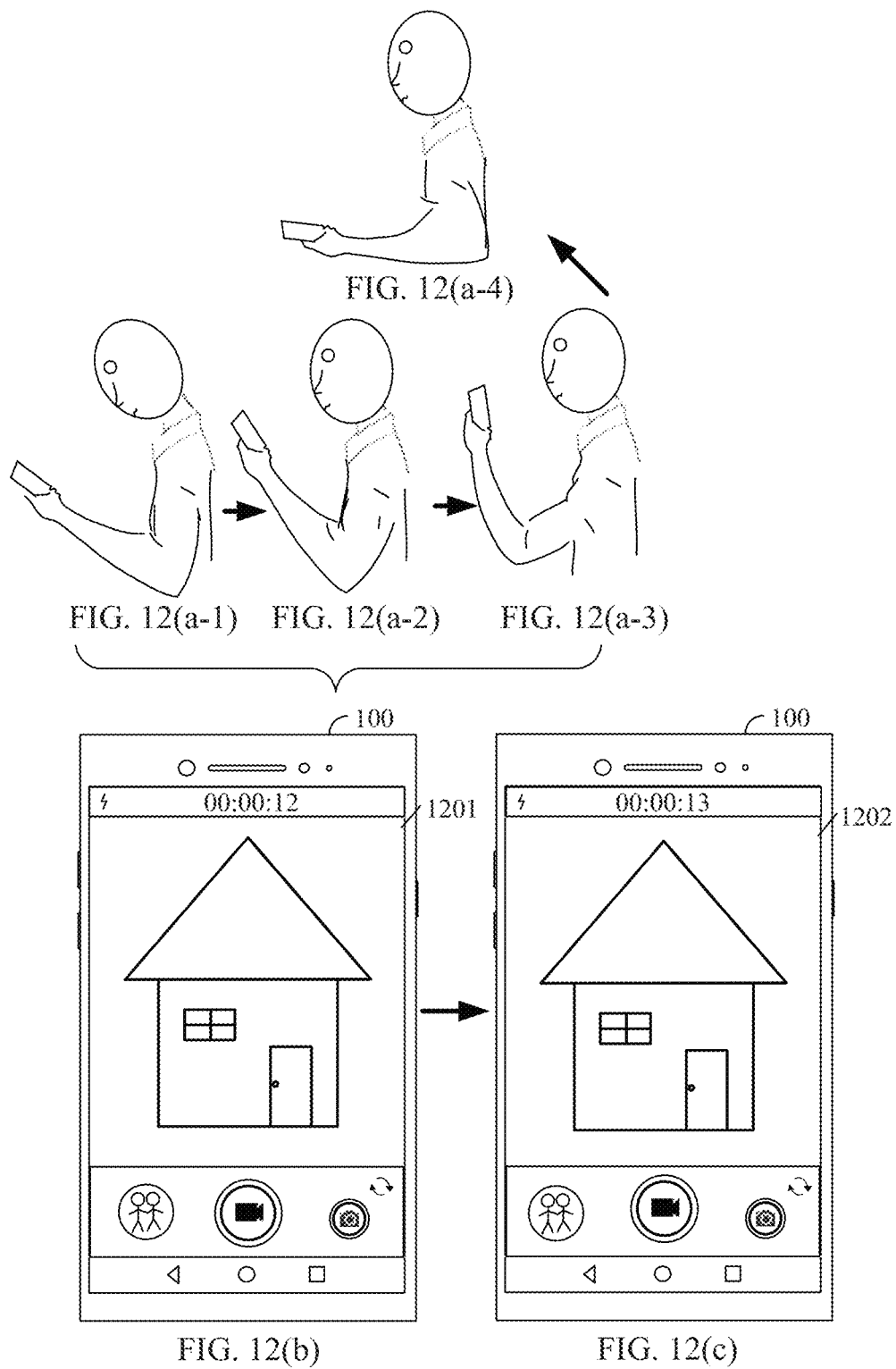

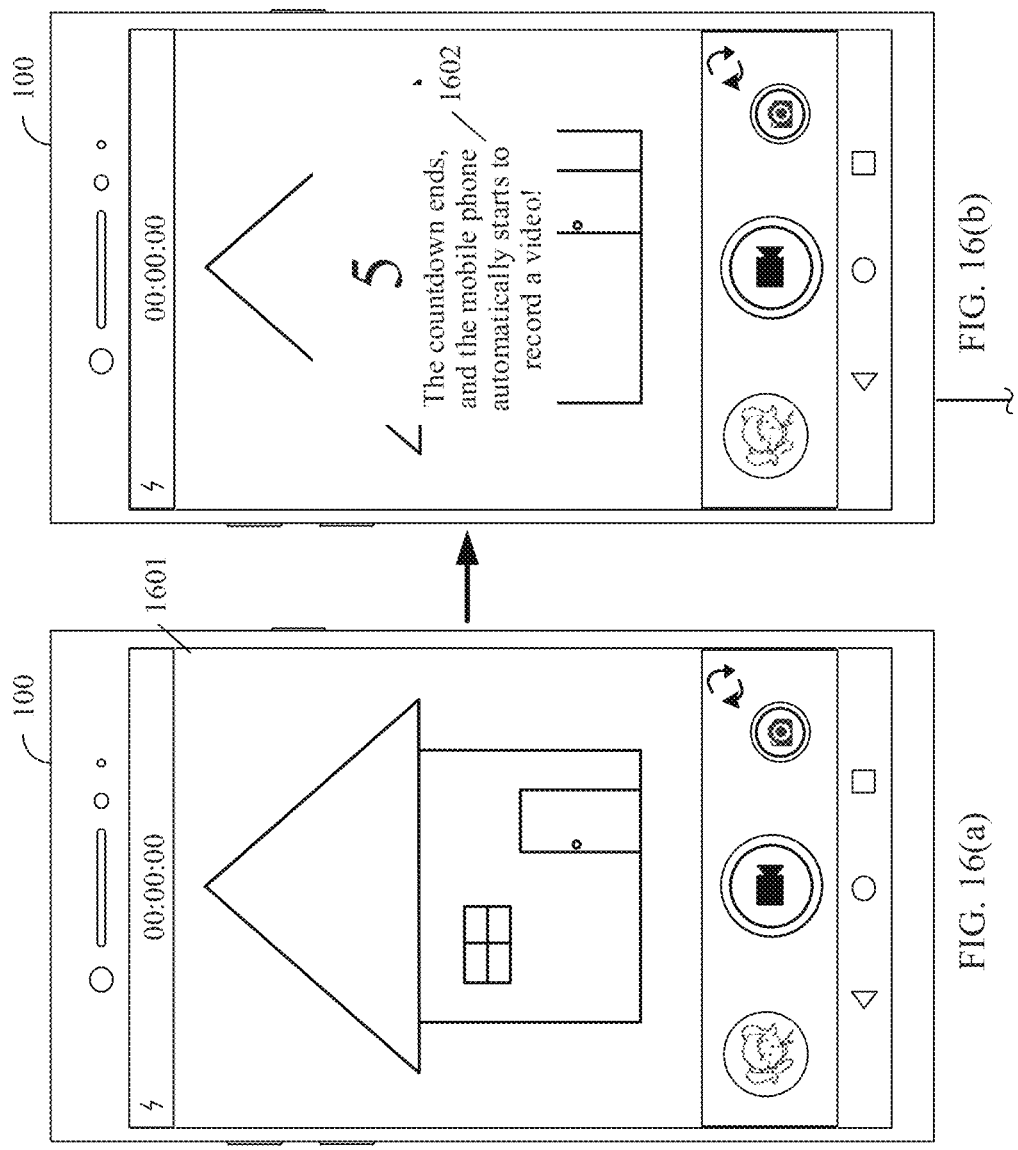

SHOOTING CONTROL METHOD AND TERMINAL

CROSS-REFERENCE TO RELATED APPLICATIONS

This application is a U.S. National Stage of International Patent Application No. PCT/CN2018/093926 filed on Jun. 30, 2018, which is hereby incorporated by reference in its entirety.

TECHNICAL FIELD

Embodiments of this application relate to the field of terminal technologies, and in particular, to a shooting control method and a terminal.

BACKGROUND

Existing mobile phones generally have a photographing function, and more and more people use a mobile phone to shoot photos and videos to record details of life. For example, a user may tap a "camera" application icon on a home screen of a mobile phone, to indicate the mobile phone to turn on a camera and display a viewfinder screen.

Usually, the mobile phone may display a photographing viewfinder screen in response to a tap operation of the user on the "camera" application icon. When the user wants to record a video by using the mobile phone, the user may trigger the mobile phone to display a video recording viewfinder screen.

For example, FIG. 1(a) shows a photographing viewfinder screen 101 of a mobile phone 100. In response to a tap operation of the user on a "video" option 102 on the viewfinder screen 101, the mobile phone 100 may display a video recording viewfinder screen 103 shown in FIG. 1(b).

Alternatively, the mobile phone may directly display a video recording viewfinder screen in response to a tap operation of the user on the "camera" application icon. For example, in response to the tap operation of the user on the "camera" application icon, the mobile phone may directly display a viewfinder screen 103 shown in FIG. 1(b).

After the mobile phone 100 displays the video recording viewfinder screen 103 shown in FIG. 1(b), the mobile phone 100 can start to record a video only in response to a tap operation of the user on a recording start button 104.

However, after the mobile phone 100 displays the video recording viewfinder screen 103 shown in FIG. 1(b), an image on the video recording viewfinder screen 103 changes with a shooting object. This leads the user to mistakenly consider that the mobile phone 100 has started video recording. In this case, the user usually forgets to tap the recording start button 104. If the mobile phone 100 detects no tap operation of the user on the recording start button 104, the mobile phone 100 cannot record a video, and consequently cannot save a video that the user wants to record, and human-machine interaction performance is relatively poor.

SUMMARY

Embodiments of this application provide a shooting control method and a terminal. Even if a user forgets to tap a recording start button on a video recording viewfinder screen, the terminal can still record a video, thereby improving human-machine interaction performance of the terminal.

According to a first aspect, an embodiment of this application provides a shooting control method. The shooting control method may include: displaying, by a terminal, a first screen that is not a video recording viewfinder screen; receiving, by the terminal, a first operation of a user on the first screen; in response to the first operation, displaying a video recording viewfinder screen (namely, a second screen), starting to record a first video, and buffering the recorded first video; when the terminal detects a second operation of the user, stopping video recording, and displaying a third screen used to prompt the user to determine whether to save the first video; and saving or deleting the first video according to a selection operation of the user on the third screen. The second screen includes a recording start button, and the recording start button is used to trigger the terminal to start video recording.

In this embodiment of this application, in response to the first operation of the user on the first screen, the terminal may start to record the first video and buffer the recorded video while displaying the video recording viewfinder screen (namely, the second screen), instead of starting video recording after the user taps the recording start button on the second screen. In this way, even if the user forgets to tap the recording start button after the terminal displays the video recording viewfinder screen, the terminal can still automatically record a video, so that it can be avoided that a video image that the user wants to record cannot be recorded because the terminal detects no tap operation of the user on the recording start button. A video that the user wants to record can be saved, thereby improving human-machine interaction performance.

In addition, the terminal may further display the third screen in response to the second operation of the user, to indicate the user to determine whether to save the automatically recorded video. The user determines whether to save the automatically recorded video, so that the human-machine interaction performance of the terminal can be further improved, and shooting experience of the user can be enhanced.

According to a second aspect, an embodiment of this application provides a shooting control method. The shooting control method may include: displaying, by a terminal, a first screen that is not a video recording view finder screen; receiving, by the terminal, a first operation of a user on the first screen; displaying a video recording viewfinder screen (namely, a second screen) in response to the first operation; if the terminal receives no operation of the user within a first preset time period, or if the terminal receives an operation of the user within a first preset time period and the received operation is a third operation, starting, by the terminal, to record a first video, and buffering the recorded first video; if the terminal detects a second operation of the user, stopping video recording, and displaying a third screen used to prompt the user to determine whether to save the first video; and saving or deleting the first video according to a selection operation of the user on the third screen. The first preset time period is a preset time period from a moment at which a recording unit starts to record the first video.

In this embodiment of this application, the third operation is different from a tap operation of the user on a recording start button, and the third operation is different from the second operation. The third operation is an operation performed by the user on the terminal when the terminal displays the second screen (namely, the video recording viewfinder screen). The third operation does not trigger the terminal to close a camera application or leave a screen of the camera application (for example, switch the camera application to a background running state), does not trigger the terminal to start video recording, or does not trigger an operation of switching a display screen of the terminal from the video recording viewfinder screen to another screen.

It may be understood that the third operation does not trigger the terminal to close the camera application or leave the screen of the camera application, does not trigger the terminal to start video recording, or does not trigger the operation of switching the display screen of the terminal from the video recording viewfinder screen to another screen. Therefore, after the terminal executes, in response to the third operation, an event corresponding to the third operation, the terminal still displays the second screen, but some buttons on the screen may slightly change.

In this embodiment of this application, when the terminal displays the second screen, if the terminal receives no operation of the user within the first preset time period, or if an operation of the user received by the terminal within the first preset time period is the third operation, the terminal automatically starts to record the first video, instead of starting video recording after the user taps the recording start button on the second screen. In this way, even if the user forgets to tap the recording start button after the terminal displays the video recording viewfinder screen, the terminal can still automatically record a video, so that it can be avoided that a video image that the user wants to record cannot be recorded because the terminal detects no tap operation of the user on the recording start button. A video that the user wants to record can be saved, thereby improving human-machine interaction performance.

In addition, the terminal may further display the third screen in response to the second operation of the user, to indicate the user to determine whether to save the automatically recorded video. The user determines whether to save the automatically recorded video, so that the human-machine interaction performance of the terminal can be further improved, and shooting experience of the user can be enhanced.

With reference to the second aspect, in a possible design method, the second screen includes first prompt information. The first prompt information is used to indicate the user to tap the recording start button, to trigger the terminal to start video recording.

With reference to the second aspect, in another possible design method, the recording start button dynamically blinks and is displayed on the second screen. The dynamically blinking recording start button easily draws the user's attention and reminds the user to tap the recording start button.

With reference to the first aspect or the second aspect, in a possible design method, the terminal may receive an operation of the user within a second preset time period from the moment at which the terminal starts to record the first video. For example, the operation of the user may be a tap operation of the user on the recording start button.

The second preset time period is another preset time period from a moment at which the terminal starts to record the first video. The second preset time period is different from the first preset time period. Specifically, a start moment of the second preset time period is different from a start moment of the first preset time period. The start moment of the second preset time period is a moment at which the terminal starts to record the first video. A first preset moment is a moment at which the terminal starts to display the second screen. Duration of the second preset time period may be the same as or different from that of the second preset time period.

If the terminal receives the tap operation of the user on the recording start button within the second preset time period, it indicates that the user does not forget to tap the recording start button. In response to the tap operation of the user on the recording start button, the terminal may stop recording the first video, start to record a second video, and buffer the recorded second video.

With reference to the first aspect or the second aspect, in another possible design method, within the second preset time period from the moment at which the terminal starts to record the first video, the terminal may not receive any operation of the user, or the terminal may receive the third operation of the user. If the terminal receives no operation of the user within the second preset time period, or if the terminal receives an operation of the user within the second preset time period and the received operation is the third operation, it indicates that the user may forget to tap the recording start button. In this case, the terminal may continue to record the first video.

With reference to the first aspect or the second aspect, in another possible design method, if the terminal receives no operation of the user or receives only the third operation of the user within the second preset time period, the terminal may determine, based on a status of the terminal being held by the user, whether to continue to record the first video. Specifically, after the terminal starts to record the first video, the method in this embodiment of this application may further include: if the terminal receives no operation of the user within the second preset time period, or if the terminal receives an operation of the user within the second preset time period and the received operation is the third operation, the terminal may determine whether the status of the terminal being held by the user undergoes a change satisfying a preset condition; if the status of the terminal being held by the user undergoes the change satisfying the preset condition, the terminal detects whether the status of the terminal being held by the user remains within a preset range; and if the status of the terminal being held by the user remains within the preset range, the terminal continues to record the first video.

With reference to the first aspect or the second aspect, in another possible design method, if the status of the terminal being held by the user does not remain within the preset range, the terminal stops recording the first video, and displays the third screen, and the terminal saves or deletes the first video according to the selection operation of the user on the third screen.

In this embodiment of this application, in the foregoing solution, if the status of the terminal being held by the user remains within the preset range, it indicates that the status of the terminal being held by the user is a state in which the user shoots a photo or a video by using the terminal. In this case, the terminal may continue to record the first video. If the status of the terminal being held by the user does not remain within the preset range, it indicates that the status of the terminal being held by the user is not the state in which the user shoots a photo or a video by using the terminal. In this case, the terminal may stop recording the first video.

It may be understood that, if the terminal receives no tap operation of the user on the recording start button for a long time, the terminal may automatically determine, based on the status of the terminal being held by the user, whether to continue to perform video pre-recording. According to the foregoing solution, when the user completes video shooting and forgets to trigger the terminal to stop video shooting, the terminal may automatically stop video recording. In this way, it can be avoided that the terminal always records, due to negligence of the user, a video that is not required by the user, and power consumption of the terminal can be reduced. In addition, content of the terminal occupied by the terminal to record redundant videos can be reduced, thereby improving intelligence of the terminal.

With reference to the first aspect or the second aspect, in another possible design method, after the terminal continues to record the first video, the method in this embodiment of this application may further include: if the terminal receives a tap operation of the user on the recording start button after the second preset time period, stopping, by the terminal, recording the first video, and displaying the third screen; and saving or deleting, by the terminal, the first video according to a selection operation of the user on the third screen.

After automatically recording the first video, the terminal may receive the tap operation of the user on the recording start button after the second preset time period. In this case, the user may consider that the terminal has recorded a video image that the user wants to record, and want to end video recording. Therefore, the terminal may automatically perform an operation based on a common use habit of the user, to meet the users requirement, and use the tap operation of the user on the recording start button after the second preset time period as an operation for stopping recording the first video. In addition, in response to the tap operation of the user on the recording start button after the second preset time period, the terminal may display the third screen, to indicate the user to determine whether to save the first video. The terminal does not continue to record a video (for example, the second video) in response to the tap operation of the user on the recording start button within the second preset time period. Instead, the user determines whether to save the first video. In tins way, a service that meets the user's requirement can be provided for the user based on the user's requirement, so that the human-machine interaction performance of the terminal can be improved, and the shooting experience of the user can be enhanced.

With reference to the first aspect or the second aspect, in another possible design method, the third screen may include a video play control. The play control may be used to play the first video. After the terminal displays the third screen, and before the terminal saves or deletes the first video according to the selection operation of the user on the third screen, the terminal receives a tap operation of the user on the play control, and the terminal may play the first video by using the play control in response to the tap operation of the user on the play control. In this way, the user may preview the first video before determining to delete or save the first video.

According to a third aspect, an embodiment of this application provides a shooting control method. The shooting control method may include: displaying, by a terminal, a first screen that is not a video recording viewfinder screen; receiving, by the terminal, a first operation of a user on the first screen; in response to the first operation, displaying a video recording viewfinder screen (namely, a second screen), starting to record a first video, and buffering the recorded first video; and if the terminal receives a tap operation of the user on a recording start button within a first preset time period, stopping, by the terminal, recording the first video, deleting the recorded first video, starting to record a second video, and buffering the recorded second video.

It may be understood that, if the terminal receives the tap operation of the user on the recording start button within the first preset time period from a moment at which the terminal starts to record the first video, it indicates that a video that is recorded by the terminal starting from the tap operation of the user on the recording start button is a video image that the user wants to record. Based on this, based on a user requirement, to provide a service that meets the user requirement for the user, in response to the tap operation of the user on the recording start button within the first preset time period, the terminal may stop recording the first video, and delete the recorded first video.

According to a fourth aspect, an embodiment of this application provides a shooting control method. The shooting control method may include: displaying, by a terminal, a first screen that is not a video recording viewfinder screen; receiving, by the terminal, a first operation of a user on the first screen; displaying a video recording viewfinder screen (namely, a second screen) in response to the first operation, where the second screen includes a recording start button; performing, by the terminal, countdown on the second screen; if the terminal receives no operation before the countdown ends, or if the terminal receives an operation before the countdown ends and the received operation is a third operation, automatically starting, by the terminal, to record a first video; if the terminal detects a second operation of the user, in response to the detected second operation, stopping video recording, and displaying a third screen used to prompt the user to determine whether to save the first video; and saving or deleting the first video according to a selection operation of the user on the third screen. The first preset time period is a preset time period from a moment at which a recording unit starts to record the first video.

The terminal starts the countdown from a moment at which the terminal starts to display the second screen. When the countdown ends, if the terminal still receives no tap operation of the user on the recording start button or receives only the third operation, the user may forget to tap the recording start button. In this case, the terminal may automatically start to record the first video, so that it can be avoided that a video image that the user wants to record cannot be recorded because the terminal detects no tap operation of the user on the recording start button. A video that the user wants to record can be saved, thereby improving human-machine interaction performance.

With reference to the fourth aspect, in a possible design method, if the terminal receives a shake operation of the user on the terminal before the countdown ends, the terminal stops the countdown in response to the shake operation of the user on the terminal.

With reference to the fourth aspect, in another possible design method, if the terminal receives the tap operation of the user on the recording start button before the countdown ends, in response to the tap operation of the user on the recording start button, the terminal stops the countdown, starts to record a second video, and buffers the recorded second video.

According to a fifth aspect, an embodiment of this application provides a terminal. The terminal includes a display unit, an input unit, a recording unit, a deletion unit, and a storage unit. The display unit is configured to display a first screen, where the first screen is not a video recording viewfinder screen. The input unit is configured to receive a first operation of a user on the first screen. The display unit is further configured to display a second screen in response to the first operation received by the input unit, where the second screen is a video recording viewfinder screen, the second screen includes a recording start button, and the recording start button is used to trigger the terminal to start video recording. The recording unit is configured to start to record a first video in response to the first operation received by the input unit. The storage unit is configured to buffer the first video recorded by the recording unit. The input unit is further configured to detect a second operation of the user.

The recording unit is further configured to: if the input unit detects the second operation, stop video recording in response to the second operation detected by the input unit. The display unit is further configured to display, in response to the second operation detected by the input unit, a third screen that is used to prompt the user to determine whether to save the first video. The input unit is further configured to receive a selection operation of the user on the third screen. The deletion unit is configured to delete the first video when the selection operation received by the input unit triggers the terminal to delete the first video. The storage unit is configured to save the first video when the selection operation received by the input unit triggers the terminal to save the first video.

According to a sixth aspect, an embodiment of this application provides a terminal. The terminal includes a display unit, an input unit, a recording unit, a deletion unit, and a storage unit. The display unit is configured to display a first screen, where the first screen is not a video recording viewfinder screen. The input unit is configured to receive an operation of a user. For example, the input unit may be configured to receive a first operation of the user on the first screen. The display unit is further configured to display a second screen in response to the first operation received by the input unit, where the second screen is a video recording viewfinder screen, the second screen includes a recording start button, and the recording start button is used to trigger the terminal to start video recording. The recording unit is configured to: if the input unit receives no operation of the user within the first preset time period, or if the input unit receives an operation of the user within the first preset time period and the received operation is a third operation, start to record a first video. The storage unit is configured to buffer the first video recorded by the recording unit. The input unit is further configured to detect a second operation of the user. The recording unit is further configured to: if the input unit detects the second operation, stop video recording in response to the second operation detected by the input unit. The display unit is further configured to display, in response to the second operation detected by the input unit, a third screen that is used to prompt the user to determine whether to save the first video. The input unit is further configured to receive a selection operation of the user on the third screen. The deletion unit is configured to delete the first video when the selection operation received by the input unit triggers the terminal to delete the first video. The storage unit is configured to save the first video when the selection operation received by the input unit triggers the terminal to save the first video. In this embodiment of this application, the third operation is different from a tap operation of the user on the recording start button, and the third operation is different from the second operation.

With reference to the sixth aspect, in a possible design method, the second screen may include first prompt information. The first prompt information is used to indicate the user to tap the recording start button, to trigger the terminal to start video recording. Alternatively, the recording start button dynamically blinks and is displayed on the second screen.

With reference to the fifth aspect or the sixth aspect, in a possible design method, the recording unit is further configured to: after starting to record the first video, if the input unit receives a tap operation of the user on the recording start button within a second preset time period, in response to the tap operation of the user on the recording start button, stop recording the first video, and start to record a second video. The storage unit is configured to buffer the second video recorded by the recording unit.

With reference to the fifth aspect or the sixth aspect, in another possible design method, the recording unit is further configured to: after starting to record the first video, if the input unit receives no operation of the user within the second preset time period, or if the input unit receives an operation of the user within the second preset time period and the received operation is the third operation, continue to record the first video.

With reference to the fifth aspect or the sixth aspect, in another possible design method, the terminal further includes a detection unit. The detection unit is configured to: after the first video starts to be recorded, if the input unit receives no operation of the user within the second preset time period, or if the input unit receives an operation of the user within the second preset time period and the received operation is the third operation, detect whether a status of the terminal being held by the user undergoes a change satisfying a preset condition. The detection unit is further configured to: if it is detected that the status of the terminal being held by the user undergoes the change satisfying the preset condition, detect whether the status of the terminal being held by the user remains within a preset range. The recording unit is further configured to: if the detection unit detects that the status of the terminal being held by the user remains within the preset range, continue to record the first video.

With reference to the fifth aspect or the sixth aspect, in another possible design method, the recording unit is further configured to: if the detection unit detects that the status of the terminal being held by the user does not remain within the preset range, stop recording the first video. The display unit is further configured to display the third screen if the detection unit detects that the status of the terminal being held by the user does not remain within the preset range.

With reference to the fifth aspect or the sixth aspect, in another possible design method, the recording unit is further configured to: if the input unit receives a tap operation of the user on the recording start button after the second preset time period, stop recording the first video. The display unit is further configured to: if the input unit receives the tap operation of the user on the recording start button after the second preset time period, display the third screen.

With reference to the fifth aspect or the sixth aspect, in another possible design method, the third screen may further include a video play control. The terminal may further include a play unit. The input unit is further configured to: after the display unit displays the third screen, and before the input unit receives the selection operation performed by the user on the third screen, receive a tap operation of the user on the play control. The play unit is configured to play the first video by using the play control in response to the tap operation of the user on the play control.

According to a seventh aspect, an embodiment of this application provides a terminal. The terminal includes one or more processors, a memory, a display, and a camera, the memory, the display, and the camera are coupled to the processor, the display is configured to display a screen and receive a touch operation of a user, the camera is configured to collect an image to record a video, the memory includes a non-volatile storage medium, the memory is configured to store computer program code, the computer program code includes a computer instruction, and when the processor executes the computer instruction, the terminal is enabled to perform the following operations: The display is configured to display a first screen, where the first screen is not a video recording viewfinder screen; the processor is configured to: in response to a first operation of a user on a first screen displayed on the display, control the display to display a second screen, start to record a first video by using the camera, and buffer the recorded first video in the memory, where the second screen includes a recording start button, and the recording start button is used to trigger the processor to start video recording; and the processor is further configured to: if a second operation of the user is detected, in response to the second operation, stop video recording, and control the display to display a third screen, where the third screen is used to prompt the user to determine whether to save the first video; receive a selection operation of the user on the third screen displayed by the display; and according to the selection operation of the user on the third screen save the first video in the memory or delete the first video buffered in the memory.

According to an eighth aspect, an embodiment of this application provides a terminal. The terminal includes one or more processors, a memory, a display, and a camera, the memory, the display, and the camera are coupled to the processor, the display is configured to display a screen and receive a touch operation of a user, the camera is configured to collect an image to record a video, the memory includes a non-volatile storage medium, the memory is configured to store computer program code, the computer program code includes a computer instruction, and when the processor executes the computer instruction, the terminal is enabled to perform the following operations: The display is configured to display a first screen, where the first screen is not a video recording viewfinder screen; the processor is configured to: in response to a first operation of the user on the first screen displayed by the display, control display to display a second screen, where the second screen includes a recording start button, and the recording start button is used to trigger the terminal to start video recording; and the processor is further configured to: if the terminal receives no operation of the user within a first preset time period, or if the terminal receives an operation of the user within a first preset time period and the received operation is a third operation, start to record a first video by using the camera, and buffer the recorded first video in the memory, the first preset time period is a preset time period from a moment at which the terminal starts to record the first video; and the processor is further configured to: if a second operation of the user is detected, in response to the second operation, stop video recording, and control the display to display a third screen, where the third screen is used to prompt the user to determine whether to save the first video; receive a selection operation of the user on the third screen displayed by the display; and according to the selection operation of the user on the third screen, save the first video in the memory or delete the first video buffered in the memory, where the third operation is different from a tap operation of the user on the recording start button, and the third operation is different from the second operation.

With reference to the eighth aspect, in a possible design method, the second screen displayed by the display includes first prompt information, and the first prompt information is used to indicate the user to tap the recording start button, to trigger the terminal to start video recording. Alternatively, the recording start button dynamically blinks and is displayed on the second screen.

With reference to the seventh or the eighth aspect, in a possible design method, the processor is further configured to: after starting to record the first video by using the camera, if a tap operation of the user on the recording start button is received within a second preset time period, in response to the tap operation of the user on the recording start button, stop recording the first video, start to record a second video by using the camera, and buffer the recorded second video in the memory, where the second preset time period is a preset time period from the moment at which the terminal starts to record the first video.

With reference to the seventh aspect or the eighth aspect, in another possible design method, the processor is further configured to: after starting to record the first video by using the camera, if no operation of the user is received within the second preset time period, or if an operation of the user is received within the second preset time period and the received operation is the third operation, continue to record the first video by using the camera.

With reference to the seventh aspect or the eighth aspect, in another possible design method, the processor is further configured to: after starting to record the first video by using the camera, if no operation of the user is received within the second preset time period or if an operation of the user is received within the second preset time period and the received operation is the third operation, determine whether a status of the terminal being held by the user undergoes a change satisfying a preset condition; if the status of the terminal being held by the user undergoes the change satisfying the preset condition, detect whether the status of the terminal being held by the user remains within a preset range; and if the status of the terminal being held by the user remains within the preset range, continue to record the first video by using the camera.

With reference to the seventh aspect or the eighth aspect, in another possible design method, the processor is further configured to: if the status of the terminal being held by the user does not remain within the preset range, stop recording the first video, and control the display to display the third screen.

With reference to the seventh aspect or the eighth aspect, in another possible design method, the processor is further configured to: after continuing to record the first video by using the camera, if a tap operation of the user on the recording start button is received after the second preset time period, stop recording the first video, and control the display to display the third screen.

With reference to the seventh aspect or the eighth aspect, in another possible design method, the third screen displayed by the display includes a video play control. The processor is further configured to: after the display displays the third screen, and before the processor saves or deletes the first video according to the selection operation of the user on the third screen, receive a tap operation of the user on the play control, and in response to the tap operation of the user on the play control, control the display to play the first video by using the play control.

It should be noted that for detailed descriptions of the third operation, the first preset time period, and the second preset time period in the fifth aspect to the eighth aspect and the possible design methods of the fifth aspect to the eighth aspect in the embodiments of this application, reference may be made to the descriptions in the first aspect or the second aspect and the possible design methods of the first aspect and the second aspect. Details are not described in this embodiment of this application again.

According to a ninth aspect, an embodiment of this application provides a graphical user interface (Graphical User Interface, GUI). The GUI is stored in a terminal, the terminal includes one or more processors, a display, a memory, and a camera, and the one or more processors are configured to execute one or more computer programs stored in the memory. The graphical user interface includes: a first GUI, where the first GUI is a photographing viewfinder screen; a second GUI displayed on the display in response to a first operation on the first GUI, where the second GUI is a video recording viewfinder screen, the second GUI includes a recording start button, and the recording start button is used to trigger the terminal to start video recording; and a third GUI displayed on the display in response to a second operation after recording of a first video starts, where the third GUI is used to indicate the user to determine whether to save the first video.

According to a tenth aspect, an embodiment of this application provides a computer storage medium. The computer storage medium includes a computer instruction, and when the computer instruction is run on a terminal, the terminal is enabled to perform the shooting control method according to the first aspect or the second aspect and the possible designs of the first aspect or the second aspect.

According to an eleventh aspect, an embodiment of this application provides a computer program product. When the computer program product is run on a computer, the computer is enabled to perform the shooting control method according to the first aspect or the second aspect and the possible designs of the first aspect or the second aspect.

It may be understood that, the terminals in the fifth aspect to the eighth aspect and the possible design methods thereof, the GUI in the ninth aspect, the computer storage medium in the tenth aspect, and the computer program product in the eleventh aspect provided above are all configured to perform the corresponding methods provided above. Therefore, for beneficial effects that the terminals, the GUI, the computer storage medium, and the computer program product can achieve, refer to beneficial effects in the corresponding methods provided above. Details are not described again herein.

BRIEF DESCRIPTION OF DRAWINGS

FIG. 1(a) and FIG. 1(b) are a schematic diagram 1 of an example of a terminal screen according to an embodiment of this application;

FIG. 5A(1) to FIG. 5A(3) are a schematic diagram 3 of an example of a terminal screen according to an embodiment of this application:

FIG. 6B(1) and FIG. 6B(2) are schematic diagrams 2 of a time sequence in a shooting control method according to an embodiment of this application;

FIG. 6C(1) and FIG. 6C(2) are a schematic diagram 4 of an example of a terminal screen according to an embodiment of this application;

FIG. 9(a) to FIG. 9(c) are a schematic diagram 7 of an example of a terminal screen according to an embodiment of this application;

FIG. 10A(1) and FIG. 10A(2) are a flowchart 3 of a shooting control method according to an embodiment of this application;

FIG. 10B(1) to FIG. 10B(3) are a schematic diagram 8 of an example of a terminal screen according to an embodiment of this application;

FIG. 10C(1) and FIG. 10C(2) are schematic diagrams 3 of a time sequence in a shooting control method according to an embodiment of this application;

FIG. 12(a-1) to FIG. 12(c) are a schematic diagram 9 of an example of a terminal screen according to an embodiment of this application;

FIG. 16(a) to FIG. 16(d) are a schematic diagram 10 of an example of a terminal screen according to an embodiment of this application;

DESCRIPTION OF EMBODIMENTS

The following terms "first" and "second" are merely intended for description, and shall not be understood as an indication or implication of relative importance or implicit indication of a quantity of indicated technical features. Therefore, a feature limited by "first" or "second" may explicitly or implicitly include one or mom features. In the description of this application, unless otherwise stated, "a plurality of" means two or more than two.

The embodiments of this application provide a shooting control method. The method may be applied to a terminal on which a camera is configured. In the embodiments of this application, video recording performed by the terminal is also referred to as video recording. According to the method provided in the embodiments of this application, when displaying a video recording viewfinder screen in response to an operation of a user, the terminal may automatically start video recording, instead of starting video recording in response to a tap operation of the user on a recording start button on the video recording viewfinder screen after displaying the video recording viewfinder screen. In this way, it can be avoided that, because the user forgets to tap the recording start button, the terminal cannot record and save a video that the user wants to record. According to the method provided in the embodiments of this application, intelligence of the terminal can be improved, efficient interaction between the terminal and the user can be implemented, and human-machine interaction performance can be improved.

It should be noted that the terminal in the embodiments of this application may be various devices on which a camera is configured. For example, the terminal may be a device having a shooting function, such as a mobile phone, a wearable electronic device (for example, a smart watch), an instant camera, a tablet computer, a desktop computer, a laptop computer, a handheld computer, a notebook computer, an ultra-mobile personal computer (Ultra-mobile Personal Computer. UMPC), a netbook, a cellular phone, a personal digital assistant (Personal Digital Assistant, PDA), a tablet computer, an augmented reality (augmented reality, AR)/a virtual reality (virtual reality, VR) device, or an in-vehicle computer. A specific form of the device is not specially limited in the embodiments of this application.

Figure 2:
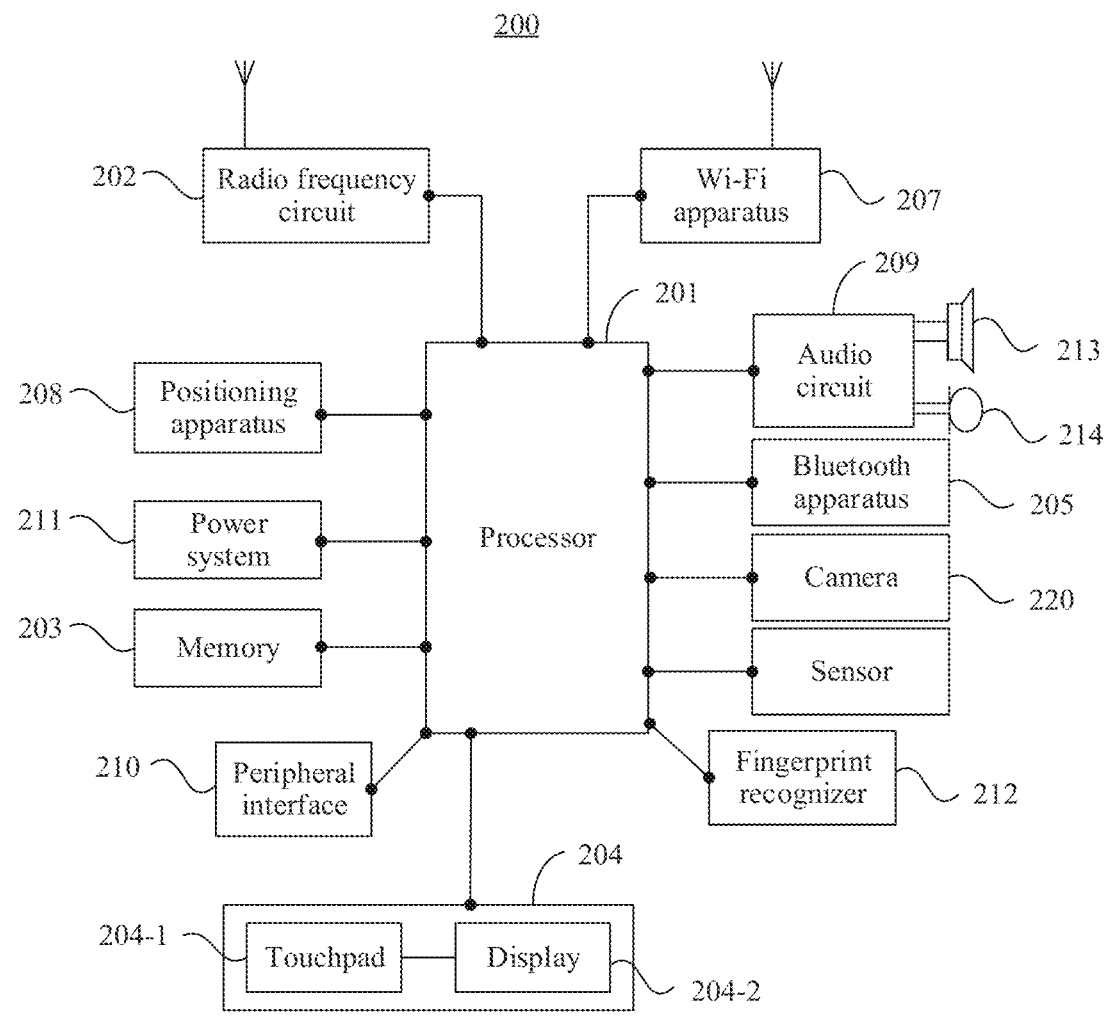
FIG. 2 is a schematic diagram of a hardware stricture of a mobile phone according to an embodiment of this application.

As shown in FIG. 2, a mobile phone 200 is used as an example of the terminal. The mobile phone 200 may specifically include components such as a processor 201, a radio frequency (Radio Frequency, RF) circuit 202, a memory 203, a touchscreen 204, a Bluetooth apparatus 205, one or more sensors 206, a Wi-Fi apparatus 207, a positioning apparatus 208, an audio circuit 209, a peripheral interface 210, and a power system 211. These components may communicate with each other by using one or more communications buses or signal lines (not shown in FIG. 2). A person skilled in the art may understand that a hardware structure shown in FIG. 2 does not constitute a limitation on the mobile phone, and the mobile phone 200 may include more or fewer components than those shown in the figure, or some components may be combined, or different component configurations may be used.

The following describes the components of the mobile phone 200 in detail with reference to FIG. 2.

The processor 201 is a control center of the mobile phone 200. The processor 201 is connected to parts of the mobile phone 200 by using various interfaces and lines, runs or executes an application program (for example, a camera application) stored u the memory 203, and invokes data stored in the memory 203, to perform various functions (for example, video recording) of the mobile phone 200 and process data (for example, save or delete data of a recorded video). In some embodiments, the processor 201 may include one or more processing units. In some embodiments of this application, the processor 201 may further include a fingerprint verification chip, configured to verify a collected fingerprint.

The radio frequency circuit 202 may be configured to receive and send a radio signal. Particularly, after receiving downlink data from a base station, the radio frequency circuit 202 may send the downlink data to the processor 201 for processing. In addition, the radio frequency circuit 202 sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 202 may further communicate with another device through wireless communication. Any communications standard or protocol may be used for the wireless communication, and includes but is not limited to a global system for mobile communications, a general packet radio service, long term evolution, and the like.

The memory 203 is configured to store the application program and the data. The processor 201 performs various functions of the mobile phone 200 and data processing by running the application program and the data that are stored in the memory 203. The memory 203 mainly includes a program storage area and a data storage area. The program storage area may store an operating system, and an application program required by at least one function (for example, a sound play function or an image play function). The data storage area may store data (for example, audio data, video data, or a phone book) created based on use of the mobile phone 200. In addition, the memory 203 may include a high-speed random access memory (Random Access Memory, RAM), or may include a nonvolatile memory such as a magnetic disk storage device, a flash memory device, or another volatile solid-state storage device. The memory 203 may store various operating systems. The memory 203 may be standalone, and is connected to the processor 201 by using the communications bus; or the memory 203 may be integrated with the processor 201.

The touchscreen 204 may specifically include a touchpad 204-1 and a display 204-2.

The touchpad 204-1 may collect a touch event performed by a user on or near the mobile phone 200 (for example, a tap, a double tap, touch and hold, or a slide operation performed by the user on the touchpad 204-1 or near the touchpad 204-1 by using any suitable object such as a finger or a stylus such), and send collected touch information to another component (such as the processor 201). The touch event performed by the user near the touchpad 204-1 may be referred to as a floating touch. The floating touch may mean that the user does not need to directly touch the touchpad to select, move, or drag an object (for example, an icon), but the user only needs to be located near a device for ease of preforming a required function. In addition, the touchpad 204-1 may be implemented in a plurality of ty pes such as a resistive type, a capacitive type, an infrared type, and a surface acoustic wave type.

The display (or referred to as a display) 204-2 may be configured to display information entered by the user or information provided for the user, and various menus of the mobile phone 200. The display 204-2 may be configured in a form such as a liquid crystal display or an organic light emitting diode. The touchpad 204-1 may cover the display 204-2. When detecting a touch event on or near the touchpad 204-1, the touchpad 204-1 transfers the touch event to the processor 201 to determine a type of the touch event. Then, the processor 201 may provide a corresponding visual output (such as a viewfinder screen) on the display 204-2 based on the type of the touch operation. Although in FIG. 2, the touchpad 204-1 and the display 204-2 are used as two independent components to implement input and output functions of the mobile phone 200, in some embodiments, the touchpad 204-1 and the display 204-2 may be integrated to implement the input and output functions of the mobile phone 200. It may be understood that the touchscreen 204 is formed by stacking a plurality of layers of materials. Only the touchpad (layer) and the display (layer) are presented in the embodiments of this application, and other layers am not recorded in the embodiments of this application. In addition, the touchpad 204-1 may be configured on a front side of the mobile phone 200 in a full panel form, and the display 204-2 may also be configured on the front side of the mobile phone 200 in a full panel form. In this way, a bezel-less structure can be implemented on the front side of the mobile phone.

The touchscreen 204 of the mobile phone 200 may include a navigation bar (Navigation Bar), which is not shown in the figure. The navigation bar is usually displayed at the bottom of the screen of the mobile phone as a virtual button. The navigation bar contains, by default, three buttons: a back button, a home button, and a recent (Recent)

button. The back button is used to return to a previous screen. The home button is used to return to a home screen. The recent button is used to display a recently used application. For example, as shown in FIG. 1(a), a navigation bar 120 includes a back button 121, a home button 122, and a recent button 123.

It should be noted that the navigation bar is optional, and the touchscreen 204 of the mobile phone 200 may not include the navigation bar. The mobile phone 200 may implement a function of the navigation bar by using another virtual button.

In addition, the mobile phone 200 may further have a fingerprint recognition function. For example, a fingerprint recognizer 212 may be configured on a rear side (for example, below a rear-facing camera) of the mobile phone 200, or a fingerprint recognizer 212 is configured on a front side (for example, below the touchscreen 204) of the mobile phone 200. For another example, a fingerprint recognizer 212 may be configured in the touchscreen 204 to implement the fingerprint recognition function. To be specific, the fingerprint recognizer 212 may be integrated with the touchscreen 204 to implement the fingerprint recognition function of the mobile phone 20. In this case, the fingerprint recognizer 212 is configured in the touchscreen 204, and may be a part of the touchscreen 204, or may be configured in the touchscreen 204 in another manner. A main component of the fingerprint recognizer 212 in the embodiments of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 200 may further include the Bluetooth apparatus 205, configured to exchange data between the mobile phone 200 and another short-range device (for example, a mobile phone or a smart watch). In the embodiments of this application, the Bluetooth apparatus may be an integrated circuit, a Bluetooth chip, or the like.

The mobile phone 200 may further include at least one sensor 206, such as a light sensor, a motion sensor, and another sensor. Specifically, the optical sensor may include an ambient light sensor and a proximity sensor. The ambient light sensor may adjust luminance of the display of the touchscreen 204 based on ambient light intensity. The proximity sensor may power off the display when the mobile phone 200 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between landscape mode and portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured on the mobile phone 200. Details are not described herein.

The Wi-Fi apparatus 207 is configured to provide the mobile phone 200 with network access that complies with a Wi-Fi-related standard or protocol. The mobile phone 200 may access a Wi-Fi hotspot by using the Wi-Fi apparatus 207, to help the user send and receive an email, browse a web page, access streaming media, and the like. The Wi-Fi apparatus 207 provides wireless broadband internet access for the user. In other embodiments, the Wi-Fi apparatus 207 may also be used as a Wi-Fi wireless access point, and may provide Wi-Fi network access for another device.

The positioning apparatus 208 is configured to provide a geographic location for the mobile phone 200. It may be understood that the positioning apparatus 208 may be specifically a receiver of a positioning system such as a global positioning system (Global Positioning System, GPS), a BeiDou navigation satellite system, or Russian GLONASS. After receiving a geographic location sent by the positioning system, the positioning apparatus 208 sends the information to the processor 201 for processing, or sends the information to the memory 203 for storage. In some other embodiments, the positioning apparatus 208 may alternatively be a receiver of an assisted global positioning system (Assisted Global Positioning System, AGPS). The AGPS system serves as an assisted server to assist the positioning apparatus 208 in completing ranging and positioning services. In this case, the assisted positioning server communicates with a device such as the positioning apparatus 208 (namely, a GPS receiver) of the mobile phone 200 through a wireless communications network, to provide positioning assistance. Alternatively, in other embodiments, the positioning apparatus 208 may be a positioning technology based on a Wi-Fi hotspot. Because each Wi-Fi hotspot has a globally unique media access control (Media Access Control, MAC) address, when Wi-Fi is enabled, the device may scan and collect broadcast signals of nearby Wi-Fi hotspots. Therefore, the MAC address broadcast by the Wi-Fi hotspot may be obtained. The device sends, to a location server by using the wireless communications network, data (for example, the MAC address) that can be used to mark the Wi-Fi hotspot. The location server retrieves a geographic location of each Wi-Fi hotspot, calculates a geographic location of the device with reference to strength of the broadcast Wi-Fi signals, and sends the geographic location to the positioning apparatus 208 of the device.

The audio circuit 209, a loudspeaker 213, and a microphone 214 may provide an audio interface between the user and the mobile phone 200. The audio circuit 209 may transmit, to the loudspeaker 213, an electrical signal converted from received audio data, and the loudspeaker 213 converts the electrical signal into a sound signal for output (for example, making a video recording prompt tone, making a photographing prompt tone, or playing audio). In addition, the microphone 214 converts a collected sound signal into an electrical signal. The audio circuit 209 receives the electrical signal, converts the electrical signal into audio data, and then outputs the audio data to the RF circuit 202, to send the audio data to, for example, another mobile phone, or outputs the audio data to the memory 203 for further processing.

The peripheral interface 210 is configured to provide various interfaces for an external input/output device (for example, a keyboard, a mouse, a display externally connected to the mobile phone 200, an external memory, or a subscriber identification module card). For example, the peripheral interface 210 is connected to the mouse by using a universal serial bus (Universal Serial Bus, USB) interface, and is connected, by using a metal contact on a card slot of the subscriber identification module card, to the subscriber identification module (Subscriber Identification Module, SIM) card provided by a telecommunications operator. The peripheral interface 210 may be configured to couple the external input/output peripheral device to the processor 201 and the memory 203.

In the embodiments of the present invention, the mobile phone 200 may communicate with another device in a device group by using the peripheral interface 210, for example, may receive, through the peripheral interface 210, to-be-displayed data sent by another device and display the data. This is not limited m the embodiments of the present invention.

The mobile phone 200 may further include the power apparatus 211 (for example, a battery and a power management chip) that supplies power to the components. The battery may be logically connected to the processor 201 by using the power management chip, to implement functions such as charging management, discharging management, and power consumption management by using the power apparatus 211.

Although not shown in FIG. 2, the mobile phone 200 includes a camera 220 (a front-facing camera and/or a rear-facing camera), and may further include a flash, a micro projection apparatus, a near field communication (Near Field Communication. NFC) apparatus, and the like. Details are not described herein.

All methods in the following embodiments may be implemented on the mobile phone 200 having the foregoing hardware structure.

In the embodiments of this application, a display screen of the mobile phone 100 shown in FIG. 1(*a*) and FIG. 1(*b*) is used as an example herein to describe a "photographing viewfinder screen" and a "video recording viewfinder screen (namely, a second screen)" in the embodiments of this application.

FIG. 1(*a*) shows an example of a photographing viewfinder screen according to an embodiment of this application. As shown in FIG. 1(*a*), a photographing viewfinder screen 101 may include a flash option 106, a filter option 107, a viewfinder frame 108, a "video" option 102, a "photo" option 109, a "panoramic" option 110, an album option 111, a photographing button 105, and a camera switching option 112.

The flash option 106 is used to trigger the terminal to turn on or turn off a flash when the terminal is shooting a photo. The filter option 107 is used to select a shooting style that needs to be used when the terminal is shooting a photo. The shooting style may include: a standard style, a fresh style, a blue style, a black and white style, and the like. When the terminal shoots photos in different shooting styles, different shooting parameters are used. The shooting parameters may include a color contrast, saturation, sharpness, an aperture, an exposure, and the like. The viewfinder frame 108 is used to display a preview image captured by a camera. The "video" option 102 is used to trigger the mobile phone 100 to display a video recording viewfinder screen 103. The "photo" option 109 is used to trigger the mobile phone 100 to display the photographing viewfinder screen 101. The "panoramic" option 110 is used to trigger the mobile phone 100 to display a viewfinder screen used by the mobile phone 100 to shoot a panoramic photo. The viewfinder screen used by the mobile phone 100 to shoot the panoramic photo is not shown in the figure. The album option 111 is used to display a photo or a video recently shot by the mobile phone 100. For example, it is assumed that the mobile phone 100 recently shoots a photo of two persons holding hands. As shown in FIG. 1(*a*), the photo of the two persons holding hands is displayed on the album option 111. The photographing button 105 is used to trigger the mobile phone 100 to shoot a photo. The camera switching option 112 is used to trigger the mobile phone 100 to switch to a front-facing camera or a rear-facing camera to collect an image.

FIG. 1(*b*) shows an example of a video recording viewfinder screen according to an embodiment of this application. As shown in FIG. 1(*b*), a video recording viewfinder screen 103 may include a flash option 113, a timing option 114, a viewfinder frame 115, a "panoramic" option 110, a "video" option 102, a "photo" option 109, an album option 111, a recording start button 104, and a camera switching option 112.

The flash option 113 is used to trigger the terminal to turn on or turn off a flash when the terminal is recording a video. The timing option 114 is used to perform timing in a time period from starting video recording by the mobile phone 100 to ending video recording by the mobile phone 100, and display duration of a video recorded by the mobile phone 100. The viewfinder frame 115 is used to display a preview image captured by the camera. The recording start button 104 is used to trigger the mobile phone 100 to start video recording.

It should be noted that the photographing viewfinder screen and the video recording viewfinder screen each include but are not limited to the foregoing options and buttons. For example, the photographing viewfinder screen 101 may further include a high dynamic range (High Dynamic Range, HDR) option (not shown in the figure). In addition, a layout of the foregoing options and buttons in the photographing viewfinder screen or the video recording viewfinder screen includes but is not limited to a layout shown in FIG. 1(*a*) and FIG. 1(*b*). For example, a photographing viewfinder screen shown in FIG. 4(*a*) is different from the photographing viewfinder screen shown in FIG. 1(*a*), and a video recording viewfinder screen shown in FIG. 4(*b*) is different from the video recording viewfinder screen shown in FIG. 1(*b*).

Figure 3:
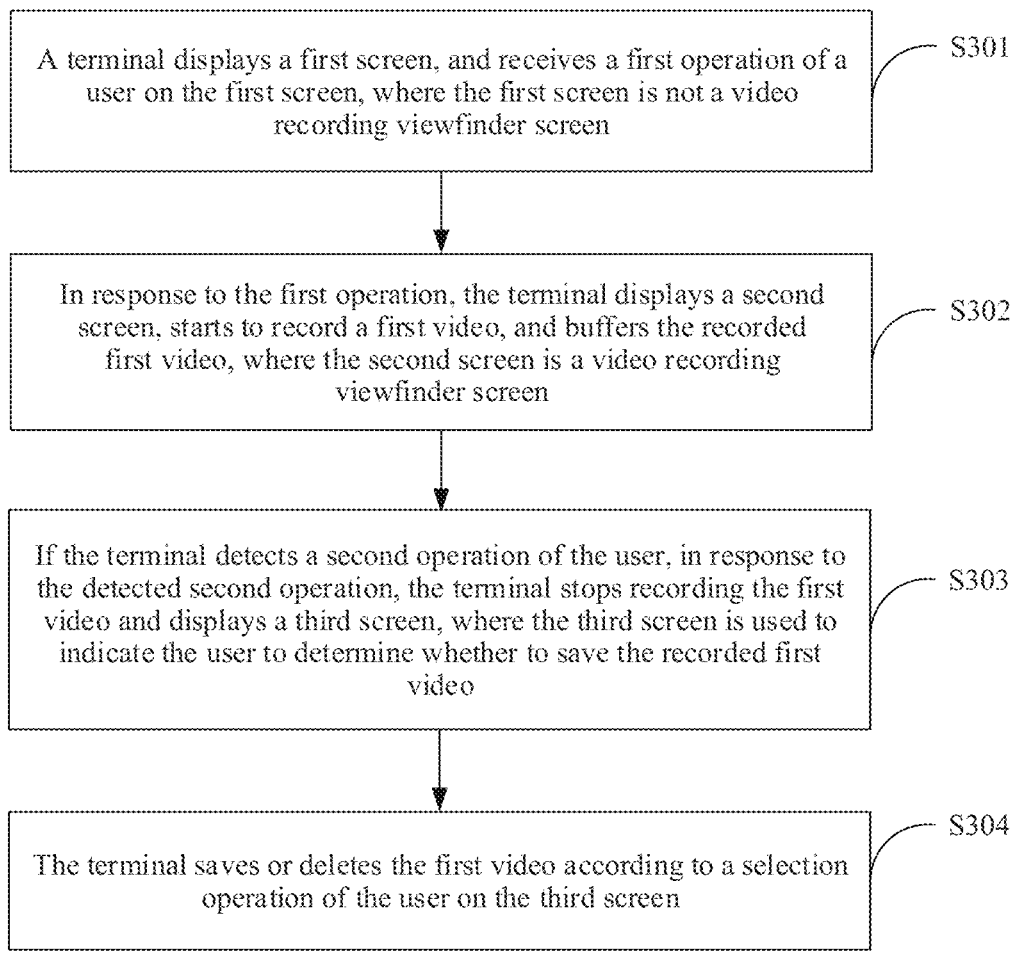
FIG. 3 is a flowchart 1 of a shooting control method according to an embodiment of this application.

For example, in an embodiment of the present invention, an example in which a user uses a terminal including a camera to record a video is used to describe a shooting control method provided in this embodiment of the present invention. Specifically, as shown in FIG. 3, the shooting control method provided in this embodiment of the present invention may include S301 to S304.

S301. A terminal displays a first screen, and receives a first operation of a user on the first screen. The first screen is not a video recording viewfinder screen.

S302. In response to the first operation, the terminal displays a second screen, starts to record a first video, and buffers the recorded first video. The second screen is a video recording viewfinder screen.

For some terminals, in response to a tap operation of the user on a "camera" application icon, the terminals display a photographing viewfinder screen by default. In this case, the first screen is a photographing viewfinder screen.

For example, the terminal is the mobile phone 100 shown in FIG. 1(*a*) and FIG. 1(*b*) or FIG. 4(*a*) to FIG. 4(*c*). The mobile phone 100 may display the photographing viewfinder screen 101 shown in FIG. 1(*a*), namely, the first screen, in response to the tap operation of the user on the "camera" application icon. For another example, the mobile phone 100 may display a photographing viewfinder screen 401 shown in FIG. 4(*a*), namely, the first screen, in response to the tap operation of the user on the "camera" application icon.

The photographing viewfinder screen (namely the first screen) includes a "video" option. In this case, the first operation may be an operation of the user on the "video" option on the photographing viewfinder screen. In response to the operation of the user on the "video" option, the terminal may display the second screen, namely, the video recording viewfinder screen. The "video" option is used to trigger to switch a display screen of the terminal from the "photographing viewfinder screen (namely, the first screen)" to the "video recording viewfinder screen (namely, the second screen)".

For example, the "video" option 102 shown in FIG. 1(a) is an example of the "video" option provided in this embodiment of this application. The first operation may be an operation of the user on the "video" option, for example, a tap operation or a right-slide operation of the user on the "video" option 102. In an example in which the first operation is the tap operation of the user on the "video" option 102, in response to the tap operation of the user on the "video" option 102 shown in FIG. 1(a), the mobile phone 100 may display the video recording viewfinder screen 103 shown in FIG. 1(b).

Figure 4A:
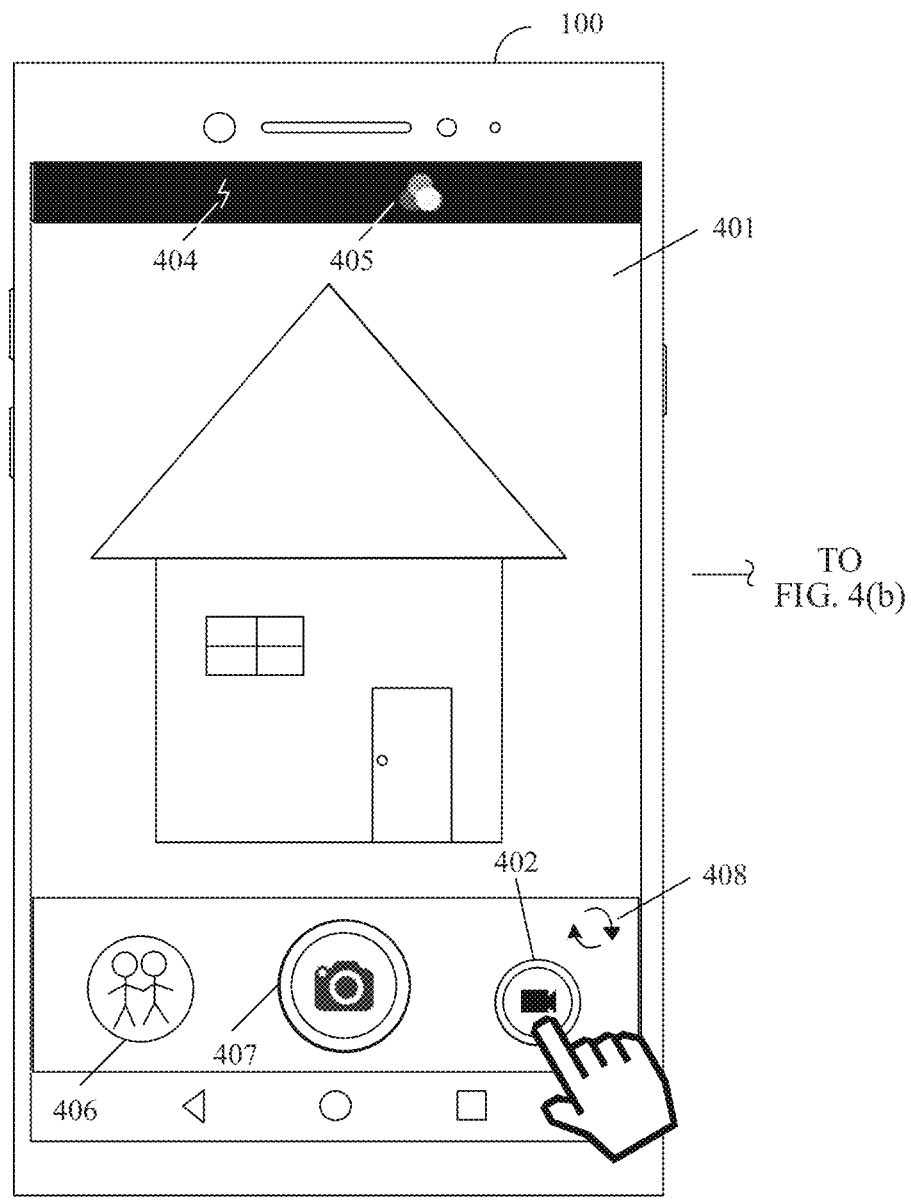
FIG. 4(a) to FIG. 4(c) are a schematic diagram 2 of an example of a terminal screen according to an embodiment of this application.

For another example, a "video" option 402 shown in FIG. 4(a) is another example of the "video" option provided in this embodiment of this application. The "video" option 402 is used to trigger the terminal to display the video recording viewfinder screen. The first operation may be a tap operation (for example, a single-tap operation) of the user on the "video" option 402 shown in FIG. 4(a). In response to the tap operation of the user on the "video" option 402 shown in FIG. 4(a), the mobile phone 100 may display a video recording viewfinder screen 403 shown in FIG. 4(b).

For some other terminals, in response to the tap operation of the user on a "camera" application icon, the terminals display a video recording viewfinder screen by default. In this case, the first screen is a screen including the "camera" application icon, and the second screen is a video recording viewfinder screen.

For example, the first screen may be a home screen of the terminal, and the home screen includes the "camera" application icon. For another example, the first screen may be a screen of a third-party application that includes the "camera" application icon. The terminal may display the second screen in response to the tap operation of the user on the "camera" application icon on the first screen.

For example, the terminal is the mobile phone 100 shown in FIG. 1(a) and FIG. 1(b) or FIG. 4(a) and FIG. 4(b), the first screen is a home screen of the mobile phone 100, and the home screen includes a "camera" application icon. In response to the tap operation of the user on the "camera" application icon on the first screen, the mobile phone 100 may display the video recording viewfinder screen 103 shown in FIG. 1(b) or the photographing viewfinder screen 403 shown in FIG. 4(b), namely, the second screen. In this case, the first operation may be the tap operation of the user on the "camera" application icon.

FIG. 4(a) shows another example of a photographing viewfinder screen according to an embodiment of this application. The photographing viewfinder screen 401 shown in FIG. 4(a) is described herein in this embodiment of this application. The photographing viewfinder screen 401 includes a flash option 406, a filter option 407, the "video" option 402, a photographing button 407, an album option 406, and a camera switching option 408. For specific functions of the flash option 406, the filter option 407, the "video" option 402, the photographing button 407, the album option 406, and the camera switching option 408, refer to descriptions of corresponding buttons or options in FIG. 1(a) in the embodiments of this application. Details are not described herein again in this embodiment of this application.

Figure 4B:
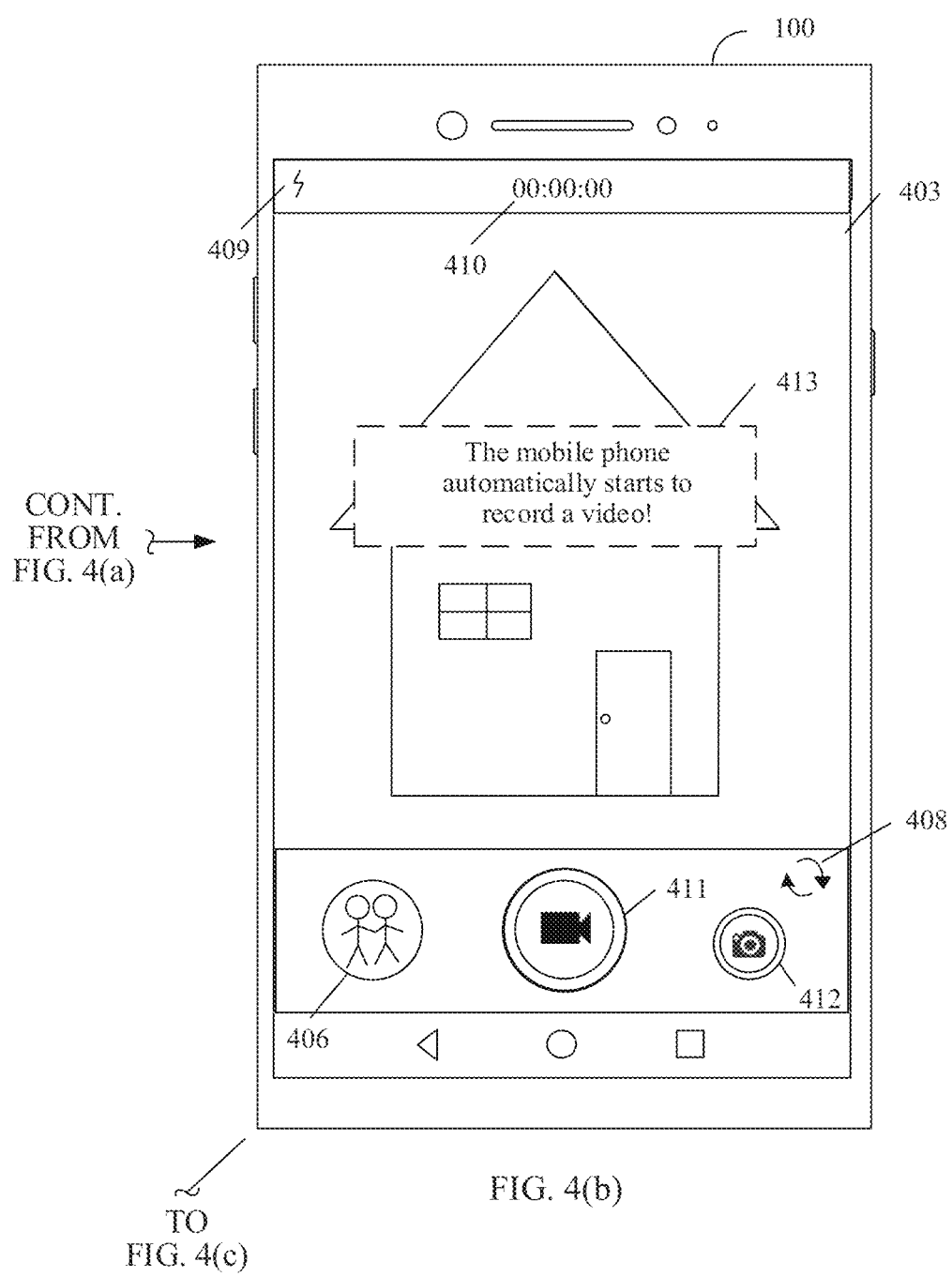

FIG. 4(b) shows another example of a video recording viewfinder screen according to an embodiment of this application. The photographing viewfinder screen 403 shown in FIG. 4(b) is described herein in this embodiment of this application. The video recording viewfinder screen 403 includes a flash option 409, a timing option 410, a recording start button 411, a "photo" option 412, an album option 406, and a camera switching option 408. For specific functions, refer to descriptions of corresponding buttons or options in FIG. 1(b) in the embodiments of this application. Details are not described herein again in this embodiment of this application.

Usually, after displaying the video recording viewfinder screen, the terminal may receive a tap operation of the user on a recording start button on the second screen. The terminal ma start video recording in response to the tap operation of the user on the recording start button. However, because an image on the video recording viewfinder screen changes with a shooting object, the user may mistakenly consider that the terminal has started video recording. In this case, the user usually forgets to tap the recording start button. The terminal detects no tap operation of the user on the recording start button, cannot record a video, and consequently cannot save a video that the user wants to record. This leads to relatively poor human-machine interaction performance of the terminal. In this embodiment of this application, the terminal may start to record the first video while displaying the second screen. In this way, it can be avoided that the video that the user wants to record cannot be saved due to inability of the terminal to record a video that is caused because the user forgets to tap the recording start button.

Optionally, the second screen may further include third prompt information. The third prompt information may be used to prompt the user that the terminal is recording a video. For example, as shown in FIG. 4(b), the second screen 403 may further include third prompt information 413 "The mobile phone is recording a video!".

In this embodiment of this application, in response to the first operation entered by the user on the first screen, the terminal not only displays the second screen, but also automatically starts to record a video and buffers the recorded video. In this way, even if the user forgets to tap the recording start button on the video recording viewfinder screen, the terminal can automatically start to record a video. Therefore, the terminal can store the video that the user wants to record, thereby improving human-machine interaction performance.

Figure 4C:
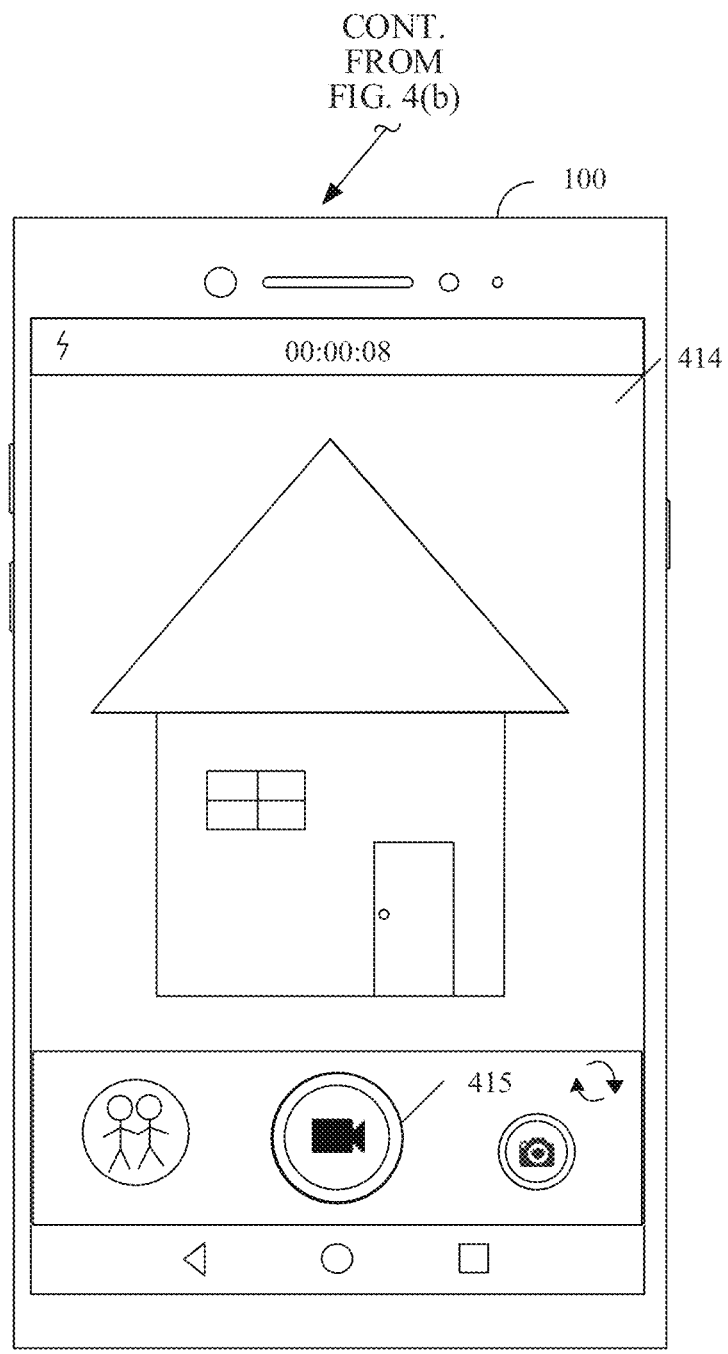

For example, in response to the first operation, the mobile phone 100 may display the video recording viewfinder screen 403 shown in FIG. 4(b), and start to record a video. When the terminal starts to record a video, the timing option on the video recording viewfinder screen (namely, the second screen) shows that the terminal starts timing. For example, when the mobile phone 100 starts to record a video, a time displayed by the timing option 410 is 00:00:00, as shown in FIG. 4(b). After the mobile phone 100 starts to record a video for 2 seconds, a time displayed by the timing option 410 is 00:00:02, as shown in FIG. 4(c).

S303. If the terminal detects a second operation of the user, in response to the detected second operation, the terminal stops recording the first video and displays a third screen. The third screen is used to indicate the user to determine whether to save the recorded first video.

The second operation in this embodiment of this application is used to trigger the terminal to stop video recording. That the third screen is used to indicate the user to determine whether to save the recorded first video may be specifically: The third screen includes prompt information, and the prompt information is used to indicate the user to determine whether to save the recorded first video.

In some embodiments, the second operation may be an operation of the user for triggering to close a camera application or leave a screen of the camera application (for example, switching the camera application to a background running state). For example, the second operation may include a tap operation of the user on a back button in a navigation bar of the terminal or a tap operation of the user on a home button in the navigation bar.

There is no navigation bar on touchscreens of some terminals. On these terminals, the back button or the home button in the navigation bar may be implemented by using a preset gesture by the user. For example, some terminals may receive a bottom-up slide operation that is entered by the user on the touchscreens, to implement a function corresponding to the tap operation of the user on the back button or the home button in the navigation bar. In this case, the second operation may be the preset gesture entered by the user on the touchscreen.

It is assumed that the terminal currently displays the second screen (namely, the video recording viewfinder screen). Usually, in response to the tap operation of the user on the back button or the home button or the preset gesture entered by the user, the terminal may close the camera application or switch the camera application to the background running state, does not display the screen of the camera application, but displays the home screen of the terminal. For example, the mobile phone 100 is used as an example. The mobile phone 100 may receive a tap operation of the user on a back button 502 or a home button 503 shown in FIG. 5A(1). In response to the tap operation of the user on the back button 502 or the home button 503, the mobile phone 100 may display a mobile phone home screen 508 shown in FIG. 5A(3).

However, in this embodiment of this application, in response to the tap operation of the user on the back button or the home button or the preset gesture entered by the user, the terminal may first display the third screen. In this way, the user may be indicated to determine whether to save the first video recorded by the terminal. For example, the mobile phone 100 is used as an example. The mobile phone 100 may receive a tap operation of the user on a back button 502 or a home button 503 shown in FIG. 5A(1). In response to the tap operation of the user on the back button 502 or the home button 503, the mobile phone 100 may display a third screen 506 shown in FIG. 5A(2). The third screen 506 includes prompt information, for example, "Save the video automatically recorded by the mobile phone?". The third screen 506 may further include a "save" button and a "delete" button, so that the user can choose to save or delete a pre-recorded video. Certainly, the "save" button may alternatively be a "yes" option or button, and the "delete" button may alternatively be a "no" option or button. This is not limited in this embodiment of this application.

Further, to help the user view a video automatically recorded by the terminal, to determine whether to save the video automatically recorded by the terminal, the third screen may further include a video play control. For example, as shown in FIG. 5A(2), the third screen 506 may further include a play control 507. In response to a tap operation of the user on the play control 507, the mobile phone 100 may play the video automatically recorded by the mobile phone 100, namely, the first video.

It should be noted that, in this embodiment of this application, the second operation includes but is not limited to the tap operation of the user on the back button or the home button or the preset gesture entered by the user. For example, the second operation may alternatively be a tap operation of the user on a photo option 504 on the second screen 501. Usually, in response to the tap operation of the user on the photo option 504, a display screen of the mobile phone 100 is switched from the video recording viewfinder screen to the photographing viewfinder screen. In other words, in response to the tap operation of the user on the photo option 504, the mobile phone 100 may stop video recording. Therefore, in response to the tap operation of the user on the photo option 504 on the second screen 501, the mobile phone 100 may stop recording the first video. In this embodiment of this application, in response to the tap operation of the user on the photo option 504, the mobile phone 100 may first display the third screen 506 before displaying the photographing viewfinder screen. After receiving a selection operation of the user on the third screen, the mobile phone 100 displays the photographing viewfinder screen. Alternatively, the second operation may be a tap operation of the user on the "panoramic" option or the album option.

By comparing an album option 505 shown in FIG. 5A(1) and an album option 505 shown in FIG. 5A(2), it can be learned that the mobile phone 100 changes display content of the album option 505 from "a photo of two persons holding hands" to "a recorded video" in response to the second operation.

For another example, the second operation may alternatively be a tap operation of the user on a lock screen button of the terminal. Usually, in response to the tap operation of the user on the lock screen button, the terminal may switch an application that is currently running on the terminal to a background running state. In addition, in response to the tap operation of the user on the lock screen button, the terminal may display a lock screen or turn off the screen. In this embodiment of this application, after S301 and S302, the terminal may receive the tap operation (namely, the second operation) of the user on the lock screen button. The terminal may first display the third screen in response to the tap operation of the user on the lock screen button, and then display the lock screen or turn off the screen after receiving a selection operation of the user on the second screen.

S304. The terminal saves or deletes the first video according to the selection operation of the user on the third screen.

The selection operation of the user on the third screen may be an operation for indicating the terminal to save the first video. Alternatively, the selection operation of the user on the third screen may be an operation for indicating the terminal to delete the first video. For example, the user may tap the "save" button shown in FIG. 5A(2). The mobile phone 100 may save the first video in response to a tap operation of the user on the "save" button shown in FIG. 5A(2), and display the mobile phone home screen shown in FIG. 5A(3).

Certainly, the user may alternatively tap the "delete" button shown in FIG. 5A(2). The mobile phone 100 may delete the first video in response to a tap operation of the user on the "delete" button shown in FIG. 5A(2), and display the mobile phone home screen shown in FIG. 5A(3).

It should be noted that the first video in this embodiment of this application may also be referred to as an "automatically recorded video". Usually, the terminal can record a video only in response to the tap operation of the user on the recording start button on the video recording viewfinder screen. In this embodiment of this application, the video recorded by the terminal in response to the tap operation of the user on the recording start button is referred to as a second video. The first video or the automatically recorded video is a video that is automatically recorded when the terminal receives no tap operation of the user on the recording start button.

According to the shooting control method provided in this embodiment of this application, in response to the first operation of the user on the first screen, the terminal may start to record the first video and buffer the recorded video while displaying the video recording viewfinder screen (namely, the second screen), instead of starting video recording after the user taps the recording start button. In this way, even if the user forgets to tap the recording start button after the terminal displays the video recording viewfinder screen, the terminal can still automatically record a video, so that it can be avoided that a video image that the user wants to record cannot be recorded because the terminal detects no tap operation of the user on the recording start button. The video that the user wants to record can be saved, improving human-machine interaction performance.

In addition, the terminal may further display the third screen in response to the second operation of the user, to indicate the user to determine whether to save the automatically recorded video. The user determines whether to save the automatically recorded video, so that the human-machine interaction performance of the terminal can be further improved, and shooting experience of the user can be enhanced.

Figure 5B:
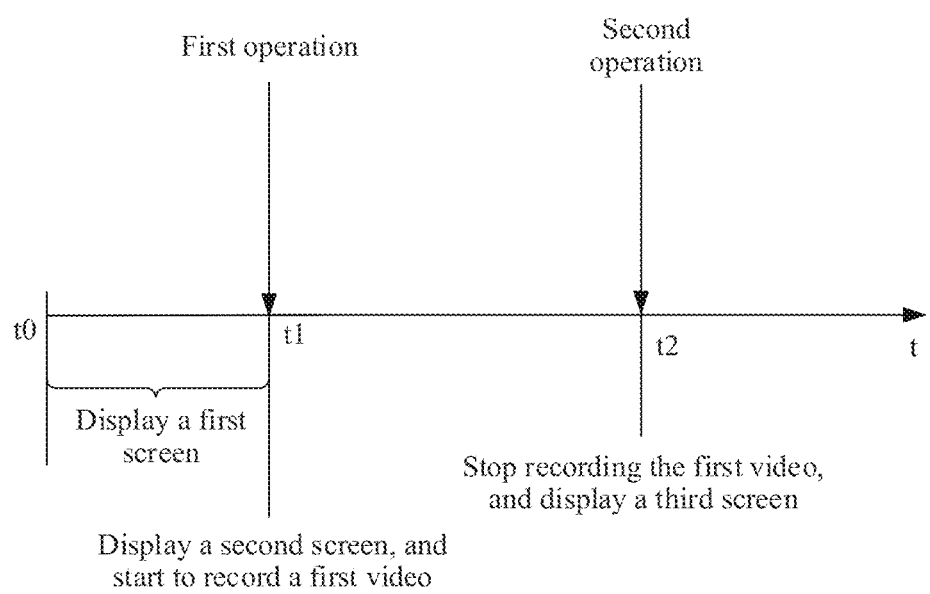
FIG. 5B is a schematic diagram 1 of a time sequence in a shooting control method according to an embodiment of this application.

FIG. 5B is a schematic diagram of a time sequence in a shooting control method according to an embodiment of this application. As shown in FIG. 5B, the terminal displays the first screen in a time period from a moment t0 to a moment t1. The terminal receives the first operation of the user on the first screen at the moment t1. In response to the first operation of the user on the first screen, the terminal may display the second screen and start to record the first video. At a moment t2 after the moment t1, the terminal receives the second operation of the user. In response to the second operation, the terminal stops recording the first video, and displays the third screen.

As shown in FIG. 5B, the terminal starts to record the first video when displaying the second screen (namely, the video recording viewfinder screen) at the moment t1. However, in another embodiment of this application, in response to the first operation of the user on the first screen, the terminal may not directly record the first video, but waits for a specific time period (for example, a first preset time period). If the terminal detects no tap operation of the user on the recording start button within the first preset time period, the user possibly forgets to tap the recording start button. In this case, the terminal may automatically start to record the first video. If the terminal receives the tap operation of the user on the recording start button within the first preset time period, the terminal may record the second video in response to the tap operation of the user on the recording start button within the first preset time period.

Figure 6A:
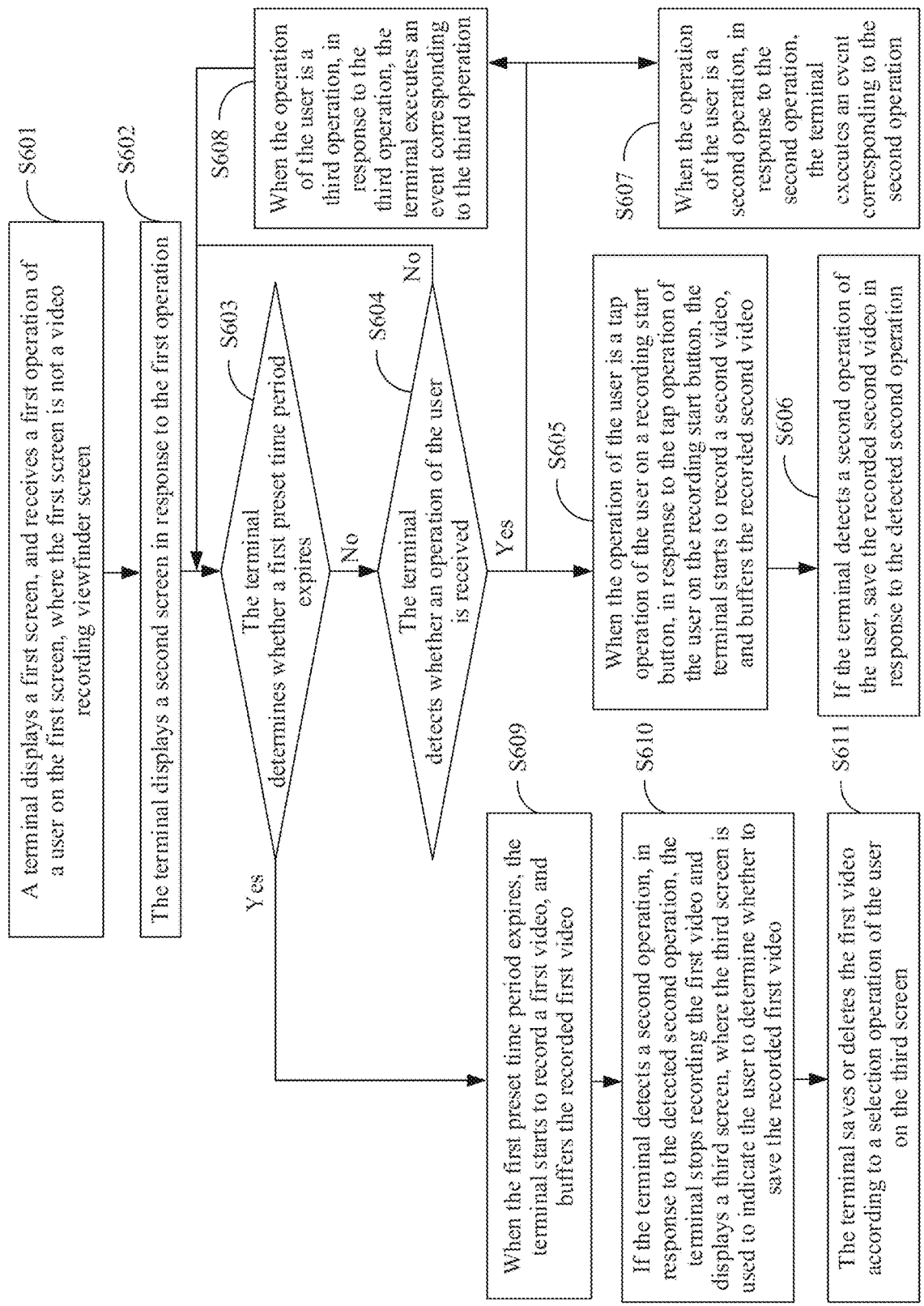
FIG. 6A is a flowchart 2 of a shooting control method according to an embodiment of this application.

An embodiment of this application provides a shooting control method. As shown in FIG. 6A, the shooting control method may include S601 to S611.

S601 is the same as S301.

S602. The terminal displays a second screen in response to the first operation.

For detailed descriptions of S602, refer to the method in which "the terminal displays the second screen in response to the first operation" in S302. Details are not described herein again in this embodiment of this application.

Optionally, in an implementation, the second screen may include first prompt information. The first prompt information is used to indicate the user to tap a recording start button, to trigger the terminal to start video recording.

Figure 7:
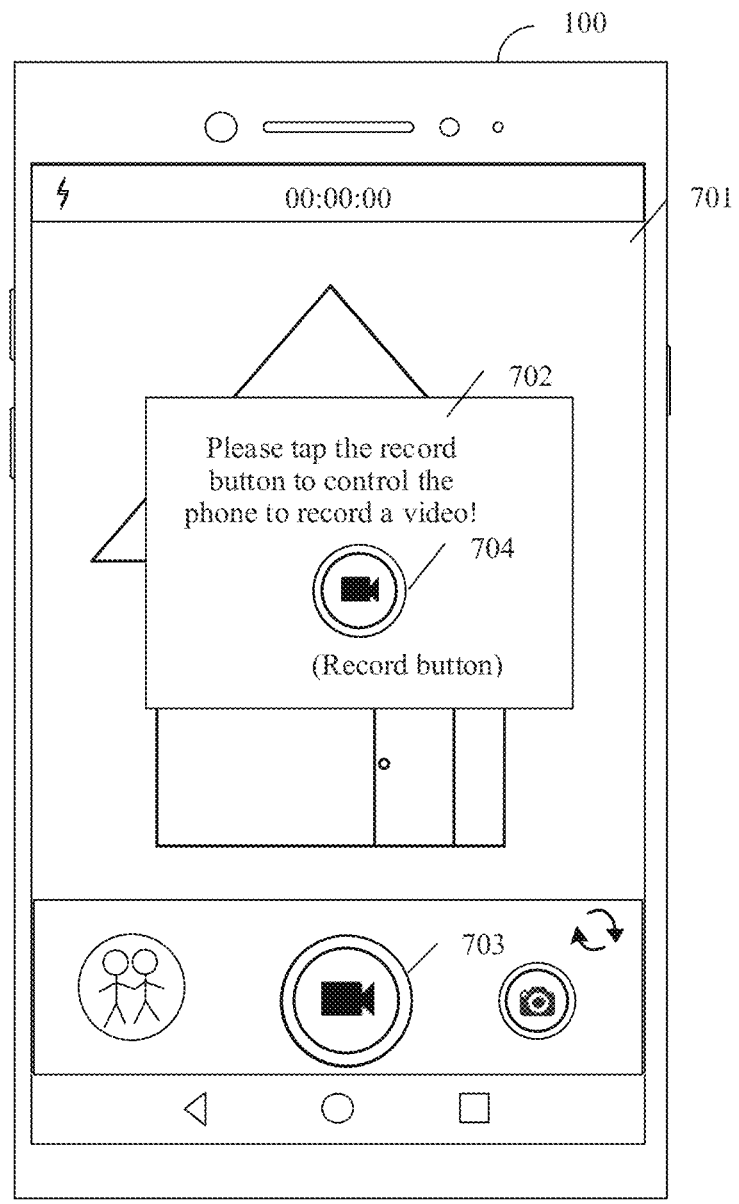
FIG. 7 is a schematic diagram 5 of an example of a terminal screen according to an embodiment of this application.

For example, the terminal is a mobile phone 100 shown in FIG. 7. In response to the first operation, the mobile phone 100 may display a first screen 701 including first prompt information 701 "Please tap the recording start button to trigger the mobile phone to record a video!". Optionally, a display box of the first prompt information 702 may further include an icon 704 of a recording start button 703. In this way, the recording start button 703 may be indicated to the user more clearly. Optionally, the icon 704 may alternatively be a control having a same function as the recording start button 703. For example, the mobile phone 100 may start to record a second video in response to a tap operation of the user on the recording start button 703 or the icon 704.

In another implementation, the mobile phone 100 may not display the first prompt information 702 on the first screen 701, but displays the recording start button 703 that dynamically blinks on the first screen 701. The dynamically blinking recording start button 703 easily draws the user's attention and reminds the user to tap the recording start button 703.

After S602, the method in this embodiment of this application may further include S603.

S603. The terminal determines whether a first preset time period expires.

The first preset time period is a preset time period from a moment at which the terminal starts to display the second screen.

If the first preset time period does not expire, the terminal detects whether an operation of the user is received, in other words, performs S604. If the first preset time period expires, the terminal may automatically start to record a first video, in other words, perform S609.

S604 The terminal detects whether the operation of the user is received.

The operation of the user in S604 may include any operation of the user on the terminal.

If the terminal receives no operation of the user, the terminal may continue to perform S603 to determine whether the first preset time period expires. If the terminal receives the operation of the user, the terminal may execute an event corresponding to the operation of the user, and perform S605 and S606, or S607, or S608.

S605. When the operation of the user is a tap operation of the user on the recording start button, in response to the tap operation of the user on the recording start button, the terminal starts to record a second video and buffers the recorded second video.

If the terminal receives the tap operation of the user on the recording start button within the first preset time period, it indicates that the user does not forget to tap the recording start button. In this case, the terminal may record the second video in response to the tap operation of the user on the recording start button. For example, as shown in FIG. 6B(2), it is assumed that the terminal receives the tap operation of the user on the recording start button at a moment 4 within the first preset time period. The terminal may start to record the second video in response to the tap operation of the user on the recording start button at the moment 4.

S606. If the terminal detects a second operation of the user, save the recorded second video in response to the detected second operation.

For detailed descriptions of the second operation in S606, refer to the second operation in S303 Alternatively, the second operation in S606 may be a tap operation of the user on a recording stop button.

The second screen includes the recording start button, and after the user taps the recording start button on the second screen, the terminal starts to record the second video. In this case, the recording start button changes to the recording stop button. The recording stop button is used to trigger the terminal to stop recording the second video.

For example, as shown in FIG. 6C(1), a second screen 601 includes a recording start button 602. In response to a tap operation of the user on the recording start button 602, the mobile phone 100 may start to record the second video, and display a recording screen 603 shown in FIG. 6C(2). The recording screen 603 includes a recording stop button 604. As shown in FIG. 6C(1) and FIG. 6C(2), the recording start button 602 changes to the recording stop button 604 in response to the tap operation of the user on the recording start button 602. In response to a tap operation of the user on the recording stop button 604, the mobile phone 100 may stop recording the second video, and save the recorded second video.

It may be understood that, in addition to the tap operation of the user on the recording start button, the terminal may receive a second operation of the user within the first preset time period.

S607. When the operation of the user is the second operation, in response to the second operation, the terminal executes an event corresponding to the second operation.

The second operation in S607 is the same as the second operation in S303. A difference lies in that in S607, the terminal does not display, in response to the second operation, a third screen that indicates the user to determine whether to save an automatically recorded video. In S607, the terminal executes, in response to the second operation, only the event corresponding to the second operation, to be specific, closes a camera application or leaves a screen of the camera application. For example, the terminal is the mobile phone 100, and the second operation is a tap operation of the user on a home button of the mobile phone 100. The mobile phone 100 displays a video recording viewfinder screen (namely, the second screen), and the mobile phone 100 receives the tap operation of the user on the home button of the mobile phone 100 within the first preset time period. The mobile phone 100 may display a mobile phone home screen in response to the tap operation of the user on the home button.

In addition to the tap operation of the user on the recording start button and the second operation, the terminal may receive a third operation of the user within the first preset time period. The third operation is different from the tap operation of the user on the recording start button, and the third operation is different from the second operation.

S608. When the operation of the user is the third operation, in response to the third operation the terminal executes an event corresponding to the third operation.

The third operation is an operation performed by the user on the terminal when the terminal display s the second screen (namely, the video recording viewfinder screen). The third operation does not trigger the terminal to close a camera application or leave a screen of the camera application (for example, switch the camera application to a background running state), does not trigger the terminal to start video recording, or does not trigger an operation of switching a display screen of the terminal from the video recording viewfinder screen to another screen.

For example, the video recording viewfinder screen 403 shown in FIG. 4(b) is used as an example. The third operation is not the following operations: a tap operation of the user on the recording start button 411 on the video recording viewfinder screen 403, a tap operation of the user on the album option 406, a tap operation of the user on the "photo" option 412, or a tap operation of the user on a home button in a navigation bar, a tap operation of the user on a back button in the navigation bar, or a tap operation of the user on a lock screen button of the mobile phone 100. The third operation may be the following operations: a tap operation of the user on the flash option 409 on the video recording viewfinder screen 403, a tap operation of the user on the camera switching option 408, a tap operation of the user on a volume + button, or a tap operation of the user on a volume − button.

It may be understood that, in response to the third operation, the terminal does not close the camera application, does not switch the camera application to the background running state, does not start to video recording, or does not switch the display screen from the video recording viewfinder screen to another screen. Therefore, in response to the third operation, after the terminal executes the event corresponding to the third operation, the terminal still displays the second screen, but some buttons on the screen may slightly change. To avoid inability of the terminal to record a video caused because the user forgets to tap the recording start button, the terminal may continue to determine whether the first preset time period expires, and automatically start to record the first video when the first preset time period expires. Specifically, as shown in FIG. 6A, after S608, the terminal may continue to perform S603 and a subsequent method procedure.

S609. When the first preset time period expires, the terminal starts to record a first video, and buffers the recorded first video.

It may be understood that, if the terminal still receives no operation of the user (including the tap operation of the user on the recording start button) or receives only a third operation of the user from a moment at which the terminal starts to display the second screen to a moment at which the first preset time period expires, the user possibly forgets to tap the recording start button. In this case, the terminal may automatically start to record the first video, so that it can be avoided that a video image that the user wants to record cannot be recorded because the terminal detects no tap operation of the user on the recording start button. A video that the user wants to record can be saved, thereby improving human-machine interaction performance.

For example, as shown in FIG. 6B(1) or FIG. 6B(2), the terminal receives the first operation of the user at a moment t1, and displays the second screen (in other words, the terminal performs S602). It is assumed that a time period from the moment t1 to a moment t3 is the first preset time period. The first preset time period expires at the moment 3. Duration of the first preset time period is T1.

As shown in FIG. 6B(1), it is assumed that the terminal receives no operation of the user or receives only the third operation of the user within the first preset time period. In this case, the terminal automatically starts to record the first video at the moment t3 (to be specific, when the first preset time period expires).

After S609, the method in this embodiment of this application may further include S610 and S611. To be specific, as shown in FIG. 6B(1), the terminal receives a second operation of the user at a moment t2 after the moment t3. In response to the second operation, the terminal stops recording the first video, and displays a third screen. S610 is the same as S303, and S611 is the same as S304.

As shown in FIG. 5B, the terminal starts to record the first video when displaying the second screen (namely, the video recording viewfinder screen) at the moment t1. However, in another embodiment of this application, in response to the first operation of the user on the first screen, the terminal may not directly record the first video, but identify display content of the first screen. The terminal may pre-record a video when identifying that the second screen includes a preset shooting object.

An embodiment of this application provides a shooting control method. The shooting control method may include S801 to S806.

S801 is the same as S601 or S301. S802 is the same as S602.

S803. The terminal identifies display content of the second screen.

S804. When the terminal identifies that the second screen includes a preset shooting object, the terminal starts to record a first video, and buffers the recorded video.

S805 is the same as S303. S806 is the same as S304.

The preset shooting object in this embodiment of this application may include at least one of a figure object (for example, a face), a building object (for example, a house or a bridge), a landscape object (for example, a sea, a beach, a lake, a mountain, or a sunset), and an object of an event (for example, fishing, swimming, boating) that is being performed by a person. The preset shooting object may be set by the user on the terminal.

Figure 8:
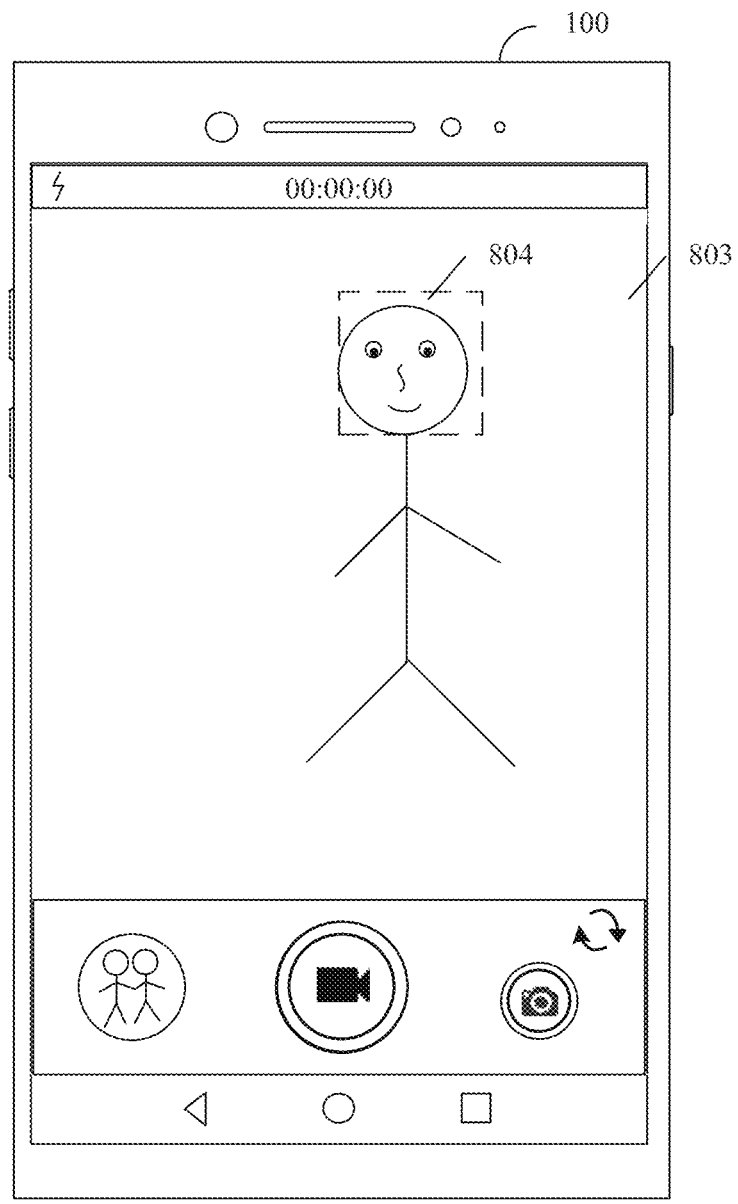
FIG. 8 is a schematic diagram 6 of an example of a terminal screen according to an embodiment of tins application.

For example, it is assumed that the preset shooting object includes a human object, for example, a face, and the terminal is a mobile phone 100 shown in FIG. 8. In response to an operation of the user for enabling a video recording mode, the mobile phone 100 may display a second screen 801 shown in FIG. 8. The second screen 801 is a video recording viewfinder screen. The mobile phone 100 may identify that the second screen 801 includes a preset shooting object (for example, a face 802). In response to identifying that the second screen 801 includes the preset shooting object, the mobile phone 100 may automatically start to record the first video.

When the terminal identifies that the second screen includes the preset shooting object, it indicates that images currently collected by a camera of the terminal may include images that the user wants to record. To record these images in a timely manner, the terminal may automatically start to record the first video.

After the terminal displays the second screen and starts to record the first video, and before the terminal receives the second operation, the user may tap a recording start button on the second screen. For example, as shown in FIG. 9(a), a second screen 901 displayed by the mobile phone 100 includes a recording start button 902. After the mobile phone 100 displays the second screen 901 and starts to record the first video, the mobile phone 100 may receive a tap operation of the user on the recording start button 902.

Based on this, an embodiment of this application provides a shooting control method. As shown in FIG. 10A(1) and FIG. 10A(2), the shooting control method may include S1001 to S1016.

S1001 is the same as S301, and S1002 is the same as S302. As shown in FIG. 10A(1) and FIG. 10A(2), after S1002, the method in this embodiment of this application may further include S1003.

S1003 The terminal determines whether a second preset time period expires.

The second preset time period is a preset time period from a moment at which the terminal starts to record the first video.

If the second preset time period does not expire, the terminal detects whether an operation of the user is received, in other words, performs S1004. If the second preset time period expires, the terminal may continue to record the first video, in other words, perform S1012.

S1004. The terminal detects whether the operation of the user is received.

The operation of the user in S1004 may include any operation of the user on the terminal.

If the terminal receives no operation of the user, the terminal may continue to perform S1003 to determine whether the second preset time period expires. If the terminal receives the operation of the user, the terminal may execute an event corresponding to the operation of the user, and perform S1005 to S1008, or S1009 and S1010, or S1011.

S1005. When the operation of the user is a tap operation of the user on a recording start button, in response to the tap operation of the user on the recording start button, the terminal stops recording the first video, starts to record a second video, and buffers the recorded second video.

In S1005, in response to the tap operation of the user on the recording start button, the terminal may display a fourth screen while stopping recording the first video and starting to record the second video. The fourth screen includes a recording stop button. It may be understood that the recording start button changes to the recording stop button in response to the tap operation of the user on the recording start button. For example, the mobile phone 100 may receive a tap operation of the user on the recording start button 902 shown in FIG. 9(a). In response to the tap operation of the user on the recording start button 902 shown in FIG. 9(a), the mobile phone 100 displays a fourth screen 903 shown in FIG. 9(b). The fourth screen 903 includes a recording stop button 904. The recording start button 902 changes to the recording stop button 904 in response to the tap operation of the user on the recording start button 902 shown in FIG. 9(a).

Figure 9C:
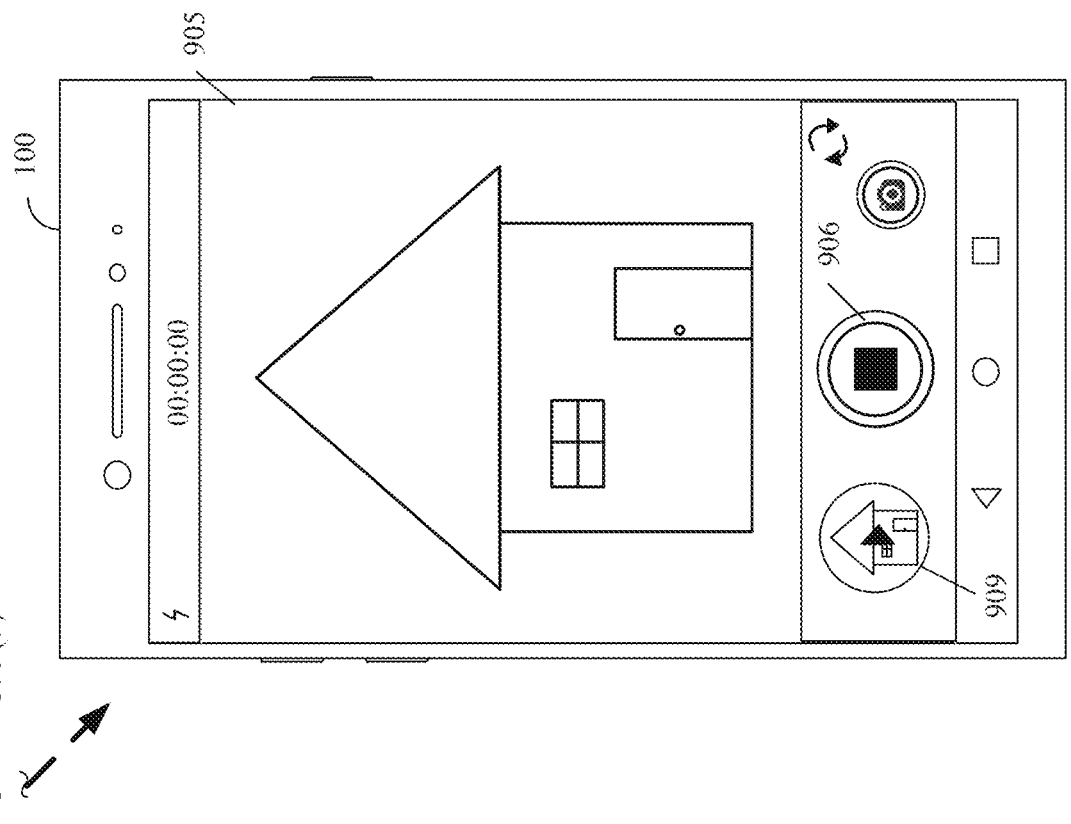

In an implementation, in response to the tap operation of the user on the recording start button within the second preset time period, the terminal may continue to record the second video on the basis of recording the first video. To be specific, in response to the tap operation of the user on the recording start button within the second preset time period, the terminal may start to record the second video, and buffer the second video and the recorded first video as one video file. For example, the terminal is the mobile phone 100 shown in FIG. 9(a) to FIG. 9(c). It is assumed that the second preset time period (T2 shown in FIG. 10 C(1) or FIG. 10 C(2)) is 5 seconds. As shown in FIG. 9(a), the mobile phone 100 receives a tap operation of the user on a recording start button 1002 when a time for recording the first video is 00:00:02. In response to the tap operation, the mobile phone 100 may display the recording screen 903 shown in FIG. 9(b). As shown in FIG. 9(b), the mobile phone 10 starts video recording at 00:00:03.

In this implementation, the terminal can accurately determine the first video when saving or deleting the recorded first video according to a selection operation of the user on a third screen. In response to the tap operation of the user on the recording start button within the second preset time period, the terminal may further record duration of the first video recorded by the terminal when the terminal receives the tap operation of the user on the recording start button. For example, in response to the tap operation of the user on the recording start button 902 shown in FIG. 9(a), the mobile phone 100 may record duration of the first video recorded by the mobile phone 100 as 2 seconds. In this way, when the user chooses to delete the first video on the third screen, the terminal may delete the first video from the recorded video based on the duration recorded by the terminal. For example, the mobile phone 100 may delete, from the recorded video, a video recorded in the first 2 seconds.

In another implementation, in response to the tap operation of the user on the recording start button within the second preset time period, the terminal may restart timing and record the second video. To be specific, in response to the tap operation of the user on the recording start button within the second preset time period, the terminal may start to record the second video, and buffer the second video as a video file different from the first video. For example, the terminal is the mobile phone 100 shown in FIG. 9(*a*) to FIG. 9(*c*). It is assumed that the first preset time period (T2 shown in FIG. 10 B(1) or FIG. 10 B(2)) is 5 seconds. As shown in FIG. 9(*a*), the mobile phone 100 receives a tap operation of the user on the recording start button 902 when a pre-recording time is 00:00:02. In response to the tap operation, the mobile phone 100 may display a recording screen 905 shown in FIG. 9(*c*). As shown in FIG. 9(*c*), the mobile phone 100 starts to record the second video from 00:00:00.

In this implementation, in response to the tap operation of the user on the recording start button 902, display content of an album option changes from a photo 907 of "two persons holding hands" shown in FIG. 9(*a*) to a "recorded video" 909 shown in FIG. 9(*c*). Compared with an album option 907 shown in FIG. 9(*a*), an album option 908 shown in FIG. 9(*b*) does not change in response to the tap operation of the user on the recording start button 902.

It should be noted that, in this embodiment of this application, a recording start button on a viewfinder screen used when the terminal records the first video is different from the recording stop button on the viewfinder screen (namely, the fourth screen) used when the terminal records the second video. For example, the recording start button 902 shown in FIG. 9(*a*) is different from the recording stop button 904 shown in FIG. 9(*b*) and a recording stop button 906 shown in FIG. 9(*c*).

In an implementation, the recording start button on the second screen is the same as the recording start button on the viewfinder screen used when the terminal records the first video. For example, FIG. 4(*b*) shows the second screen 403 of the mobile phone 100. FIG. 4(*c*) shows a viewfinder screen 414 used when the mobile phone 100 records the first video. FIG. 5(*a*) shows the viewfinder screen 501 used when the mobile phone 10 records the first video. A recording start button 415 on the viewfinder screen 501 shown in FIG. 4(*c*) and a recording start button 509 on the viewfinder screen 501 shown in FIG. 5(*a*) are compared with the recording start button 411 on the second screen 403 shown in FIG. 4(*b*). It can be learned that the recording start button 415 and the recording start button 509 are the same as the recording start button 411.

In another implementation, the recording start button on the second screen is different from the recording start button on the viewfinder screen used when the terminal records the first video. For example, FIG. 10B(I) shows a second screen 1001 of the mobile phone 100. The second screen 1001 includes a recording start button 1002. FIG. 10B(2) shows a viewfinder screen 1003 used when the mobile phone 100 records the first video. The viewfinder screen 1003 used when the mobile phone 100 records the first video includes a recording start button 1004. FIG. 10B(3) shows a viewfinder screen 1005 (namely, the fourth screen) used when the mobile phone 100 records the second video. The viewfinder screen 1005 used when the mobile phone 100 records the second video includes a recording stop button 1006. It can be learned, by comparing FIG. 10B(1) and FIG. 10B(2), that the recording start button 1002 on the second screen 1001 is different from the recording start button 1004 on the viewfinder screen 1003 for recording the first video.

In this embodiment of this application, the method in this embodiment of this application is described by using an example in which the recording start button on the second screen is the same as the recording start button on the viewfinder screen used when the terminal records the first video.

After S1005, the method in this embodiment of this application further includes S1006. S1006 is the same as S606.

S1007. If the terminal detects a second operation, in response to the detected second operation, the terminal stops recording the second video and displays the third screen.

The terminal records the first video in S1002. Therefore, the terminal may display the third screen in response to the second operation, to indicate the user to determine whether to save the recorded first video.

After S1007, the method in this embodiment of this application further includes S1008. S1008 is the same as S304.

If the terminal receives the tap operation of the user on the recording start button within the second preset time period from the moment at which the terminal starts to record the first video, it indicates that a video that is recorded by the terminal from a moment at winch the user taps the recording start button is a video image that the user wants to record. Based on this, in response to the tap operation of the user on the recording start button within the second preset time period, the terminal may stop recording the first video and start to record the second video based on a common use habit of the user, to meet the user's requirement.

FIG. 10C(1) and 10C(2) are schematic diagrams of a time sequence in the shooting control method shown in FIG. 10A(1) and FIG. 10A(2). As shown in FIG. 10C(I) or FIG. 10C(2), the terminal displays the first screen in a time period from a moment t0 to a moment t1. The terminal receives the first operation of the user on the first screen at the moment t1. In response to the first operation of the user on the first screen, the terminal may display the second screen and start to record the first video. A time period from the moment t1 to a moment t6 is the second preset time period. The moment t6 is a moment at which the second preset time period expires. Duration of the second preset time period is T2.

As shown in FIG. 10C(1), the terminal receives the tap operation of the user on the recording start button at a moment t7 (in other words, within the second preset time period). In this case, the terminal may start to record the second video in response to the tap operation of the user on the recording start button at the moment t7. In other words, the terminal performs S1004. Subsequently, if the terminal receives the second operation at a moment t8, the terminal may save the recorded second video and display the third screen.

The terminal may further receive a second operation of the user within the second preset time period from the moment at which the terminal starts to record the first video. After S1004, if the terminal detects that the terminal receives the operation of the user, the method in tins embodiment of this application may further include S1009 and S1010.

S1009. When the operation of the user is the second operation, in response to the second operation, the terminal stops recording the first video and displays a third screen.

A method in which "in response to the second operation, the terminal stops recording the first video and displays the third screen" in S1009 is the same as that in S303. After S1009, the method in this embodiment of this application further includes S1010. S1010 is the same as S304.

The terminal may further receive a third operation of the user within the second preset time period from the moment at which the terminal starts to record the first video. After S1004, if the terminal detects that the terminal receives the operation of the user, the method in this embodiment of this application may further include S1011. S101 is the same as S608. As shown in FIG. 10A(1) and FIG. 10A(2), after S1011, the terminal may continue to perform S1003 and a subsequent method procedure.

In S1003, if the terminal determines that the second preset time period expires, the terminal may perform S1012 to continue to record the first video.

S1012. The terminal continues to record the first video.

In the shooting control method shown in FIG. 10A(1) and FIG. 10A(2), after S1004, if the second preset time period expires, the terminal may continue to record the first video. In other words, when the second preset time period expires at the moment t6 shown in FIG. 10C(2), the terminal may continue to record the first video.

S1013. If the terminal receives a tap operation of the user on a recording start button after the second preset time period, in response to the tap operation of the user on the recording start button, the terminal stops recording the first video and displays a third screen.

After S1013, the method in this embodiment of this application further includes S1014. S1014 is the same as S304.

After automatically recording the first video, the terminal may receive the tap operation of the user on the recording start button after the second preset time period. For example, as shown in FIG. 10C(2), the terminal receives the tap operation of the user on the recording start button at a moment t9, to be specific, after the second preset time period T2 from the moment t1. In this case, the user may consider that the terminal has recorded a video image that the user wants to record, and want to end video recording. Therefore, the terminal may automatically perform an operation based on a common use habit of the user, to meet the user's requirement, and use a tap operation of the user on the recording start button after the second preset time period as an operation for stopping recording the first video. In addition, in response to the tap operation of the user on the recording start button after the second preset time period, the terminal nay display the third screen, to indicate the user to determine whether to save the first video. The user determines whether to save the first video. The terminal does not continue to record a video (for example, the second video) in response to the tap operation of the user on the recording start button within the second preset time period. In this way, a service that meets the uses requirement can be provided for the user based on the user's requirement, so that the human-machine interaction performance of the terminal can be improved, and shooting experience of the user can be enhanced.

After S1012, the terminal may alternatively receive a second operation of the user. The method in this embodiment of this application may further include S1015 and S1016.

S1015. If the terminal receives the second operation of the user after the second preset time period, in response to the second operation, the terminal stops recording the first video and displays a third screen.

After S1015, the method in this embodiment of this application further includes S1016. S1016 is the same as S304.

After automatically recording the first video, the terminal may receive the second operation of the user after the second preset time period. In this case, the user may consider that the terminal has recorded a video image that the user wants to record, and want to end video recording. Therefore, in response to the second operation of the user after the second preset time period, the terminal may display the third screen, to indicate the user to determine whether to save the first video. The user determines whether to save the first video.

Figure 11A:
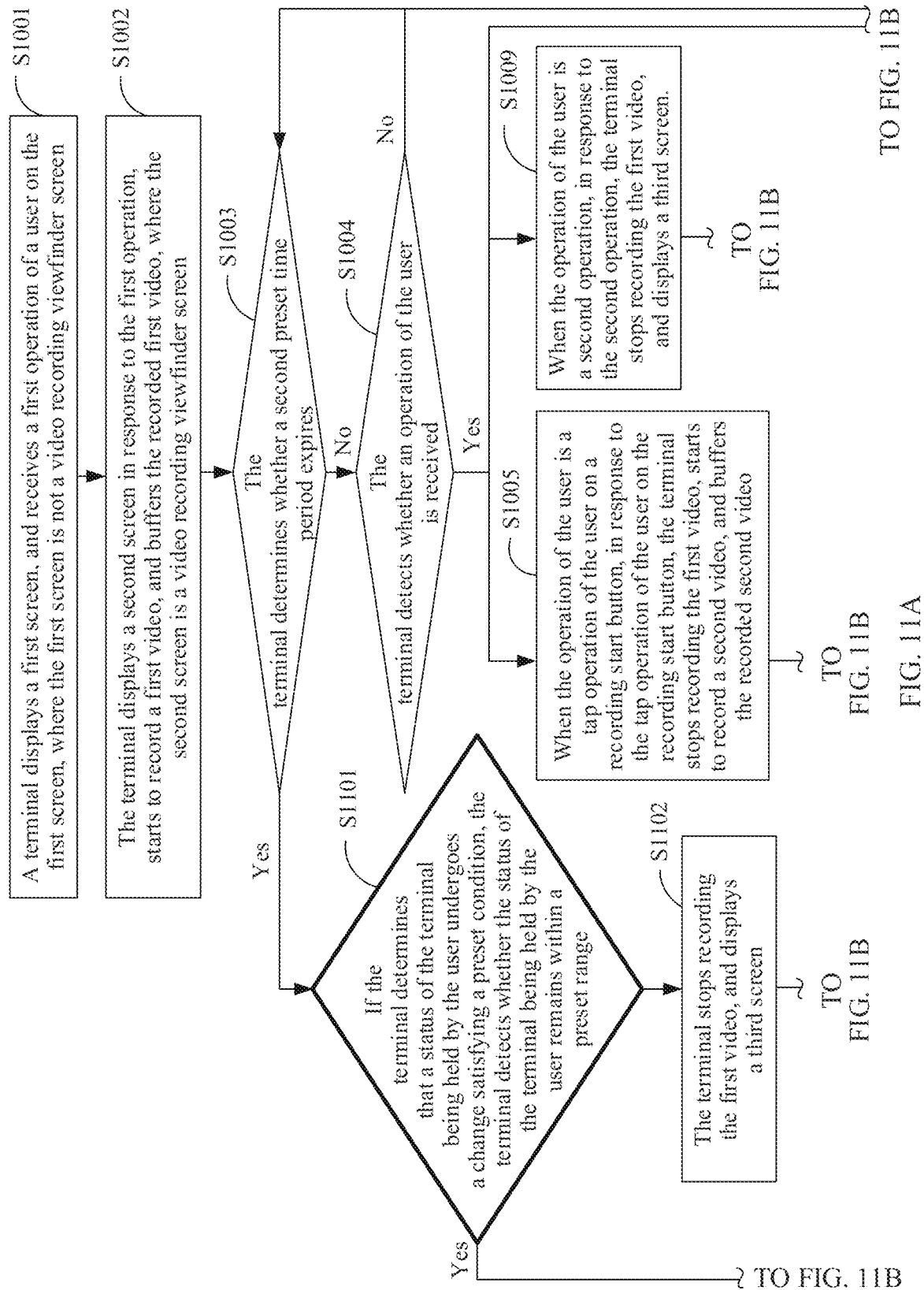
FIG. 11A to FIG. 11C are a flowchart 4 of a shooting control method according to an embodiment of this application.
Figure 11B:
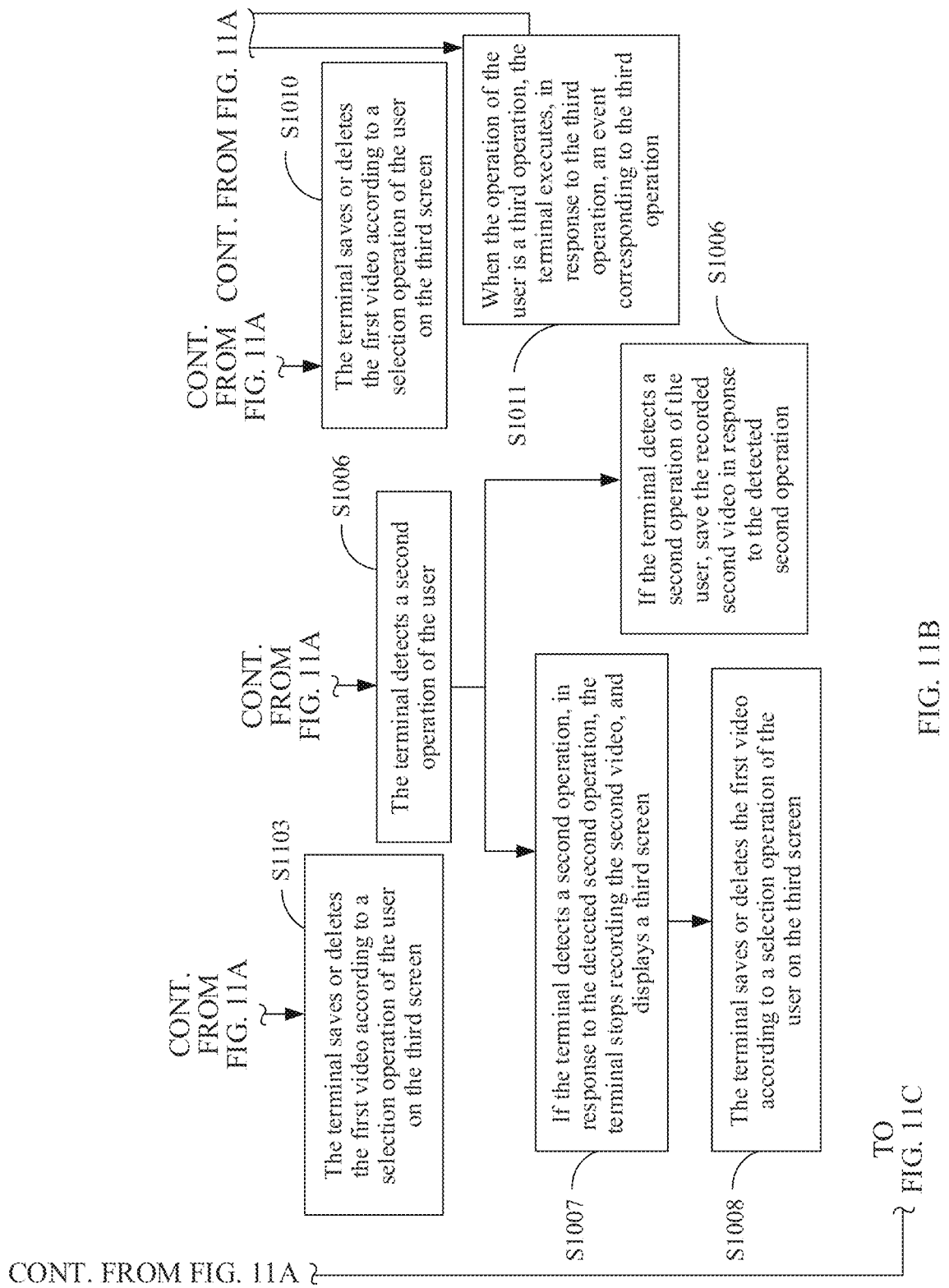
Figure 11C:
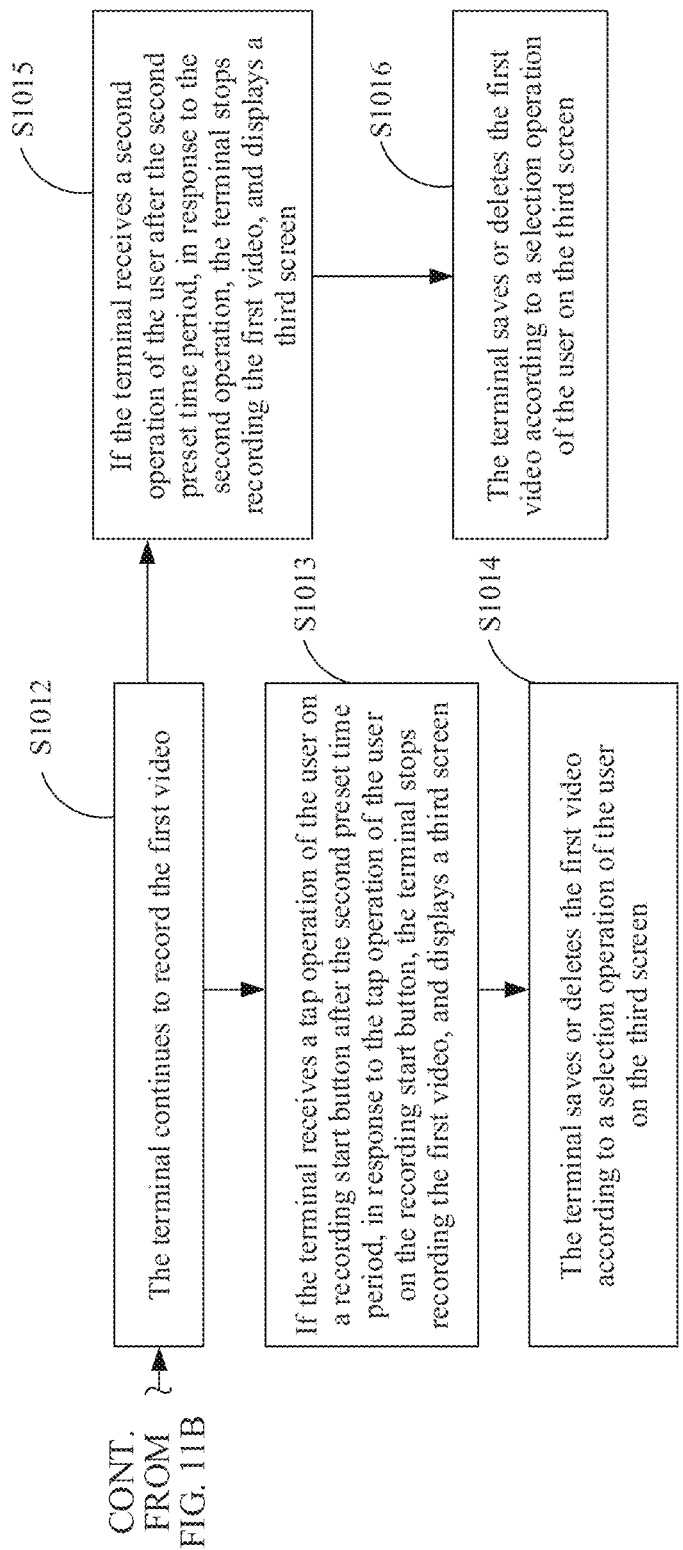

In the solution shown in FIG. 10A(1) and FIG. 10A(2), if the terminal receives no operation of the user (including the tap operation of the user on the recording start button) or receives only the third operation of the user within the second preset time period, the terminal may continue to record the first video. In another implementation of this embodiment of this application, if the terminal receives no operation of the user or receives only the third operation of the user within the second preset time period, the terminal may determine, based on a status of the terminal being held by the user, whether to continue to record the first video. To be specific, as shown in FIG. 10A(1) and FIG. 10A(2), before S1010, the method in this embodiment of this application may further include S1101. For example, as shown in FIG. 11A to FIG. 11C, before S012 shown in FIG. 10A(1) and FIG. 10A(2), the method in this embodiment of this application may further include S1101.

S1101. If the terminal determines that the status of the terminal being held by the user undergoes the change satisfying the preset condition, the terminal detects whether the status of the terminal being held by the user remains within a preset range.

Generally, for example, the terminal is a mobile phone 100 shown in FIG. 12(a-1) to FIG. 12(c). When the user records a video by using the mobile phone 100, as shown in FIG. 12(a-1), the user may pick up the mobile phone 100. Then, as shown in FIG. 12(a-1) to FIG. 14(a-2), the user may gradually lift the arm until the mobile phone 100 is approximately perpendicular to the ground shown in FIG. 12(a-3). Then, the user may start video recording. When the mobile phone 100 detects that a status of the mobile phone 100 being held by the user undergoes a change (namely, the change satisfying the preset condition) shown in FIG. 12(a-1) to FIG. 12(a-2) to FIG. 12(a-3). Therefore, it may be determined that the status of the mobile phone 100 being held by the user undergoes the change satisfying the preset condition.

The terminal may detect, by using a sensor in the terminal, the status of the terminal being held by the user. The terminal in this embodiment of this application includes one or more sensors. The one or more sensors may determine, by detecting that the terminal is rotated, or that the terminal moves forward relatively to the user, or that the terminal moves upward relatively to a horizontal line, whether the status of the terminal being held by the user undergoes the change satisfying the preset condition. For example, as shown in Table 1, this application provides a table of status changes of the terminal being held.

TABLE 1

Table of status changes of the terminal being held

|   | Rotated | Moving forward | Moving upward |
|---|---|---|---|
| 1 | Yes | Yes | Yes |
| 2 | Yes | Yes | Yes, but an amplitude is insufficient |
| 3 | Yes | Yes, but an amplitude is insufficient | Yes |
| 4 | Yes | No, or within an anti-jitter range | Yes |
| 5 | Yes | Yes | No, or within an anti-jitter range |
| 6 | Yes | No, or within an anti-jitter range | No, or within an anti-jitter range |
| 7 | No | Yes | Yes |

The preset condition in this embodiment of this application may include that the terminal is rotated, the terminal moves forward, and the terminal moves upward shown in Table 1.

Referring to Table 1, as shown in the case 1, when a motion parameter detected by the sensor on the terminal indicates that the terminal is "rotated", "moves forward", and "moves upward", the terminal may determine that the status of the terminal being held by the user undergoes the change satisfying the preset condition.

As shown in the case 2, when a motion parameter detected by the sensor on the terminal indicates that the terminal is "rotated", "moves forward", and "moves upward with an insufficient amplitude (in other words, an upward motion amplitude is less than a first preset amplitude)", the terminal may determine that the status of the terminal being held by the user undergoes the change satisfying the preset condition.

As shown in the case 3, when a motion parameter detected by the sensor on the terminal indicates that the terminal is "rotated", "moves forward (in other words, a forward motion amplitude is less than a second preset amplitude)", and "moves upward", the terminal may determine that the status of the terminal being held by the user undergoes the change satisfying the preset condition.

As shown in the case 4, when a motion parameter detected by the sensor on the terminal indicates that the terminal is "rotated", "does not move forward, or moves forward with an amplitude within an anti-jitter range", and "moves upward", the terminal may determine that the status of the terminal being held by the user does not undergo the change satisfying the preset condition.

Similarly, the terminal may determine, according to cases 5 and 6 shown in Table 1, whether the status of the terminal being held by the user meets the preset condition.

It should be noted that, in this embodiment of this application, the method and the determining condition for determining, by the terminal, whether the status of the terminal being held by the user undergoes the change satisfying the preset condition include but are not limited to those described in the foregoing embodiment. Other determining methods and determining conditions are not described in this embodiment of this application again.

For example, in this embodiment, "the status of the terminal currently being held by the user undergoes the change satisfying the preset condition" may specifically include: an included angle between a display screen of the terminal and a horizontal screen is within a preset range after the sensor detects that the terminal is rotated and moves upward.

The terminal may detect, in real time, whether the status of the terminal being held by the user undergoes the change satisfying the preset condition. It may be understood that, in a process that the user picks up the terminal to record a video by using the terminal, the status of the terminal being held by the user undergoes the change satisfying the preset condition. Therefore, when the terminal receives no operation of the user within the second preset time period, if the user still wants to record a video, the status of the terminal being held by the user remains within the preset range. In other words, the status of the terminal being held by the user does not change greatly. In this case, the terminal may continue to record the first video. Specifically, if the terminal detects that the status of the terminal being held by the user remains within the preset range, S1012-S1014 may be performed.

For example, after the status of the mobile phone 100 being held by the user undergoes the change (namely, the change satisfying the preset condition) shown in FIG. 12(*a*-1) to FIG. 12(*a*-2) to FIG. 12(*a*-3), it is assumed that the status of the mobile phone 100 being held by the user remains in a status shown in FIG. 12(*a*-3). In this case, even if the mobile phone 100 receives no operation of the user within the second preset time period, for example, a tap operation of the user on a recording start button shown in FIG. 12(*b*), the mobile phone 100 may also determine, based on the status of the mobile phone 100 being held by the user, that the user wants to continue to record the video. In this case, the mobile phone 100 may display a recording screen 1202 shown in FIG. 12(*c*). It should be noted that, a time 00:00:12 displayed by a timing option on a recording screen 1201 shown in FIG. 12(*b*) and a time 00:00:13 displayed by the timing option on the recording screen 1202 shown in FIG. 12(*c*) are continuous times.

If the user does not want to record a video, a posture in which the user holds the terminal changes, and the status of the terminal being held by the user does not remain within the preset range. In this case, the terminal may stop recording the first video. Specifically, after S1101, the method in this embodiment of this application may further include S1102 and S1103.

S1102. The terminal stops recording the first video, and displays a third screen.

After S1102, the method in this embodiment of this application further includes S1103. S1103 is the same as S304.

For example, after the status of the mobile phone 100 being held by the user undergoes the change (namely, the change satisfying the preset condition) shown in FIG. 12(*a*-1) to FIG. 12(*a*-2) to FIG. 12(*a*-3), it is assumed that the status of the mobile phone 100 being held by the user changes to a status shown in FIG. 12(*a*-4). The mobile phone 100 may determine that the user wants to end video recording. In this case, the mobile phone 10 may display the third screen shown in FIG. 5A(2).

In this embodiment of this application, the terminal may detect, in real time, the status of the terminal being held by the user. If the tap operation of the user on the recording start button is not received within the second preset time period, and the status of the terminal being held by the user undergoes the change satisfying the preset condition, the terminal may determine whether the status of the terminal being held by the user remains within the preset range. If the status of the terminal being held by the user remains within the preset range, it indicates that the status of the terminal being held by the user is a status in which the user shoots a photo or a video by using the terminal. In this case, the terminal may continue to record the first video. If the status of the terminal being held by the user does not remain within the preset range, it indicates that the status of the terminal being held by the user is not the status in which the user shoots a photo or a video by using the terminal. In this case, the terminal may stop recording the first video.

In other words, in this embodiment of this application, if the terminal receives no tap operation of the user on the recording start button for a long time, the terminal may automatically determine, based on the status of the terminal being held by the user, whether to continue to perform video pre-recording. According to the foregoing solution, when the user completes video shooting and forgets to trigger the terminal to stop video shooting, video recording may be automatically stopped. In this way, it can be avoided that the terminal always records, due to negligence of the user, a video that is not required by the user, and power consumption of the terminal can be reduced. In addition, content of the terminal occupied by the terminal to record redundant videos can be reduced, thereby improving intelligence of the terminal.

Figure 13A:
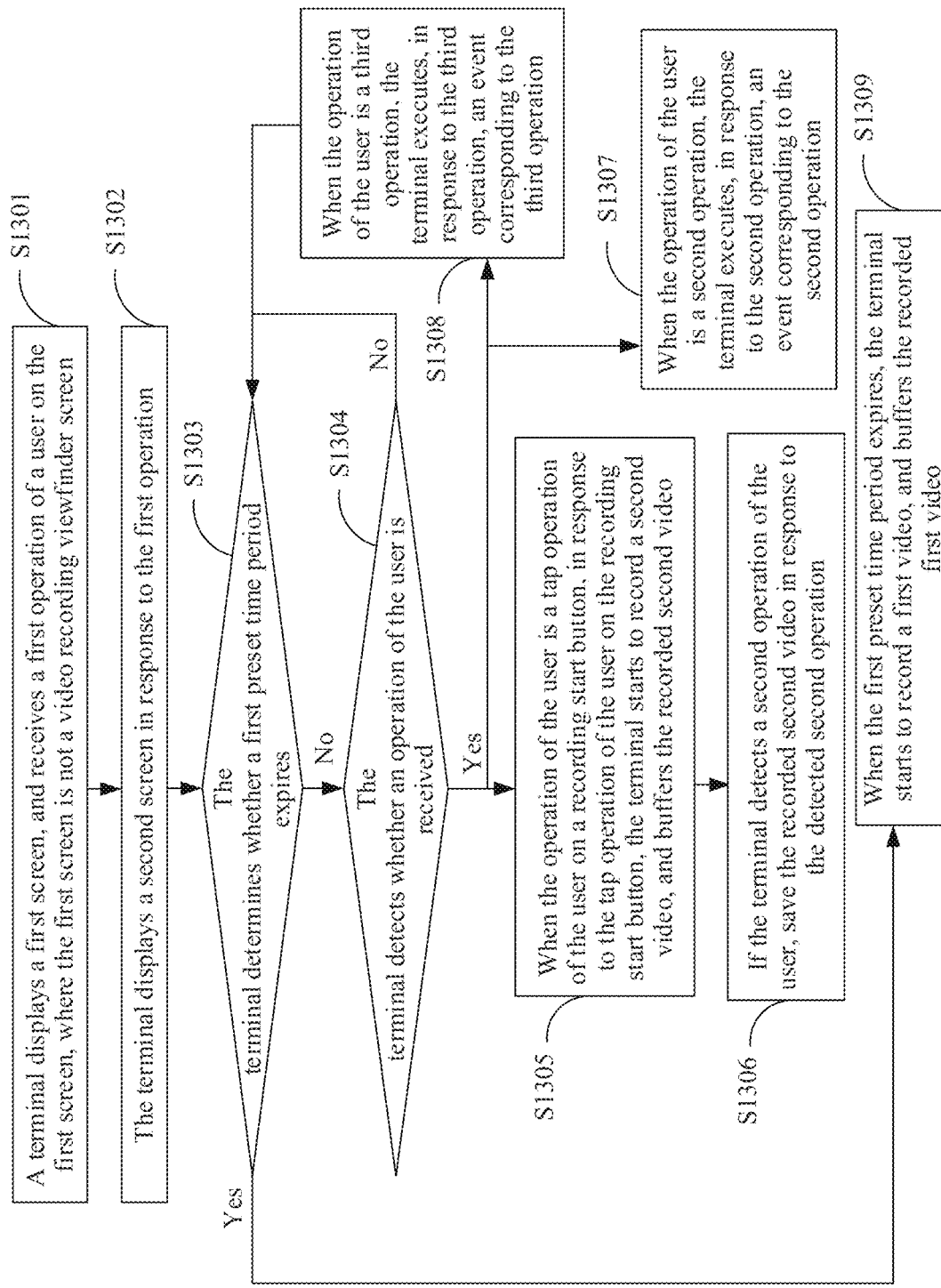
FIG. 13A to FIG. 13C are a flowchart 5 of a shooting control method according to an embodiment of this application.
Figure 13B:
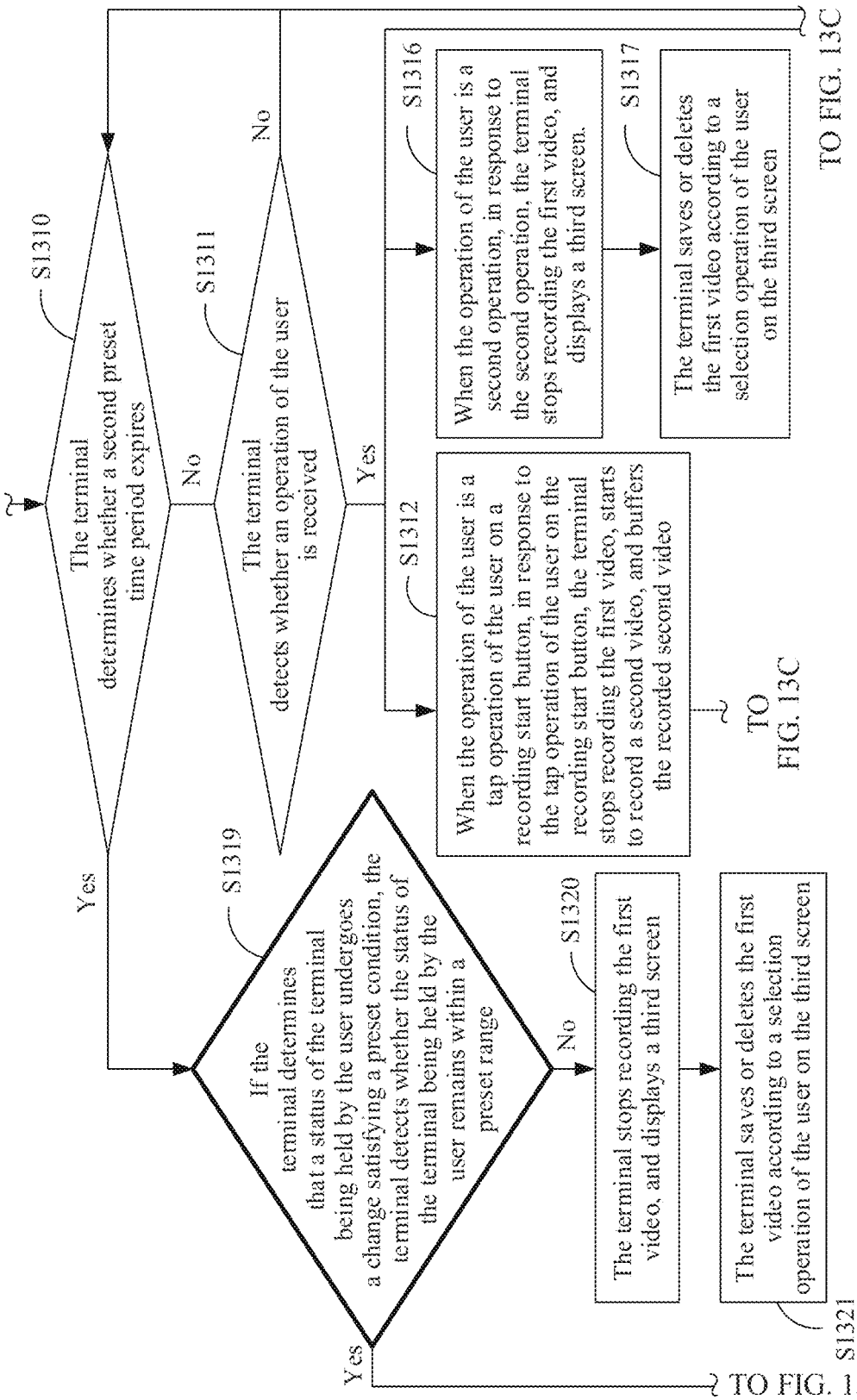
Figure 13C:
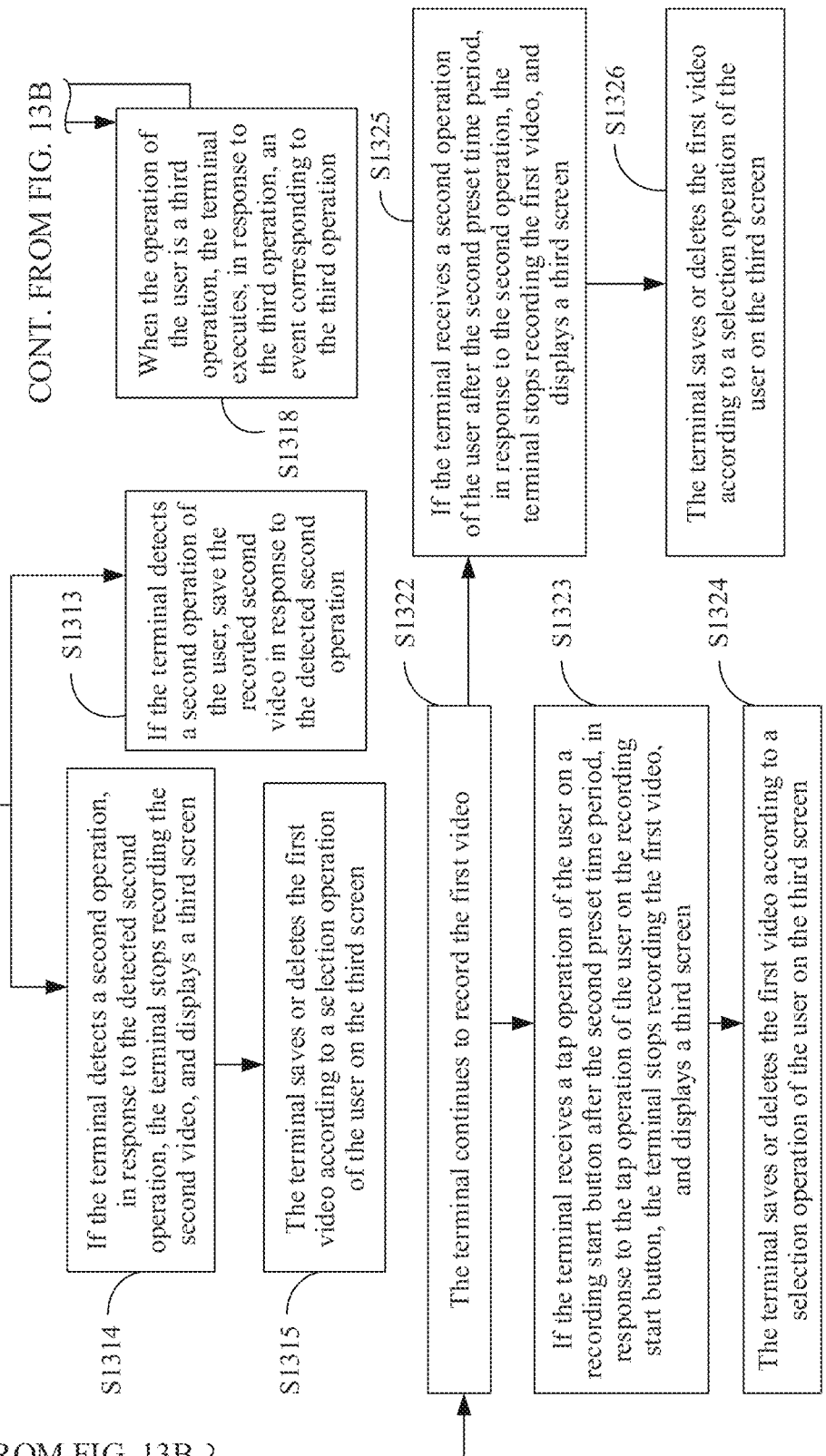

An embodiment of this application provides a shooting control method. As shown in FIG. 13A to FIG. 13C, the shooting control method may include S1301 to S1326.

S1301 is the same as S601 or S301. S1302 is the same as S602.

After the terminal performs S1302 and displays the second screen, the terminal may perform S1303 to determine whether a first preset time period expires. If the first preset time period does not expire, the terminal may perform S1304 to detect whether an operation of the user is received. S1303 is the same as S603. S1304 is the same as S604.

In S1304, if the terminal receives the operation of the user, and the operation of the user is a tap operation of the user on a recording button, the terminal may perform S1305 to S1306. S1305 is the same as S605. S1306 is the same as S606. In S1303, if the terminal receives the operation of the user, and the operation of the user is a second operation, the terminal may perform S1307. S1307 is the same as S607. In S1303, if the terminal receives the operation of the user, and the operation of the user is a third operation, the terminal may perform S1308. S1308 is the same as S608. After S608, the terminal may continue to perform S1303.

If the first preset time period expires, the terminal may perform S1309, and start to record the first video when the first preset time period expires. S1309 is the same as S609. From a moment at which the terminal starts to record the first video, the terminal may perform S1310 to determine whether a second preset time period expires. S1310 is the same as S1003.

If the second preset time period does not expire, the terminal may perform S1311 to detect whether an operation of the user is received. S1311 is the same as S1004.

In S1311, if the terminal receives the operation of the user, and the operation of the user is a tap operation of the user on a recording button, the terminal may perform S1312 to S1315. S1312 is the same as S1005. S1313 is the same as S1006. S1313 is the same as S1006. S1314 is the same as S1007. S1315 is the same as S1008. In S1311, if the terminal receives the operation of the user, and the operation of the user is a second operation, the terminal may perform S1316 and S1317. S1316 is the same as S1009. S1317 is the same as S1010. In S1311, if the terminal receives the operation of the user, and the operation of the user is a third operation, the terminal may perform S1318. S1318 is the same as S1011. After S1318, the terminal may continue to perform S1310.

If the second preset time period expires, the terminal may perform S1319 to S1326. S1319 is the same as S1101. S1320 is the same as S102. S1321 is the same as S1103. S1322 is the same as S1012. S1323 is the same as S1013. S1324 is the same as S1014. S1325 is the same as S1015. S1326 is the same as S1016.

Figure 14A:
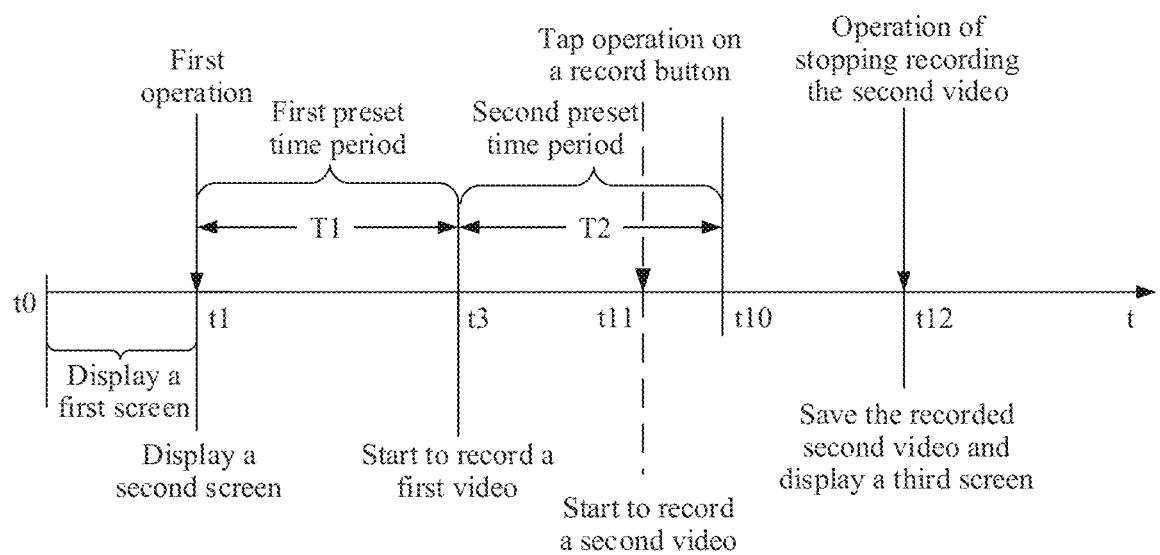
FIG. 14(a) and FIG. 14(b) are schematic diagrams 4 of a time sequence in a shooting control method according to an embodiment of this application.
Figure 14B:
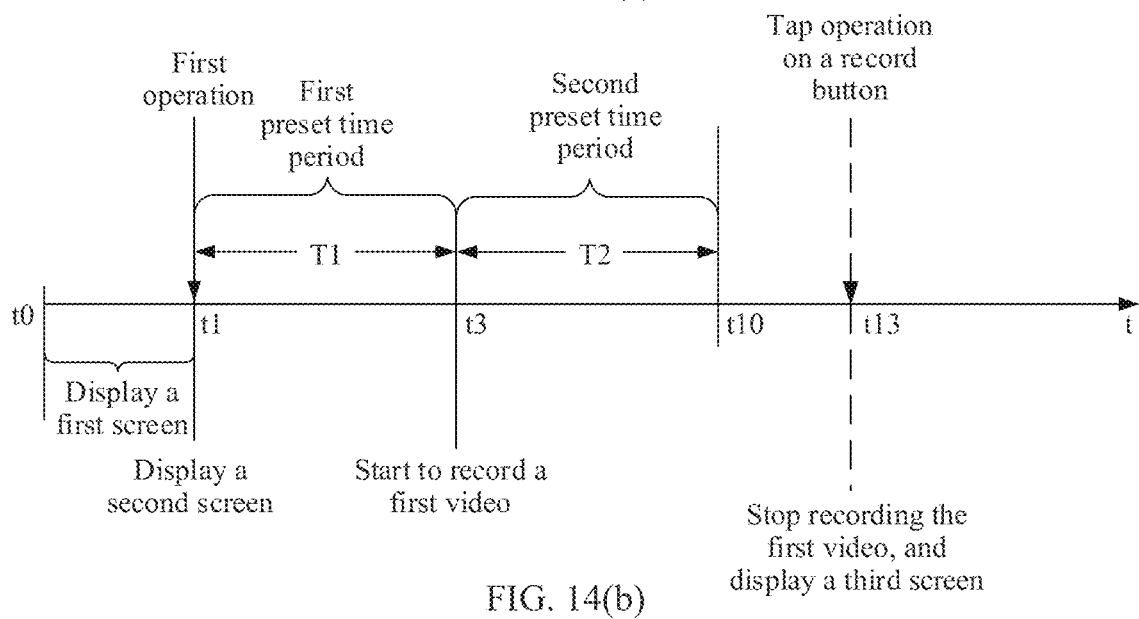

FIG. 14(a) and FIG. 14(b) are schematic diagrams of a time sequence in the shooting control method shown in FIG. 13A to FIG. 13C. As shown in FIG. 14(a) and FIG. 14(b), the terminal displays the first screen in a time period from a moment t0 to a moment t1. The terminal receives the first operation of the user on the first screen at the moment t1. The terminal may display the second screen in response to the first operation of the user on the first screen. If the terminal receives no tap operation of the user on the recording start button or receives only the third operation of the user in a time period (namely, a first preset time period T1) from the moment t1 to a moment t3, the terminal starts to record the first video at the moment t3. The moment t3 is a moment at which the first preset time period expires. Duration of the first preset time period is T1. A time period from the moment 3 to a moment t10 is the second preset time period. The moment t10 is a moment at which the second preset time period expires. Duration of the second preset time period is T2.

As shown in FIG. 14(a), the terminal receives the tap operation of the user on the recording start button at a moment t11 (in other words, within the second preset time period). In this case, in response to the tap operation of the user on the recording start button at the moment t11, the terminal may stop recording the first video and start to record the second video. In other words, the terminal performs S1306. Subsequently, if the terminal receives the second operation at a moment t12, the terminal may save the recorded second video and display the third screen.

As shown in FIG. 14(b), the terminal receives the tap operation of the user on the recording start button after a moment t13 (in other words, after the second preset time period). In this case, the user may consider that the terminal has recorded a video image that the user wants to record, and want to end video recording. Therefore, the terminal may automatically perform an operation based on a common use habit of the user, to meet a requirement of the user, and use a tap operation of the user on the recording start button after the second preset time period as an operation for stopping recording the first video. In addition, in response to the tap operation of the user on the recording start button after the second preset time period, the terminal may display the third screen, to indicate the user to determine whether to save the first video. The user determines whether to save the first video. The terminal does not continue to record a video (for example, the second video) in response to the tap operation of the user on the recording start button within the second preset time period. In this way, a service that meets the use's requirement can be provided for the user based on the use's requirement, so that the human-machine interaction performance of the terminal can be improved, and shooting experience of the user can be enhanced.

In this embodiment of this application, the second preset time period is different from the first preset time period. Specifically, a start moment of the second preset time period is different from a start moment of the first preset time period. The start moment of the first preset time period is a moment at which the terminal starts to display the second screen. The start moment of the second preset time period is a moment at which the terminal starts to record the first video.

For example, as shown in FIG. 14(a) or FIG. 14(b), the start moment of the first preset time period is t, to be specific, the moment at which the terminal starts to display the second screen. The start moment of the second preset time period is t3, to be specific, the moment at which the terminal starts to record the first video.

In addition, duration of the second preset time period may be the same as duration of the first preset time period. Alternatively, duration of the second preset time period may be different from duration of the first preset time period. For example, T1 and T2 shown in FIG. 14(a) or FIG. 14(b) may be the same or may be different.

In another embodiment of this application, if the terminal receives the tap operation of the user on the recording start button within the second preset time period, it indicates that only a video that is recorded by the terminal from a moment at which the user taps the recording start button is a video image that the user wants to record. Based on this, based on a user requirement, to provide the user with a service that meets the user requirement, in response to the tap operation of the user on the recording start button within the first preset time period, the terminal may stop recording the first video, start to record the second video, and buffer the second video. In addition, the terminal may delete the recorded first video.

Figure 15:
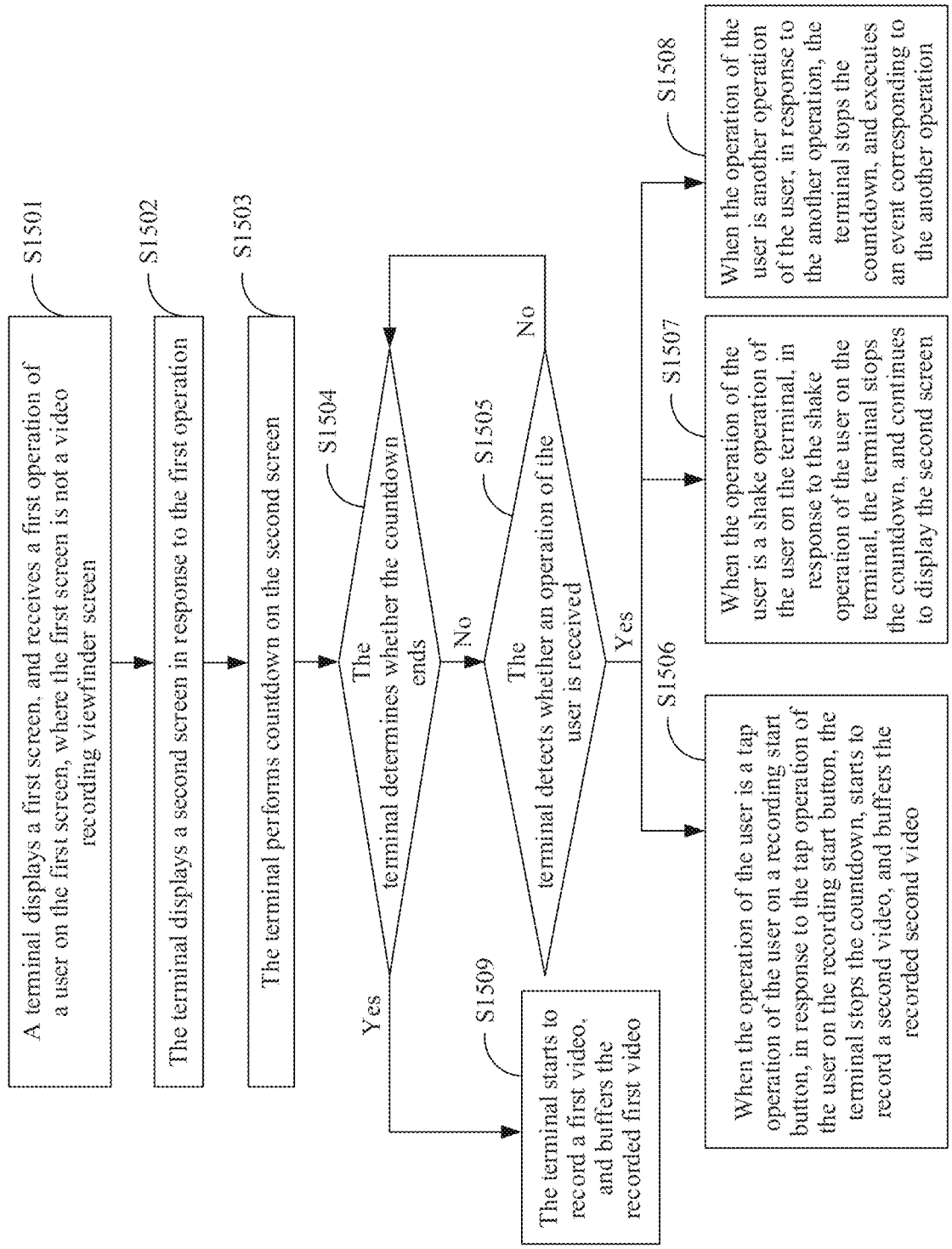
FIG. 15 is a flowchart 6 of a shooting control method according to an embodiment of this application.

An embodiment of this application further provides a shooting control method. As shown in FIG. 15, the shooting control method nay include S1501 to S1509.

S1501 is the same as S601 or S301. S1502 is the same as S602.

S1503. The terminal performs countdown on the second screen.

For example, the terminal is a mobile phone 100 shown in FIG. 16(a) to FIG. 16(d). It is assumed that the mobile phone 100 performs T-second countdown. After the mobile phone 100 displays a second screen 1601 shown in FIG. 16(a), the mobile phone 100 may perform countdown on the second screen. For example, T=5, and the mobile phone 100 may perform 5-second countdown on a second screen shown in FIG. 16(b). Optionally, the second screen shown in FIG. 16(b) may further include prompt information 1602 "After the countdown ends, the mobile phone automatically starts to record a video!".

S1504. The terminal determines whether the countdown ends.

If the countdown does not end, the terminal performs S1505 to detect whether an operation of the user is received. If the countdown ends, the terminal performs S1509.

S1505 The terminal detects whether the operation of the user is received.

If the terminal receives no operation of the user in S1505, the terminal may continue to perform S1504 to determine whether the countdown ends. If the terminal receives the operation of the user in S1505, the terminal may execute an event corresponding to the operation of the user. The method in this embodiment of this application may further include S1506, or S1507, or S1508.

S1506. When the operation of the user is a tap operation of the user on a recording start button, in response to the tap operation of the user on the recording start button, the terminal stops the countdown, starts to record a second video, and buffers the recorded second video.

The tap operation of the user on the recording start button on the second screen is used to trigger the terminal to record a video. In response to the tap operation of the user on the recording start button, the terminal may stop the countdown and start to record the second video.

S1507. When the operation of the user is a shake operation of the user on the terminal, in response to the shake operation of the user on the terminal, the terminal stops the countdown and continues to display the second screen.

Optionally, after the terminal stops the countdown and continues to display the second screen in response to the shake operation of the user on the terminal, if the terminal receives no tap operation of the user on the recording start button or a second operation within a specific time period, the terminal may perform countdown on the second screen.

S1508. When the operation of the user is another operation of the user, in response to the another operation, the terminal stops the countdown and executes an event corresponding to the another operation.

The another operation may be a second operation or a third operation.

S1509. The terminal starts to record a first video, and buffers the recorded first video.

Figure 16C:
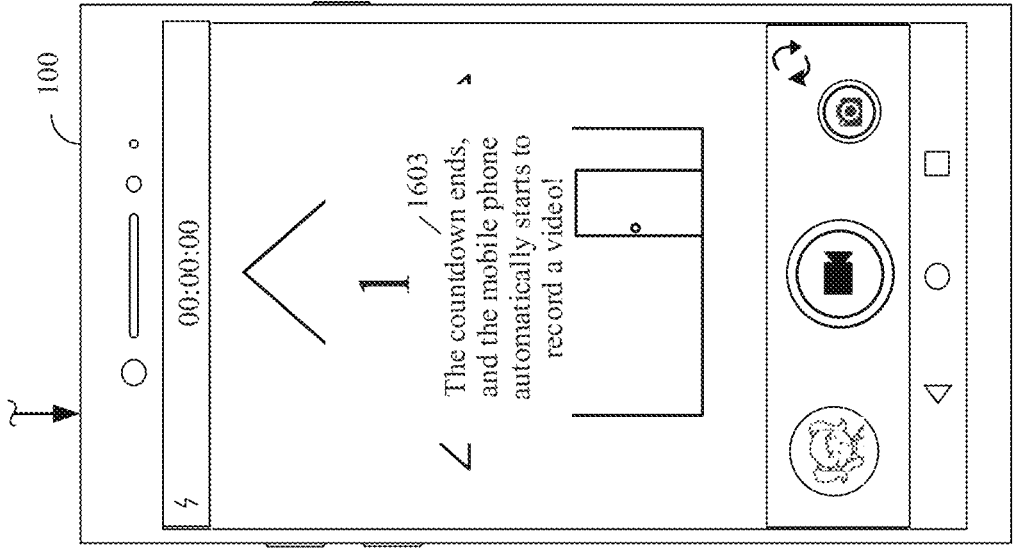
Figure 16D:
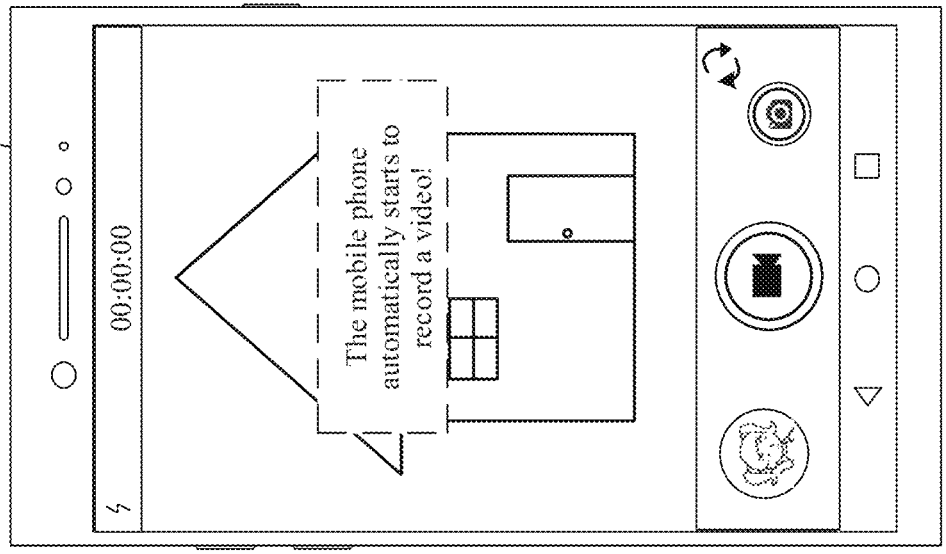

For example, when performing the T-second countdown to the last second, the mobile phone 100 displays a countdown screen shown in FIG. 16(c). Optionally, the countdown screen shown in FIG. 16(c) may further include prompt information 1603 "The countdown ends, and the mobile phone automatically starts to record a video!". Because the mobile phone 100 has not received the second operation of the user when the countdown ends, the mobile phone 100 may start to record the first video, and display a recording screen shown in FIG. 16(d).

Optionally, after S1509, the terminal may further perform S1310 to S1326.

According to the shooting control method provided in this embodiment of this application. The terminal starts countdown from a moment at which the terminal starts to display the second screen. When the countdown ends, if the terminal still receives no tap operation of the user on the recording start button, the user may forget to tap the recording start button. In this case, the terminal may automatically start to record the first video, so that it can be avoided that a video image that the user wants to record cannot be recorded because the terminal detects no tap operation of the user on the recording start button. A video that the user wants to record can be saved, thereby improving human-machine interaction performance.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software in the embodiments of the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal and the like may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in the embodiments of the present invention, division into the modules is used as an example, and is merely logical function division. In an actual implementation, another division manner may be used.

Figure 17:
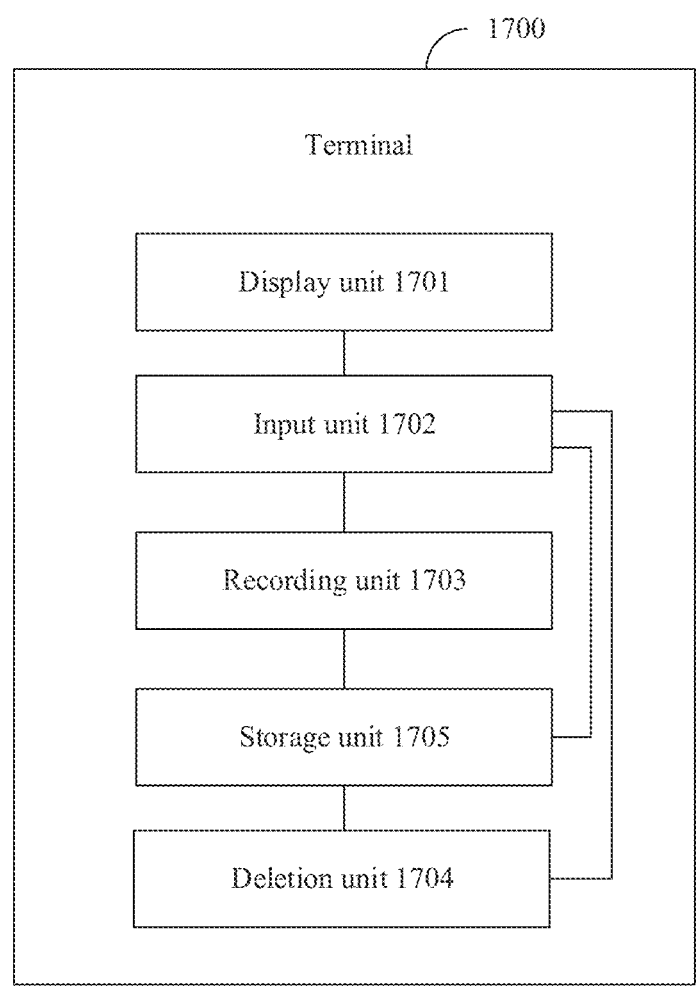
FIG. 17 is a schematic structural diagram 1 of components of a terminal according to an embodiment of this application.

When each function module is obtained through division based on each corresponding function, this application provides a terminal. As shown in FIG. 17, the terminal 1700 includes a display unit 1701, an input unit 1702, a recording unit 1703, a deletion unit 1704, and a storage unit 1705.

The display unit 1701 is configured to support the terminal 1700 in performing S301 and an operation of "displaying the second screen" in S302, an operation of "displaying the third screen" in S303, S806, S1007, S1009, S1013, S1015, S1102, S1314, S1316, S1320, S1323, and S1325, S601, S602, S801, S802, S1001, S301, and S1302 in the foregoing method embodiments, and/or another process of the technology described in this specification.

The input unit 1702 is configured to support the terminal 1700 in performing "receiving the first operation of the user on the first screen", "receiving the selection operation of the user on the third screen", and "receiving the tap operation of the user on the recording start button", "detecting the second operation of the user" in S303 and S805, "detecting the second operation" in S604, S606, and S1306. S805, S1004, S1006, S1304, S1311, and S1313 in the foregoing method embodiments, and/or another process of the technology described in this specification.

The recording unit 1703 is configured to support the terminal 1700 in performing the operation of "starting to record the first video" in S302, S1002, S609, S804, and S1309, an operation of "stopping recording the first video" in S303, S105, S1009, S1013, S1015, S1102, S1312, S1316, S1320, S1323, and S1325, an operation of "starting to record the second video" in S605, S1005, S1305, and S1312, an operation of "stopping recording the second video" in S1007 and S1314, S1012, S1319 and S1322 in the foregoing method embodiments, and/or another process of the technology described in this specification.

The deletion unit 1704 is configured to support the terminal 1700 in performing an operation of "deleting the first video according to the selection operation of the user on the third screen" in S304, S807, S1008, S1010, S1014, S1016, S1103, S1315, S1317, S1321, S1324, and S1326 in the foregoing method embodiments, and/or another process of the technology described in this specification.

The storage unit 1705 is configured to support the terminal 1700 in performing the operation of "buffering the first video" in S302, S609, S804, S1002, and S1309, an operation of "saving the first video according to the selection operation of the user on the third screen" in S304, S807, S1008, S1010, S1014, S1016, S1103, S1315, S1317, S1321, S1324, and S1326, an operation of "buffering the recorded second video" in S605, S1005, S1305, and S1312, an operation of "storing the recorded second video in response to the second operation" in S606 and S1306, S1006, S1313 in the foregoing method embodiments, and/or another process of the technology described in this specification.

Further, the terminal 1700 may further include a detection unit. The detection unit is configured to support the terminal 170 in performing S603, S1003, S1101, S1303, and S1310 in the foregoing method embodiments, and/or another process of the technology described in this specification.

Further, the terminal 1700 may further include an execution unit. The execution unit is configured to support the terminal 1700 in performing S607, S608, S1011, S1307, S1308, and S1318 in the foregoing method embodiments, and/or another process of the technology described in this specification.

Further, the terminal 1700 may further include: an identification unit, configured to support the terminal 1700 in performing S803 in the foregoing method embodiments, and/or another process of the technology described in this specification.

An embodiment of this application may further provide a terminal. The terminal may include a display unit, a countdown unit, a detection unit, a recording unit, an execution unit, and a storage unit.

The display unit is configured to support the terminal in performing an operation of "displaying the second screen" in S1501. S1502, and S1507, an operation of "displaying the third screen" in S1314, S1316, S1320, S1323, and S1325 in the foregoing method embodiments, and/or another process of the technology described in this specification. The countdown unit is configured to support the terminal in performing an operation of "stopping countdown" in S1503, S1504, S1506, S1507, and S1508 in the foregoing method embodiments, and/or another process of the technology described in this specification. The detection unit is configured to support the terminal in performing S1505, S1311, and S1313 in the foregoing method embodiments, and/or another process of the technology described in this specification. The recording unit is configured to support the terminal in performing an operation of "starting to record the second video" in S1506 and S1312, and an operation of "starting to record the first video" in S1509, an operation of "stopping recording the first video" in S1312, S1316, S1320, S1323, and S1325, an operation of "stopping recording the second video" in S1314, and an operation of "deleting the first video according to the selection operation of the user on the third screen" in S1319, S1322, S1315, S1317, S1321, S1324, and S1326 in the foregoing method embodiments, and/or another process of the technology described in this specification. The storage unit is configured to support the terminal in performing an operation of "buffering the second video" in S1506 and an operation of "buffering the first video" in S1509, an operation of "saving the first video according to the selection operation of the user on the third screen" in S1315, S1317, S1321, S1324, and S1326, and S1313 in the foregoing method embodiments, and/or another process of the technology described in this specification. The execution unit is configured to support the terminal in performing an operation of "performing an event corresponding to another operation" in S1508, and S1318 in the foregoing method embodiments, and/or another process of the technology described in this specification.

Certainly, the terminal (for example, the terminal 1700) includes but is not limited to the units and modules listed above. For example, the terminal 1700 may further include a communications unit, and the communications unit is configured to communicate with another terminal. In addition, functions that the function units can specifically implement include but are not limited to the functions corresponding to the method steps in the foregoing examples. For detailed descriptions about other units of the terminal 1700, refer to the detailed descriptions about the method steps corresponding to the units. Details are not described again herein in this embodiment of this application.

When an integrated unit is used, the input unit 1702, the deletion unit 1704, the detection unit, the recording unit 1703, the execution unit, and the like may be integrated into one processing module for implementation. The communications unit may be an RF circuit, a Wi-Fi module, or a Bluetooth module of the terminal. The storage unit 1705 may be a storage module of the terminal. The display unit 1701 and the input unit 1702 may be integrated into a display module (for example, a touchscreen) for implementation.

Figure 18:
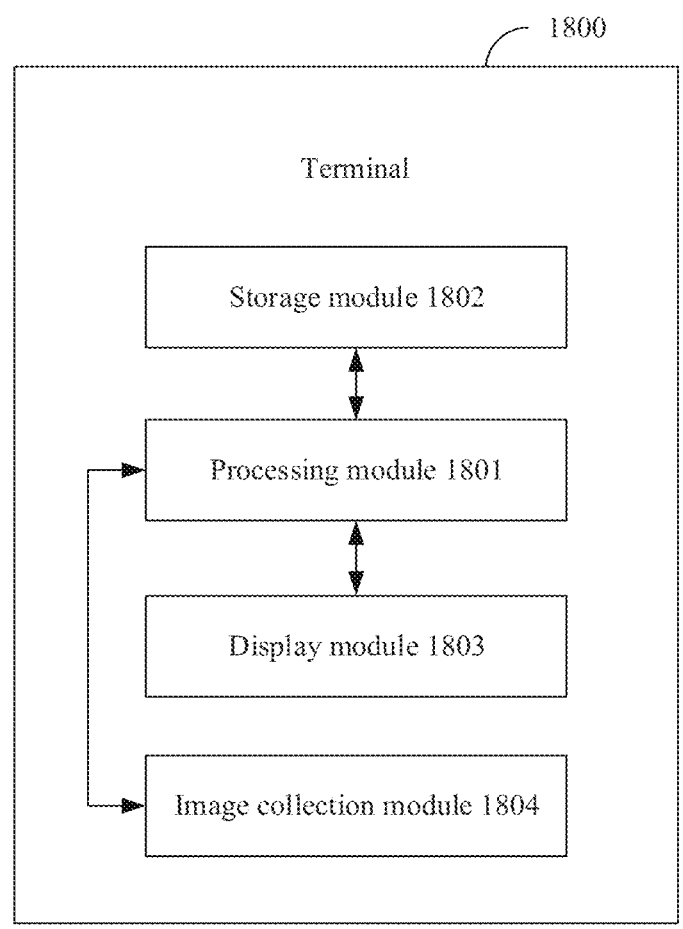
FIG. 18 is a schematic structural diagram 2 of components of a terminal according to an embodiment of this application.

FIG. 18 is a possible schematic structural diagram of a terminal in the foregoing embodiment. The terminal 1800 includes a processing module 1801, a storage module 1802, a display module 1803, and an image collection module 1804. The image collection module 1804 is configured to collect an image for video recording by the processing module 1801. The processing module 1801 is configured to perform management control on the terminal 1802. The display module 1802 is configured to display an image generated by the processing module 1801. The storage module 1802 is configured to store program code and data (for example, a recorded first video and a recorded second video) of the terminal.

Further, the terminal 1800 may further include a communications module. The communications module is configured to communicate with another terminal. For example, the communications module is configured to perform voice communication with the another terminal, and receive a profile picture from or send a profile picture to another terminal.

The processing module 1801 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processing module may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications module may be a transceiver, a transceiver circuit, a communications interface, or the like. The storage module 1802 may be a memory. The sensing module 1804 may be a camera.

When the processing module 1801 is a processor (such as the processor 201 shown in FIG. 2), the communications module is an RF circuit (such as the radio frequency circuit 202 shown in FIG. 2), the storage module 1802 is a memory (such as the memory 203 shown in FIG. 2), the display module 1803 is a touchscreen (including the touchpad 204-1 and the display 204-2 shown in FIG. 2), and the image collection module 1804 is a sensor (such as the camera 220 shown in FIG. 2), the terminal provided in this application may be the mobile phone 200 shown in FIG. 2. The communications modules may include not only the RF circuit, but also the Wi-Fi module and the Bluetooth module. The communications modules such as the RF circuit, the Wi-Fi module, and the Bluetooth module may be collectively referred to as a communications interface. The processor, the communications interface, the touchscreen, and the memory may be coupled together through a bus.

An embodiment of this application further provides a graphical user interface (GUI). The graphical user interface is stored in a terminal, and the terminal includes one or more processors, a display, a memory, and a camera. The one or more processors are configured to execute one or more computer programs stored in the memory. The graphical user interface includes:

a first GUI, where the first GUI is a photographing viewfinder screen, and for example, the first GUI may be a display screen shown in FIG. 1(*a*) or FIG. 4(*a*);

a second GUI displayed on the display in response to a first operation on a first screen, where the second GUI is a video recording viewfinder screen, for example, the second GUI may be a display screen shown in FIG. 1(*b*) or FIG. 4(*b*), and the second GUI shown in FIG. 1(*b*) or FIG. 4(*b*) includes a recording start button used to trigger the terminal to start video recording; and a third GUI displayed on the display in response to a second operation after the recording of a first video starts, where the third GUI is used to prompt the user to determine whether to save the recorded first video. For example, the third GUI may be a display screen shown in FIG. 5A(2) or FIG. 7.

This application further provides a computer storage medium. The computer storage medium stores computer program code. When the processor executes the computer program code, the terminal performs related method steps in any one of FIG. 3, FIG. 6A. FIG. 10A(1) and FIG. 10A(2), FIG. 11A to FIG. 11C, FIG. 13A to FIG. 13C, and FIG. 15 to implement the shooting control method in the foregoing embodiments.

This application further provides a computer program product. When the computer program product is un on a computer, the computer is enabled to perform related method steps in any one of FIG. 3. FIG. 6A. FIG. 10A(1) and FIG. 10A(2). FIG. 11A to FIG. 11C, FIG. 13A to FIG. 13C, and FIG. 15 to implement the shooting control method in the foregoing embodiments.

The terminal 1700, the terminal 1800, the GUI, the computer storage medium, and the computer program product provided in this application are all configured to perform the corresponding methods provided above. Therefore, for beneficial effects that can be achieved, refer to the beneficial effects of the corresponding methods provided above. Details are not described herein again.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk or an optical disc.

The foregoing descriptions are merely specific implementations of this application, but are not intended to limit the protection scope of this application. Any variation or replacement within the technical scope disclosed in tins application shall fall within the protection scope of this application. Therefore, the protection scope of this application shall be subject to the protection scope of the claims.

What is claimed is:

1. A shooting control method implemented by a terminal, wherein the shooting control method comprises:
    displaying a first screen, wherein the first screen is not a video recording viewfinder screen;
    receiving a first operation from a user on the first screen;
    displaying, in response to the first operation, a second screen, wherein the second screen is the video recording viewfinder screen and comprises a recording start button that, when activated, triggers the terminal to start a video recording;
    starting, in response to the first operation and without detecting an operation on the recording start button, recording a first video;
    buffering, in response to the first operation, the first video;
    detecting a second operation of the user on the terminal;
    stopping, in response to the second operation, recording the first video;
    displaying, in response to the second operation, a third screen, wherein the third screen prompts the user to determine whether to save the first video; and
    determining to save or delete the first video according to a selection operation of the user on the third screen.

2. The shooting control method of claim 1, wherein the second operation is a tap operation on the recording start button that is received after a preset time period.

3. The shooting control method of claim 1, wherein after starting recording the first video and buffering the first video, the shooting control method further comprises:
    receiving a third operation from the user within a preset time period or not receiving any operation from the user within the preset time period, wherein the preset time period starts from a moment when the terminal starts recording the first video, and wherein the third operation is not a tap operation of the user on the recording start button and is different than the second operation; and
    continuing to record the first video based on receiving the third operation within the preset time period or on not receiving any operation from the user within the preset time period.

4. The shooting control method of claim 1, wherein after starting recording the first video and buffering the first video, the shooting control method further comprises:
    receiving a third operation from the user within a preset time period or not receiving any operation from the user within the preset time period, wherein the preset time period starts from a moment when the terminal starts recording the first video, and wherein the third operation is not a tap operation of the user on the recording start button and is different than the second operation;
    determining, based on receiving the third operation within the preset time period or not receiving any operation from the user within the preset time period, whether a status of the terminal when held by the user undergoes a change satisfying a preset condition;
    detecting whether the status remains within a preset range when the status undergoes the change satisfying the preset condition; and
    continuing to record the first video when the status remains within the preset range.

5. The shooting control method to claim 2, further comprising:
    measuring the preset time period; and
    determining that the second operation occurs after the preset time period.

6. The shooting control method of claim 3, wherein the second operation is an operation to close a camera application or leave a screen of the camera application.

7. The shooting control method of claim 1, wherein the third screen comprises a video play control, and wherein after displaying the third screen and before saving or deleting the first video, the shooting control method further comprises:
    receiving, from the user, a tap operation on the video play control; and
    playing, in response to the tap operation, the first video using the video play control.

8. A shooting control method implemented by a terminal, wherein the shooting control method comprises:
    displaying a first screen, wherein the first screen is not a video recording viewfinder screen;
    receiving a first operation from a user on the first screen;
    displaying, in response to the first operation, a second screen comprising a recording start button, wherein the recording start button triggers the terminal to start a video recording;
    when the terminal receives a third operation from the user within a first preset time period or does not receive any operation from the user within the first preset time period:
        starting recording a first video when the first preset time period expires; and
        buffering the first video,
        wherein the first preset time period starts from a first moment when the terminal starts to display the second screen;
    responsive to detecting a second operation of the user:
        stopping recording the first video; and
        displaying a third screen that prompts the user to determine whether to save the first video; and
    saving or deleting the first video according to a selection operation of the user on the third screen,
    wherein the third operation is not a tap operation of the user on the recording start button and is different than the second operation.

9. The shooting control method of claim 8, further comprising:
   determining whether the first preset time period has elapsed without receiving any operation from the user during the first preset time period; and
   starting recording the first video after the first preset time period has elapsed when the first preset time period has elapsed without receiving any operation from the user during the first preset time period.

10. The shooting control method of claim 8, wherein after starting recording the first video and buffering the first video, the shooting control method further comprises:
   receiving the tap operation within a second preset time period that starts from a second moment when the terminal starts recording the first video;
   stopping recording, in response to the tap operation, the first video;
   starting, in response to the tap operation, to record a second video; and
   buffering, in response to the tap operation, the second video.

11. The shooting control method of claim 10, wherein after starting recording the first video and buffering the first video, the shooting control method further comprises:
   receiving the third operation within the second preset time period or not receiving any operation from the user within the second preset time period; and
   continuing to record the first video based on receiving the third operation within the second preset time period or one not receiving any operation from the user within the second preset time period.

12. The shooting control method of claim 10, wherein after starting recording the first video and buffering the first video, the shooting control method further comprises:
   receiving the third operation within the second preset time period or not receiving any operation from the user within the second preset time period;
   determining, based on receiving the third operation within the second preset time period or on not receiving any operation from the user within the second preset time period, whether a status of the terminal when held by the user undergoes a change satisfying a preset condition;
   detecting whether the status remains within a preset range when the status undergoes the change satisfying the preset condition; and
   continuing recording the first video when the status remains within the preset range.

13. The shooting control method of claim 12, wherein when the status does not remain within the preset range, the shooting control method further comprises:
   stopping recording the first video;
   displaying the third screen; and
   saving or deleting the first video according to the selection operation.

14. The shooting control method of claim 13, wherein after continuing recording the first video, the shooting control method further comprises:
   receiving the tap operation after the second preset time period;
   stopping recording the first video based on receiving the tap operation;
   displaying the third screen; and
   saving or deleting the first video according to the selection operation.

15. The shooting control method of claim 14, wherein third screen comprises a video play control, and wherein after displaying the third screen and before saving or deleting the first video, the shooting control method further comprises:
   receiving, from the user, a second tap operation on the video play control; and
   playing, in response to the second tap operation, the first video using the video play control.

16. A terminal comprising:
   a camera;
   a memory;
   a display configured to:
      display a first screen, wherein the first screen is not a video recording viewfinder screen; and
      receive, from a user, a first operation on the first screen; and
   a processor coupled to the camera, the display, and the memory and configured to:
      control, in response to the first operation, the display to display a second screen, wherein the second screen comprises a recording start button, and wherein the recording start button, when activated, triggers the processor to start a video recording;
      start, in response to the first operation and without detecting an operation on the recording start button, recording a first video using the camera;
      buffer, in response to the first operation, the first video in the memory;
      detect a second operation of the user;
      stop, in response to the second operation, recording the first video;
      control, in response to the second operation, the display to display a third screen that prompts the user to determine whether to save the first video;
      receive, from the user, a selection operation on the third screen; and
      save the first video in the memory or delete the first video buffered in the memory according to the selection operation.

17. The terminal of claim 16, wherein the second operation is a tap operation on the recording start button that is received after a preset time period.

18. The terminal of claim 16, wherein after starting recording the first video, the processor is further configured to:
   detect a third operation from the user within a preset time period or not detect any operation from the user within the preset time period, wherein the preset time period starts from a moment when the terminal starts recording the first video, and wherein the third operation is not a tap operation of the user on the recording start button and is different than the second operation; and
   continue to record the first video using the camera based on detecting the third operation within the preset time period or on not detecting any operation from the user within the preset time period.

19. The terminal of claim 16, wherein after starting recording the first video, the processor is further configured to:
   detect a third operation of the user within a preset time period or not detect any operation of the user within the preset time period, wherein the preset time period starts from a moment when the terminal starts recording the first video, and wherein the third operation is not a tap operation of the user on the recording start button and is different than the second operation;
   determine, based on detecting the third operation within the preset time period or on not detecting any operation of the user within the preset time period, whether a status of the terminal when held by the user undergoes a change satisfying a preset condition;

detect whether the status remains within a preset range when the status undergoes the change satisfying the preset condition; and continue to record the first video using the camera when the status remains within the preset range.

20. The terminal of claim 17, further comprising:

measuring the preset time period; and determining that the second operation occurs after the preset time period.

* * * * *